US010771744B2

(12) United States Patent
Yamashita

(10) Patent No.: US 10,771,744 B2
(45) Date of Patent: Sep. 8, 2020

(54) PHOTOGRAPHY CONTROL METHOD, PHOTOGRAPHY CONTROL SYSTEM, AND PHOTOGRAPHY CONTROL SERVER

(71) Applicant: Panasonic Intellectual Property Corporation of America, Torrance, CA (US)

(72) Inventor: Kazuhiko Yamashita, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 170 days.

(21) Appl. No.: 15/497,361

(22) Filed: Apr. 26, 2017

(65) Prior Publication Data

US 2017/0332050 A1     Nov. 16, 2017

(30) Foreign Application Priority Data

May 11, 2016  (JP) .................................. 2016-095160
Aug. 25, 2016  (JP) .................................. 2016-164910

(51) Int. Cl.
*H04N 7/18*         (2006.01)
*G06F 16/51*       (2019.01)
(Continued)

(52) U.S. Cl.
CPC ............. *H04N 7/181* (2013.01); *G06F 16/51* (2019.01); *G06K 7/10722* (2013.01);
(Continued)

(58) Field of Classification Search
CPC ........... G06K 9/00771; G06K 9/00624; G06K 9/325; G06K 9/18; G06K 9/033;
(Continued)

(56) References Cited

U.S. PATENT DOCUMENTS 5,657,077 A  *  8/1997  DeAngelis ......... A63B 71/0605
                                                         348/157
5,923,406 A  *  7/1999  Brasington ...... G07B 17/00193
                                                         355/27
(Continued)

FOREIGN PATENT DOCUMENTS

JP           11-215421        8/1999
JP          2002-165174       6/2002
(Continued)

OTHER PUBLICATIONS

The Extended European Search Report dated Oct. 19, 2017 for the related European Patent Application No. 17169208.0.
(Continued)

*Primary Examiner* — Daniel Chang
(74) *Attorney, Agent, or Firm* — Greenblum & Bernstein, P.L.C.

(57) ABSTRACT

A photography control method includes temporarily saving one or more sets of photography data, taken by a photographing camera, in a temporary photography data storage unit, acquiring identification information identifying a subject, extracting, from the one or more sets of photography data temporary saved in the temporary photography data storage unit, at least one set of photography data corresponding to the identification information acquired in the acquiring of identification information; and saving the extracted at least one set of photography data in a photography data storage unit in a manner associated with the identification information of the subject.

21 Claims, 27 Drawing Sheets

(51) Int. Cl.
    *G06K 7/10*     (2006.01)
    *G06K 7/14*     (2006.01)
    *G06K 9/00*     (2006.01)
    *H04L 29/06*     (2006.01)
    *H04N 5/232*     (2006.01)

(52) U.S. Cl.
CPC ....... *G06K 7/1413* (2013.01); *G06K 9/00255* (2013.01); *G06K 9/00288* (2013.01); *G06K 9/00342* (2013.01); *G06K 9/00744* (2013.01); *H04L 63/108* (2013.01); *H04N 5/23219* (2013.01); *H04N 5/23293* (2013.01); *H04N 7/188* (2013.01)

(58) Field of Classification Search
CPC ........... G06K 2209/27; G06K 9/00013; G06K 9/00288; H04N 5/23296; H04N 1/00291; H04N 1/2112; H04N 2101/00
USPC ........ 348/143, 157, 159; 707/754, 737, 706; 382/103
See application file for complete search history.

(56) References Cited

U.S. PATENT DOCUMENTS

| | | | | |
|---|---|---|---|---|
| 7,382,895 | B2 * | 6/2008 | Bramblet | G07C 9/00 382/103 |
| 8,694,443 | B2 * | 4/2014 | Bobbitt | G06N 20/00 706/12 |
| 2003/0210808 | A1 * | 11/2003 | Chen | G06K 9/00221 382/118 |
| 2004/0100566 | A1 * | 5/2004 | Valleriano | G07C 1/22 348/231.99 |
| 2004/0136701 | A1 * | 7/2004 | Nakanishi | G03B 17/53 396/2 |
| 2004/0145658 | A1 * | 7/2004 | Lev-Ran | G08B 13/19656 348/143 |
| 2004/0156535 | A1 * | 8/2004 | Goldberg | H04N 1/00172 382/115 |
| 2004/0211883 | A1 * | 10/2004 | Imagawa | G07C 9/00 250/208.1 |
| 2006/0005045 | A1 * | 1/2006 | Nakase | G07C 9/257 713/190 |
| 2006/0056832 | A1 | 3/2006 | Yamaguchi et al. | |
| 2006/0193623 | A1 * | 8/2006 | Funakura | G03B 17/00 396/312 |
| 2006/0193624 | A1 * | 8/2006 | Mino | G03B 17/00 396/312 |
| 2008/0251575 | A1 * | 10/2008 | Bowling | H04N 21/4147 235/375 |
| 2010/0294840 | A1 * | 11/2010 | Barry | G01N 35/00732 235/462.01 |
| 2011/0102854 | A1 * | 5/2011 | Cho | H04N 1/00132 358/403 |
| 2011/0150273 | A1 | 6/2011 | Moore | |
| 2012/0169882 | A1 * | 7/2012 | Millar | H04N 7/181 348/159 |
| 2013/0101219 | A1 | 4/2013 | Bosworth et al. | |
| 2013/0141587 | A1 * | 6/2013 | Petricoin, Jr. | G07C 9/28 348/156 |
| 2013/0143675 | A1 * | 6/2013 | Platzer | A63H 18/026 463/58 |
| 2013/0188046 | A1 * | 7/2013 | Kong | G08B 21/18 348/143 |
| 2013/0194421 | A1 * | 8/2013 | Kita | H04N 7/18 348/143 |
| 2013/0242113 | A1 | 9/2013 | Tanaka | |
| 2013/0342699 | A1 * | 12/2013 | Hansen | G07C 1/24 348/157 |
| 2014/0183948 | A1 * | 7/2014 | Hulbert | H02J 7/0063 307/23 |
| 2015/0220749 | A1 * | 8/2015 | Cronholm | G06F 21/62 726/30 |
| 2015/0294183 | A1 * | 10/2015 | Watanabe | G07C 9/28 382/203 |
| 2016/0275534 | A1 * | 9/2016 | Iwai | H04N 7/188 |
| 2017/0185847 | A1 * | 6/2017 | Saptharishi | G08B 13/19613 |

FOREIGN PATENT DOCUMENTS

| | | | |
|---|---|---|---|
| JP | 2004265317 A | * | 9/2004 |
| JP | 2004-304653 A | | 10/2004 |
| JP | 2005-032050 A | | 2/2005 |
| JP | 2005-124176 A | | 5/2005 |
| WO | WO-2015198323 A2 | * | 12/2015 |
| WO | WO-2016044442 A1 | * | 3/2016 ........ G06K 9/00255 |

OTHER PUBLICATIONS

The Extended European Search Report dated Mar. 11, 2020 for the related European Patent Application No. 17169208.0.

* cited by examiner

FIG. 10A

| SUBJECT ID | START TIME | END TIME | PHOTOGRAPHY DATA |
|---|---|---|---|
| ID1 | t1 | t4 | R1 |
| ID2 | t2 |  | R1 |
| ID3 | t3 |  | R1 |

FIG. 10B

| SUBJECT ID | START TIME | END TIME | PHOTOGRAPHY DATA |
|---|---|---|---|
| ID1 | t1 |  | R1 |

FIG. 10C

| SUBJECT ID | START TIME | END TIME | PHOTOGRAPHY DATA |
|---|---|---|---|
| ID1 | t1 |  | R1 |
| ID2 | t2 |  | R1 |

FIG. 10D

| SUBJECT ID | START TIME | END TIME | PHOTOGRAPHY DATA |
|---|---|---|---|
| ID1 | t1 |  | R1 |
| ID2 | t2 |  | R1 |
| ID3 | t3 |  | R1 |

FIG. 10E

| SUBJECT ID | START TIME | END TIME | PHOTOGRAPHY DATA |
|---|---|---|---|
| ID1 | t1 | t4 | R1 |
| ID2 | t2 |  | R1 |
| ID3 | t3 | t5 | R1 |

FIG. 10F

| SUBJECT ID | START TIME | END TIME | PHOTOGRAPHY DATA |
|---|---|---|---|
| ID1 | t1 | t4 | R1 |
| ID2 | t2 | t6 | R1 |
| ID3 | t3 | t5 | R1 |

FIG. 11

| SUBJECT ID | START TIME | END TIME | PHOTOGRAPHY DATA |
|---|---|---|---|
| ID1 | t1 | t4 | R1 |
| ID2 | t2 | t6 | R1 |
| ID3 | t3 | t5 | R1 |
| ID4 | t7 | t8 | R2 |

| SUBJECT ID | PHOTOGRAPHY TIME | PHOTOGRAPHY INSTRUCTION | PHOTOGRAPHY DATA |
|---|---|---|---|
| ID3 | T1 | S1 | frameTT1 |

| PHOTOGRAPHY DATA | START TIME | END TIME |
|---|---|---|
| R11 | t11 | t14 |
| R12 | t15 | t18 |

FIG. 24

| SUBJECT ID | PHOTOGRAPHY DATA | START TIME | END TIME |
|---|---|---|---|
| ID5 | M1 | t12 | t13 |
| ID5 | M2 | t16 | t17 |

| SUBJECT ID | PHOTOGRAPHY DATA | PHOTOGRAPHY TIME |
|---|---|---|
| ID6 | P1 | t21 |
| ID6 | P2 | t22 |

PHOTOGRAPHY CONTROL METHOD, PHOTOGRAPHY CONTROL SYSTEM, AND PHOTOGRAPHY CONTROL SERVER

BACKGROUND

1. Technical Field

The present disclosure relates to a photography control method, a photography control system, and a photography control server, and more particularly relates to, for example, a photography control method, a photography control system, and a photography control server, whereby photography is performed of a subject at a predetermined photography spot, using a remotely-operable photographing camera installed at a photography spot such as a theme park, amusement facility, sightseeing destination, or the like.

2. Description of the Related Art

A service is being studied where cameras are installed at locations where users would desire to take photographs, moving images, and so forth, such as attractions, pavilions, and like facilities in theme parks, amusement facilities, and so forth, locations with excellent scenery at sightseeing destinations, and so forth (hereinafter referred to as "photography spot"), and providing photography using the installed cameras. This service can improve user satisfaction, since better photographs without blurring can be taken as compared to taking photographs using the user's camera, and photographs can be taken from positions off limits to the user.

An example of such services being provided is a widely-used service where users riding a ride at an attraction in an amusement park are automatically photographed using a sensor or the like, as the users pass in front of the camera. The users are allowed to view and select photographs later, which are then provided to the user.

An example of a system where the user is allowed to directly operate the installed camera is known, where an operating terminal (e.g., remote controller) is lent to the user, and photography is performed by the installed camera under instructions from the operating terminal (e.g., see Japanese Unexamined Patent Application Publication No. 11-215421). However, such a service assumes the same camera being used by multiple users, but only one user can operate the camera at a time, so multiple people cannot press the shutter at the same time.

On the other hand, this can be realized by shooting a moving image, and extracting still images from the moving image at timings regarding which each user has instructed photography. For example, there is a method where a moving image shot by a camera is recorded in a memory card, switching the camera to playback mode after shooting, and recording images in the memory card as still images by pressing the shutter button when a desired image is displayed in the moving image being played (e.g., see Japanese Unexamined Patent Application Publication No. 2002-165174).

Thus, combining a photography system having an installed camera with technology such as described above enables, for example, parents taking photographs of children playing at a photography spot in an attraction or the like, using the installed camera. However, the above-described photography method has needed further improvement with regard to the perspective of privacy.

SUMMARY

In one general aspect, the techniques disclosed here feature a photography control method of a photography control system. The method includes: acquiring first subject information indicating that a subject is in an area including a photography spot; photographing, using a photographing camera installed facing the photography spot, the photography spot to obtain one or more sets of photography data upon acquiring the first subject information; temporarily saving the one or more sets of photography data, taken by the photographing camera, in a temporary photography data storage unit; acquiring identification information identifying the subject; extracting, from the one or more sets of photography data temporarily saved in the temporary photography data storage unit, at least one set of photography data corresponding to the identification information acquired in the acquiring of identification information; and saving the extracted at least one set of photography data in a photography data storage unit in a manner associated with the identification information of the subject.

According to the present disclosure, a user knowing identification information identifying a subject can acquire at least one set of photography data of a subject at a photography spot, while preventing activities such as secret photographing or the like by a third party.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIGS. 10A through 10F are diagrams illustrating examples of a table managing correlation between subject IDs and photography data, in primary photography processing in the photography control system illustrated in FIG. 7;

FIG. 11 is a diagram illustrating an example of a table managing correlation between subject IDs and photography data, in primary photography processing in the photography control system illustrated in FIG. 7;

FIG. 24 is a diagram illustrating an example of a table managing correlation between subject IDs and photography data, in secondary photography processing in the photography control system illustrated in FIG. 20;

DETAILED DESCRIPTION

Figure 1:
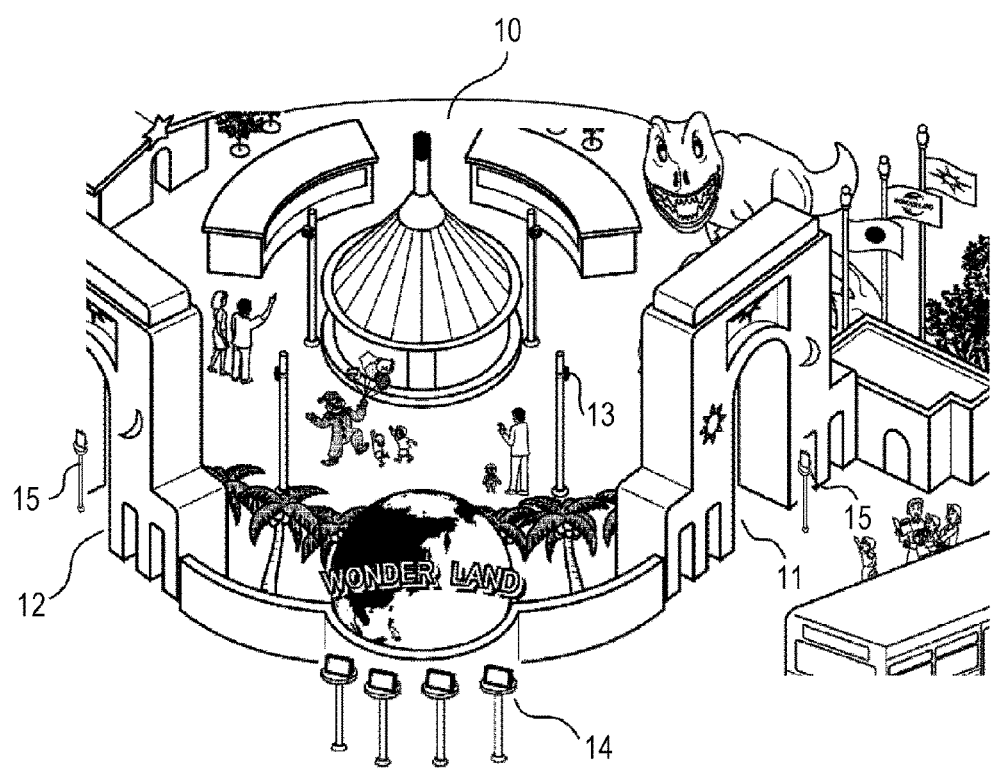
FIG. 1 is a diagram illustrating an example of a scene where a photography control system according to a first embodiment of the present disclosure is being used.

Underlying Knowledge Forming Basis of the Present Disclosure

The above-described Japanese Unexamined Patent Application Publication No. 11-215421 has an operating terminal (e.g., remote controller) lent to the user, and photography is performed by the installed camera under instructions from the operating terminal. Accordingly, a third party unrelated to the subject can use the installed camera to perform photography and acquire photography data, which is undesirable from the perspective of privacy.

In the above-described Japanese Unexamined Patent Application Publication No. 2002-165174, and images are recorded in a memory card as still images by pressing the shutter button when a desired image is displayed in the moving image being played, so moving images can be taken of multiple children playing at a photography spot in an attraction using an installed camera, and each parent can acquire still images of their respective children from the moving image. However, a certain parent can acquire still images of children not their own, which is undesirable from the perspective of privacy, in the same way as described above. Further, photography data unrelated to the subject regarding which photographing is desired wastefully consumes storage capacity of the storage device for photography.

The present disclosure provides a photography control method, a photography control system, and a photography control server, in which a user knowing identification information identifying a subject can acquire photography data of a subject at a photography spot, while preventing activities such as secret photographing or the like by a third party that does not know the identification information.

According to one aspect of the present disclosure, a photography control method is a photography control method of a photography control system. The photography control method includes: acquiring first subject information indicating that a subject is in an area including a photography spot; photographing, using a photographing camera installed facing the photography spot, the photography spot to obtain one or more sets of photography data upon acquiring the first subject information; temporarily saving the one or more sets of photography data, taken by the photographing camera, in a temporary photography data storage unit; acquiring identification information identifying the subject; extracting, from the one or more sets of photography data temporarily saved in the temporary photography data storage unit, at least one set of photography data corresponding to the identification information acquired in the acquiring of identification information; and saving the extracted at least one set of photography data in a photography data storage unit in a manner associated with the identification information of the subject.

According to this configuration, when first subject information indicating that a subject is in an area including a photography spot is acquired, one or more sets of photography data taken by the photographing camera installed facing the photography spot are temporarily saved in the temporary photography data storage unit. In this case, the one or more sets of photography data may include photography data where the subject has been photographed at the photography spot. In the photography control method, identification information identifying the subject is acquired, at least one set of photography data corresponding to the acquired identification information of the subject is extracted from the one or more sets of photography data temporarily saved in the temporary photography data storage unit, and the extracted at least one set of photography data is saved in the photography data storage unit in a manner associated with the identification information of the subject. Accordingly, only a user who knows the identification information identifying the subject can acquire photography data taken of the subject at the photography spot that corresponds to the identification information of the subject.

As a result, in the photography control system that performs photography using a photographing camera installed facing a photography spot, a user that knows identification information identifying a subject can acquire photography data corresponding to the identification information. Accordingly, the user can acquire photography data taken of the subject at the photography spot, and a third party that does not know the identification information cannot acquire the photography data taken of the subject at the photography spot, thereby preventing activities such as secret photographing or the like by a third party.

In the acquiring of first subject information, information that is the same information that the identification information indicates may be acquired as the subject information. The first subject information may be acquired when the subject enters the area.

According to this configuration, when a subject enters an area including a photography spot, photography of the subject by the photographing camera can be started automatically upon acquiring the first subject information, and images where the subject has been photographed can be acquired from the one or more sets of photography data that have been taken.

In the acquiring of the first subject information, moving body detection information indicating that a moving body in the area has been detected may be acquired as the first subject information.

According to this configuration, photography of the subject is started even without the subject or user explicitly instructing starting of photography, and images where the subject has been photographed can be acquired from the one or more sets of photography data that has been taken.

In the acquiring of the first subject information, the identification information acquired in the acquiring of the identification information may be acquired as the first subject information.

According to this configuration, in a case where the user is the subject him/herself, a photography instruction can be given at a photography spot at a desired timing.

In the photographing, the photography spot may be taken by the photographing camera repeatedly at a predetermined time interval. The photographing may be ended when a certain amount of time has elapsed from starting of photography.

According to this configuration, photography is automatically stopped even if the subject does not perform notification of identification information when leaving the area.

The photography control method may further include: temporarily saving first time information in the temporary photography data storage unit, the first time information indicating a first time at which the first subject information was acquired; the photography spot may be taken by the photographing camera repeatedly at a predetermined time interval. The one or more sets of photography data, to be obtained in the photographing, may be a plurality of sets of photography data of which photography times taken by the photographing camera are different from each other. In the extracting, one set of photography data, of which a photography time matches a time at which the identification information was acquired in the acquiring of identification information, may be extracted from the plurality of sets of photography data temporarily saved in the temporary photography data storage unit.

According to this configuration, the procedures for extracting photography data where the subject has been taken, from the temporary photography data storage unit, can be reduced from the two steps of inputting identification information of the subject and inputting instructions to extract the photography data, to the one step of just inputting identification information of the subject.

The photography control method may further include: temporarily saving the first subject information and first time information in the temporary photography data storage unit, the first time information indicating a first time at which the first subject information was acquired; acquiring second subject information which is the same information as the first subject information when the subject exits from the area; temporarily saving second time information in the temporary photography data storage unit, the second time information indicating a second time at which the second subject information was acquired. In the photographing, the photography spot may be taken by the photographing camera repeatedly at a predetermined time interval. The one or more sets of photography data, to be obtained in the photographing, may be a plurality of sets of photography data of which photography times taken by the photographing camera are different from each other. The acquiring of the identification information, third time information may be acquired in addition to the identification information, the third time information may indicates a third time which is instructed by a user. The third time may be a time between the first time and the second time. In the extracting, one set of photography data of which a photography time matches the third time, may be extracted, as the at least one set of photography data, from the plurality of sets of photography data temporarily saved in the temporary photography data storage unit.

According to this configuration, in a case where the user instructs extracting while directly viewing the subject, as a photography instruction, photography data of a desired timing can be acquired from the photography data temporarily saved in the temporary photography data storage unit.

In the photographing, the photography spot may be taken by the photographing camera repeatedly at a predetermined time interval. The one or more sets of photography data, to be obtained in the photographing, may be a plurality of sets of photography data of which photography times taken by the photographing camera are different from each other. In the extracting, one set of photography data of which a photography time is instructed by a user may be extracted, as the at least one set of photography data, from the plurality of sets of photography data temporarily saved in the temporary photography data storage unit.

According to this configuration, even in a case where time has elapsed from taking the photography data to extracting the photography data, photography data of a desired timing can be acquired while viewing the photography data.

In the photographing, the photography spot may be taken by the photographing camera repeatedly at a predetermined time interval. The one or more sets of photography data, to be obtained in the photographing, may be a plurality of sets of photography data of which photography times taken by the photographing camera are different from each other. In the acquiring of the identification information, the identification information may be acquired from at least one set of photography data which includes information corresponding to the identification information and which is one of the plurality of sets of photography data stored in the temporary photography data storage unit. In the extracting, the at least one set of photography data, from which the identification information was acquired, may be extracted from the temporary photography data storage unit.

According to this configuration, there is no acquisition of photography data in a time period during which the subject specified by identification information is not at the photography spot.

In the acquiring of the identification information, the identification information may be acquired by detecting the information corresponding to the identification information from the at least one set of photography data.

According to this configuration, just photography data including the subject specified by identification information can be extracted from the photography data that has been taken.

The identification information may be expressed using a barcode.

According to this configuration, an object having a physical form, on which a barcode is printed or the like, is used for identification information, rather than an electronic arrangement, so objects on which the same barcode has printed can be used for identification information held up when entering the photography spot and identification information in the photography data that is taken, facility recognition of identification information.

The identification information may be features information indicating features of a facial image of the subject.

According to this configuration, identification information that the subject has, and feature information of a facial image of the subject are associated beforehand, and facial recognition can be used in extracting photography data of the subject from the photography data that has been taken, so the subject does not have to carry a tag or the like having a physical form indicating identification information so as to be taken by a photographing camera.

The identification information may have usage conditions where at least one of the photographing camera that can be used at date and time that can be used is restricted.

According to this configuration, photographing cameras that can be used can be restricted, and dates and times when usable, can be restricted in accordance with identification information of the subject. Accordingly, there may be usages such as enabling photography only in a case where a usage fee has been paid for a photographing camera and/or at a date and time for which a usage fee has been paid, with regard to the identification information of the subject.

The photography control method may further include notifying a terminal operated by a user regarding a photography spot where the subject can be photographed, in a case where the first subject information acquired in the acquiring of the first subject information and the identification information acquired in the acquiring of the identification information match.

According to this configuration, a terminal which the user operates is notified of a photography spot when the subject can be photographed, so the user can know at which photography spot the subject is, by a list of multiple photography spots being displayed on a photographing terminal, and the highlighting photography spots where there is an accepting terminal at the entrance to which the subject has held up a barcode or the like, for example. Accordingly, the user can perform photography at that photography spot.

An arrangement may be made where the photographing camera is a plurality of photographing cameras, the temporary photography data storage unit is a plurality of temporary photography data storage units, in the temporarily saving, a plurality of sets of photography data taken by the plurality of photographing cameras are temporarily saved in the plurality of temporary photography data storage units, and in the extracting, at least one set of photography data corresponding to the identification information acquired in the acquiring of identification information, is extracted from the plurality of sets of photography data temporarily saved in the plurality of temporary photography data storage units.

According to this configuration, when photography is being performed by multiple photographing cameras and photography data taken by multiple photographing cameras is being temporarily saved in multiple temporary photography data storage units, photography data of multiple photographing cameras can be acquired from a single photographing terminal.

In the extracting, the at least one set of photography data is extracted from the plurality of sets of photography data temporarily saved in the plurality of temporary photography data storage units, and in the saving, the at least one set of photography data may be saved in the photography data storage unit in a manner associated with the identification information.

According to this configuration, photography data saved in multiple temporary photography data storage units can be collectively saved in a single photography data storage unit using identification information of the subject, so photography data taken by multiple photographing cameras can be acquired from a single photography data storage unit.

The photographing camera may be a plurality of photographing cameras, and in the temporarily saving, the plurality of sets of photography data taken by the plurality of photographing cameras may be temporarily saved in the temporary photography data storage unit.

According to this configuration, multiple sets of photography data taken by multiple photographing cameras can be collectively acquired from a single photographing terminal.

The photographing camera may include a plurality of photographing cameras that photograph the photography spot in photography states different from each other, and in the photographing, a photography instruction may be given to the plurality of photographing cameras at the same time.

According to this configuration, the subject at the photography spot can be photographed in photography states different from each other at the same time, so the subject can be photographed from multiple angles at the same time, or photographed at different zoom ratios at the same time, for example.

The present disclosure is not restricted to being realized as a photography control method that executes processing according to the above-described features, and can also be realized as a photography control system and photography control server or the like having configurations with features corresponding to the processing according to the features executed in the photography control method. Accordingly, the following aspect can yield the same advantages as the above-described photography control method.

According to another aspect of the present disclosure, a photography control system is a photography control system. The photography control system includes: a photographing camera installed facing a photography spot; a subject information acquisition unit that acquires first subject information indicating that a subject is present in an area including the photography spot; a primary photography control unit that controls the photographing camera; a temporary photography data storage unit that temporarily saves one or more sets of photography data taken by the photographing camera; an identification information acquisition unit that acquires identification information identifying the subject; a secondary photography control unit that extracts at least one set of photography data from the temporary photography data storage unit; and a photography data storage unit that saves the at least one set of photography data extracted by the secondary photography control unit. When the subject information acquisition unit acquires the first subject information, the primary photography control unit controls the photographing camera to take the photography spot, and saves one or more sets of photography data taken by the photographing camera in the temporary photography data storage unit. The secondary photography control unit extracts at least one set of photography data corresponding to identification information of the subject acquired by the identification information acquisition unit, out of one or more sets of photography data temporarily saved in the temporary photography data storage unit, and saves the extracted at least one set of photography data in the photography data storage unit in a manner associated with the identification information of the subject.

According to another aspect of the present disclosure, a photography control server. The photography control server includes: a subject information acquisition unit that acquires subject information indicating that a subject is present in an area including a photography spot; a primary photography control unit that controls a photographing camera installed facing the photography spot; a temporary photography data storage unit that temporarily saves one or more sets of photography data taken by the photographing camera; an identification information acquisition unit that acquires identification information identifying the subject; a secondary photography control unit that extracts at least one set of photography data from the temporary photography data storage unit; and a photography data storage unit that saves the at least one set of photography data extracted by the secondary photography control unit. When the subject information acquisition unit acquires the subject information, the primary photography control unit controls the photographing camera to take the photography spot, and saves one or more sets of photography data taken by the photographing camera in the temporary photography data storage unit. The secondary photography control unit extracts at least one set of photography data corresponding to identification information of the subject acquired by the identification information acquisition unit, out of one or more sets of photography data saved in the temporary photography data storage unit, and saves the extracted at least one set of photography data in the photography data storage unit in a manner associated with the identification information of the subject.

It should be noted that the present disclosure may be realized as a computer program causing a computer to execute characteristic processing included in a photography control method such as described above. It is needless to say that such a computer program may be distributed via a non-transitory computer-readable recording medium such as a CD-ROM or the like, or a communication network such as the Internet or the like.

Note that the embodiments described below all illustrate specific examples of the present disclosure. Values, shapes, components, steps, orders of steps, and so forth in the following embodiments are only exemplary, and do not restrict the present disclosure. Components in the following embodiments which are not included in an independent Claim indicating the highest concept are described as being optional components. Also, in all of the embodiments, the contents of each can be combined.

The photography control system according to embodiments of the present disclosure will be described with reference to the drawings.

1. First Embodiment

A photography control system according to a first embodiment of the present disclosure provides users with photograph data taken by photographing cameras installed at photography spots in theme parks, amusement facilities, sightseeing destinations, and so forth. The present embodiment is a system to realize a service where a photographer who is a user uses a photographing terminal or individually-owned mobile terminal, and is provided with photography data such as a photograph or the like that the photographer is satisfied with, out of one or more sets of photography data taken by the photography camera. The present embodiment will be described by way of an example where pavilions in an amusement facility are photography points, and photographs of a child (subject) of a photographer (user) who is playing at the photography spot are taken by a photographing camera. Note that in the present embodiment, a "pavilion" refers to an individual amusement area provided in a theme park or the like, and is a closed area with predetermined entrance(s)/exit(s).

1-1. Overview

FIG. 1 is a diagram illustrating an example of a scene where a photography control system according to the first embodiment of the present disclosure is being used. In FIG. 1, a pavilion 10 is an area including a photography spot. The pavilion 10 is provided with a pavilion entrance 11 and a pavilion exit 12. An accepting terminal 15 is installed near each of the pavilion entrance 11 and pavilion exit 12. A photographing camera 13 is installed in the pavilion 10, facing toward a photography spot. Photographing terminals 14 and accepting terminals 15 are also installed outside of the pavilion 10.

Figure 2:
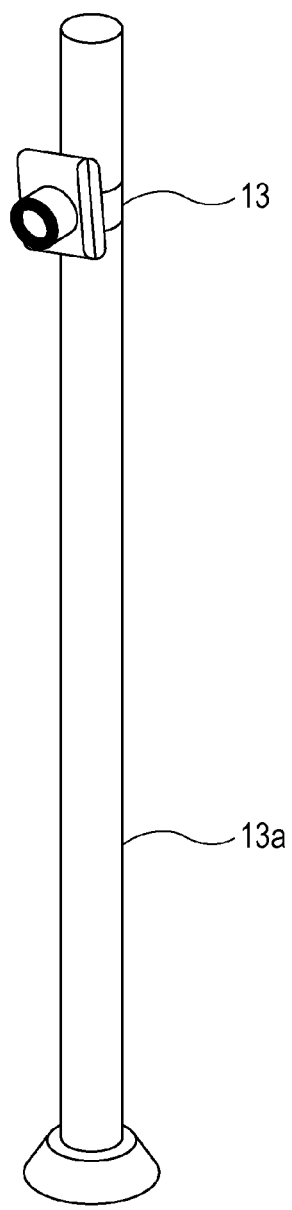
FIG. 2 is a diagram illustrating the external view of an example of a photographing camera illustrated in FIG. 1.

FIG. 2 is a diagram illustrating the external view of an example of the photographing camera 13 illustrated in FIG. 1. The photographing camera 13 installed in the pavilion 10 is attached to a pole 13a, and is installed at an angle where it can take photographs of people inside the pavilion 10, as illustrated in FIG. 2. The photographing camera 13 may be attached to other than the pole 13a. Upon receiving a photography instruction, the photographing camera 13 photographs (or takes) a photography spot once. Alternatively, the photographing camera 13 may photograph the photography spot repeatedly at a certain time interval upon receiving a photography instruction. The certain time interval may be an optional value.

The photographing camera 13 also correlates information relating to the photography time when photography of the photography spot was performed (also referred to as "photography time information") and photography data. The photography time information may be separate from the corresponding photography data, or may be included in the photography data. Thus, photography data can be identified based on the photography time. Description will be made hereinafter regarding an example where the photography data taken by the photographing camera 13 is correlated with the photography time.

In a case of a configuration where the photographing camera 13 performs photography just once upon receiving a photography instruction, the photography data acquired by the photography includes image data corresponding to a still image (also referred to as "photograph data"). In a case of a configuration where the photographing camera 13 repeats photography upon receiving a photography instruction, description will be made regarding a case where the frames acquired by each photographing is an image frame corresponding to a still image. For example, reducing the time interval of the photographing camera 13 performing photography enables playback like a moving image by continuously displaying the multiple sets of photography data acquired by photographing in order of photography time. Each time the photographing camera 13 performs photography, one or more sets of photography data is obtained.

Figure 3:
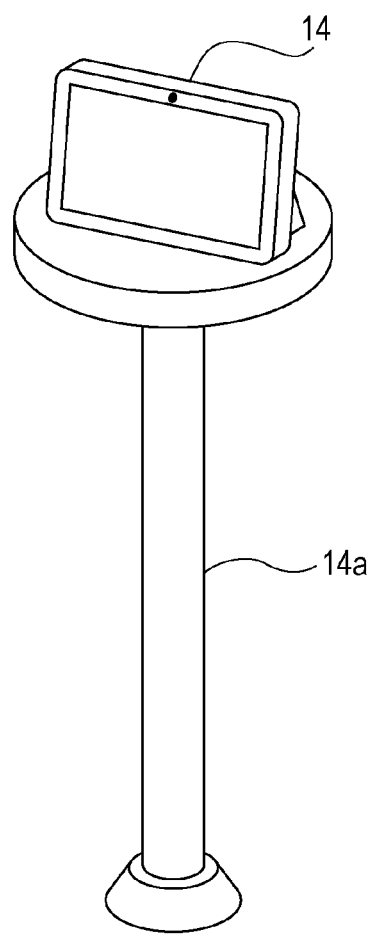
FIG. 3 is a diagram illustrating the external view of an example of a photographing terminal illustrated in FIG. 1.

FIG. 3 is a diagram illustrating the external view of an example of a photographing terminal 14 illustrated in FIG. 1. The photographing terminal 14 is attached to a pole 14a, as illustrated in FIG. 3. Multiple photographing terminals 14 are installed outside of the pavilion 10, as illustrated in FIG. 1. Although FIG. 1 illustrates multiple photographing terminals 14 being installed outside of the pavilion 10, this is not restrictive. It is sufficient for one photographing terminal 14 to be installed outside of the pavilion 10. Note that one who operates a photographing terminal 14 is referred to a photographer here. The photographer can use a photographing terminal 14 to give photography instructions while viewing photography data taken by the photographing camera 13 as images, if later-described conditions are satisfied. Details regarding photography instruction will be described later. Although description will be made in the present embodiment regarding an example where people inside the pavilion 10 are children, this is not restrictive. People inside the pavilion 10 may be adults, for example. Although description will be made in the present embodiment regarding an example where the photographer is a parent of a child inside the pavilion 10, this is not restrictive. For example, the photographer may be an acquaintance of the person within the pavilion 10. Further, a person inside the pavilion 10 may exit from the pavilion exit 12 and thereafter operate the photographing terminal 14. In this case, the person who was inside the pavilion 10 becomes the photographer.

Figure 4:
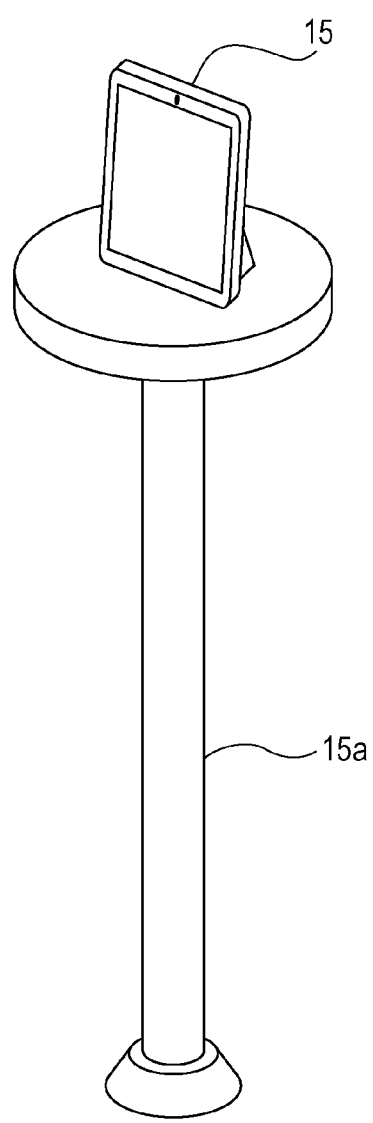
FIG. 4 is a diagram illustrating the external view of an example of an accepting terminal illustrated in FIG. 1.

FIG. 4 is a diagram illustrating the external view of an example of an accepting terminal 15 illustrated in FIG. 1. As illustrated in FIG. 4, the accepting terminal 15 is attached to a pole 15a, and one each is placed at the pavilion entrance 11 and pavilion exit 12, as illustrated in FIG. 1. The accepting terminal 15 installed at the pavilion entrance 11 detects people entering from the pavilion entrance 11, for example. The accepting terminal 15 installed at the pavilion exit 12 detects people exiting from the pavilion exit 12, for example.

The photographing camera 13, photographing terminals 14, and accepting terminals 15, are each connected by network, and are capable of exchanging necessary information with each other by communication. The photographing camera 13, photographing terminals 14, and accepting terminals 15 are each connected with a photography control server 20 via network. Details of the photography control server 20 will be described later. As a matter of course, the photographing camera 13, photographing terminals 14, accepting terminals 15, and the later-described photography control server 20, each have communication units (omitted from illustration), and use these communication units to transmit and receive necessary information to and from each other. Note that the communication unit may include a communication circuit.

In order to simplify description, the transmission of information by the communication unit of the photographing camera 13 will be referred to as the photographing camera 13 outputting information, and the reception of information by the communication unit of the photographing camera 13 will be referred to as the photographing camera 13 receiving (or acquiring) information. Information that the photographing camera 13 outputs and receives will be described in detail later.

Also, the transmission of information by the communication unit of the photographing terminal 14 will be referred to as the photographing terminal 14 outputting information, and the reception of information by the communication unit of the photographing terminal 14 will be referred to as the photographing terminal 14 receiving (or acquiring) information. Information that the photographing terminal 14 outputs and receives will be described in detail later.

Also, the transmission of information by the communication unit of the accepting terminal 15 will be referred to as the accepting terminal 15 outputting information, and the reception of information by the communication unit of the accepting terminal 15 will be referred to as the accepting terminal 15 receiving (or acquiring) information. Information that the accepting terminal 15 outputs and receives will be described in detail later.

Further, the transmission of information by the communication unit of the photography control server 20 will be referred to as the photography control server 20 outputting information, and the reception of information by the communication unit of the photography control server 20 will be referred to as the photography control server 20 receiving (or acquiring) information. Information that the photography control server 20 outputs and receives will be described in detail later.

This network includes a network corresponding to the Internet, so that photography data taken by the photographing camera 13 can be provided to a mobile terminal that the photographer owns, via the Internet. The network includes at least one of a wireless network and a wired network.

In the present embodiment, people inside the pavilion 10 are the subjects. Cards on which a barcode, a linear barcode for example, is printed, are used as identification information of the subjects, for identifying people who are subjects (hereinafter referred to as "subject ID"). This card is also referred to as "subject identification barcode card". A subject identification barcode card is given to each person who will be a subject, before entering the pavilion 10. This person holds the subject identification barcode up to the accepting terminal 15 installed at the pavilion entrance 11 before entering the pavilion 10.

The identification information of the subject may be represented using a barcode, and the subject identification barcode card may have a barcode with a physical form printed or the like. The barcode is not restricted to the above-described linear barcode, and other barcodes may be used, such as Quick Response (QR) code (a registered trademark for a type of matrix barcode), a color barcode, or the like.

Figure 5:
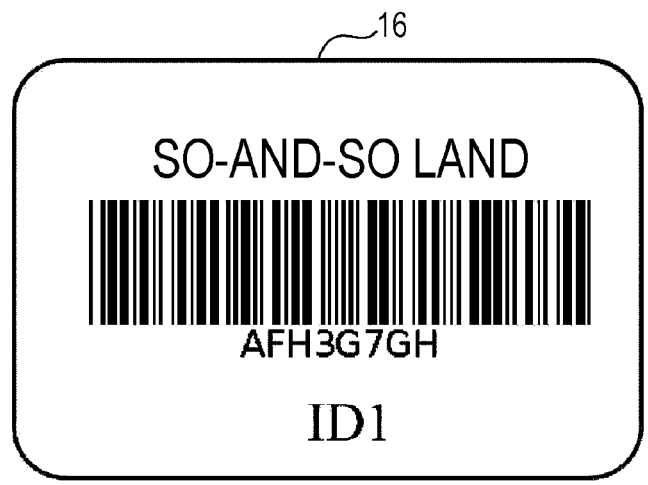
FIG. 5 is a diagram illustrating the external view of an example of a subject identification barcode card used in the photography control system according to the first embodiment of the present disclosure.

FIG. 5 is a diagram illustrating the external view of an example of the subject identification barcode card used in the photography control system 1 according to the present embodiment. A barcode indicating the subject ID is printed on the subject identification barcode card 16 illustrated in FIG. 5. The value of the barcode indicating the subject ID in FIG. 5 is "AFH3G7GH", for example. The photographer uses this subject ID to perform photography of a person having the subject identification barcode card 16 of this subject ID, and acquisition of the photography data that has been taken. Note that when multiple people are to enter the pavilion 10, the values of the subject IDs of the subject identification barcode cards 16 given to these people are each different from each other.

Referencing FIG. 1 again, a person who is to be a subject holds the subject identification barcode card 16 up to the accepting terminal 15 installed at the pavilion entrance 11 when entering the pavilion 10, upon which the accepting terminal 15 performs later-described entry processing to the pavilion 10. Entry processing includes, for example, processing of reading the barcode printed on the subject identification barcode card 16 and detecting (or acquiring) the value that the barcode indicates (subject ID), and processing of outputting the detected subject ID to the photography control server 20 as subject information. The subject information, which is output from the accepting terminal 15 installed at the pavilion entrance 11, is referred to as first subject information.

When exiting from the pavilion 10, a person who is a subject holds the subject identification barcode card 16 up to the accepting terminal 15 installed at the pavilion exit 12, upon which later-described exit processing from the pavilion 10 is performed by the accepting terminal 15. Exit processing includes, for example, processing of reading the barcode printed on the subject identification barcode card 16 and detecting (or acquiring) the subject ID, and processing of outputting the detected subject ID as subject information. The subject information, which is output from the accepting terminal 15 installed at the pavilion exit 12, is referred to as second subject information.

Description will be made by way of an example where the person who is to be the subject is a child, and the photographer is the parent of this child. In a case where there is at least one person in the pavilion 10, which is the photography spot, who has held the subject identification barcode card 16 up to the accepting terminal 15 and entered, the photographing camera 13 starts photography or continues photography. When there is not even one person left that has entered the photography spot, the photographing camera 13 stops (or ends) photography. Upon receiving an instruction for photography, for example, the photographing camera 13 may start photography. Upon receiving an instruction to stop photography, for example, the photographing camera 13 may stop photography.

The photography data taken by the photographing camera 13 can be later clipped as photography data (still image data) or clipped as moving image data. However, this does not mean that all such data is presented to the photographer as it is. By the photographer inputting the subject ID of the subject identification barcode card 16 for the child of the photographer to the photographing terminal 14, the photographing terminal 14 receives, of one or more photography data sets taken by the photographing camera 13, only photography data of the time period where the child of the photographer was in the pavilion 10. The photographing terminal 14 displays photography data of the time period where the child was in the pavilion 10, on a display. The photography data can thus view the received photography data. The photographer can further operate the photographing terminal 14 to further input an instruction to acquire photography data that the photographer wants out of the photography data displayed on the display (also referred to as "photography instruction"), and thus acquire a still image of moving image of the child who is the subject.

For example, a case will be assumed where the photographing camera 13 has repeatedly taken photographs of people in the pavilion 10 at a predetermined interval (e.g., every 1/60 seconds), from 10:10 AM to 10:35 AM, thereby yielding multiple sets of photography data. This means that at least one person serving as a subject has been in the pavilion 10 from 10:10 AM to 10:35 AM. The multiple sets of photography data taken by the photographing camera 13 from 10:10 AM to 10:35 AM is temporarily stored in first memory of the photography control server 20 (omitted from illustration) which will be described later, for example.

Further, the multiple sets of photography data are temporarily stored in the first memory of the photography control server 20 in a manner where the subject ID of this person and information relating to the time over which this person was in the pavilion 10 are associated, so that photography data of the time period where the person serving as the subject was in the pavilion 10 can be extracted therefrom. The subject ID of the person is the value indicated by the barcode printed on the subject identification barcode card 16 that this person has. The person of the subject ID is the person having the subject identification barcode card 16 on which is printed the barcode, the value thereof being the subject ID.

For example, in a case where the person of subject ID1 is a child, and this child has been in the pavilion 10 from 10:15 AM to 10:20 AM, and the photographer who is the parent of this child inputs the subject ID1 to the photographing terminal 14, the input subject ID1 is output to the photography control server 20 as subject identification information. The photography control server 20 extracts one or more sets of photography data associated with the subject ID indicated by the subject identification information, out of the one or more sets of photography data temporarily saved in the first memory, and outputs to the photographing terminal 14. The extracted photography data is photography data taken in the time period over which the person of the subject ID was in the pavilion 10. Although it is sufficient for the number of sets of photography data extracted to be one or more, a case where multiple sets of photography data are extracted will be described.

The photographing terminal 14 displays the multiple sets of photography data that have been received on a display (omitted from illustration) in the order of the time of photography, for example. Thus, the photographer operating the photographing terminal 14 can view the photography data displayed on the display. The photographer viewing the photography data further operates the photographing terminal 14, and instructs acquisition of photography data that the photographer wants, out of the photography data displayed on the display. This instruction (photography instruction) is output to the photography control server 20. The photography control server 20 that has received the photography instruction extracts the instructed one or more sets of photography data from the multiple sets of photography data temporarily saved, associates the extracted photography data with the subject ID indicated by the subject identification information and the photography time, and saves in second memory (omitted from illustration).

For example, the photographer can acquire photography data taken at 10:17 AM when the child having the card with subject ID1 was in the pavilion 10, but cannot acquire photography data taken at 10:13 AM when the child having the subject identification barcode card 16 with subject ID1 was not in the pavilion 10. The reason is that the subject ID1 is not associated with photography data taken at 10:13 AM. As a matter of course, the photographer cannot acquire photography data at 10:40 AM when the photographing camera 13 was not performing photography. The reason is that such photography data is not temporarily saved in the photography control server 20 to begin with.

Also, the photography control server 20 may output photography data, regarding which a photography instruction has been given, to a cloud (omitted from illustration) server dedicated to subject IDs, on the Internet, for example. This cloud server saves the photography data in memory (omitted from illustration). The photographer may operate his/her own mobile terminal (omitted from illustration) to access the memory of the cloud server for example, and thus acquire photography data of photographs of the child of the photographer.

The photographer may operate his/her own mobile terminal to access the photography data associated with the subject ID1 saved in the second memory of the photography control server 20, and thus acquire photography data of photographs of the child of the photographer, for example, from the photography control server 20. In a case of having received the subject ID1 form the mobile terminal, the photography control server 20 may permit access to the photography data associated with the subject ID1. The mobile terminal may display acquired photography data on a display (omitted from illustration) of the mobile terminal, save the photography data in memory (omitted from illustration) of the mobile terminal, and so forth.

Thus, in the photography control system according to the present embodiment, the photographing camera 13 photographs the photography spot by the child of the photographer notifying the photography control system 1 (more specifically, the photography control server 20) that he/she (the subject) is in the pavilion 10 that is the photography spot, using the subject identification barcode card 16. Accordingly, one or more sets of photography data that the photographing camera 13 has taken may include photography data including the person who is the subject at the photography spot. The photographer can thus acquire photography data of a desired timing, out of the one or more sets of photography data taken by the photographing camera 13 at the time period during which the person serving as a subject was at the photography spot.

Note that if the mobile terminal that the photographer owns is capable of providing functions equivalent of the functions provided by the photographing terminal 14, the photography control system according to the present embodiment may use this mobile terminal as the photographing terminal 14. Functions provided by the photographing terminal 14 may include, for example, a function of inputting the subject ID of the child of the photographer and outputting the input subject ID to the photography control system 1, a function of instructing acquisition of photography data, and so forth.

Figure 6:
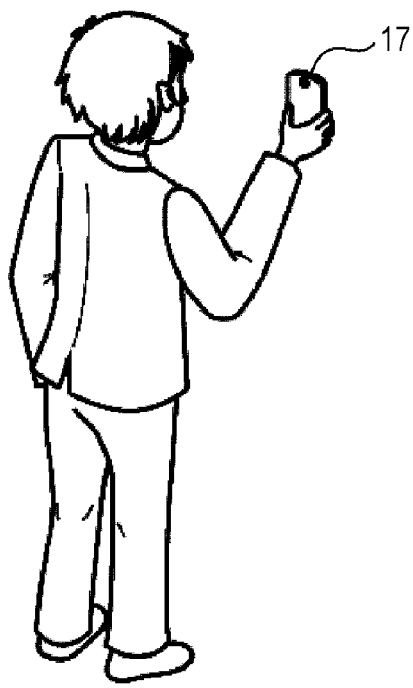
FIG. 6 is a diagram illustrating an example of how a photographer would perform photography using a mobile terminal instead of the photographing terminal illustrating in FIG. 1.

FIG. 6 is a diagram illustrating an example of how a photographer would perform photography using a personally-owned mobile terminal such as a smartphone or the like, as the photographing terminal 14. The photographer owns a mobile terminal 17, as illustrated in FIG. 6. For example, the photographer installs a program having functions equivalent to those of the photographing terminal 14 in the mobile terminal 17, and inputs the subject ID of the card of a person serving as a subject to the program. In this case, functions equivalent to those of the photographing terminal 14 can be used via the Internet via the mobile terminal 17 of the photographer.

1-2. Configuration

Figure 7:
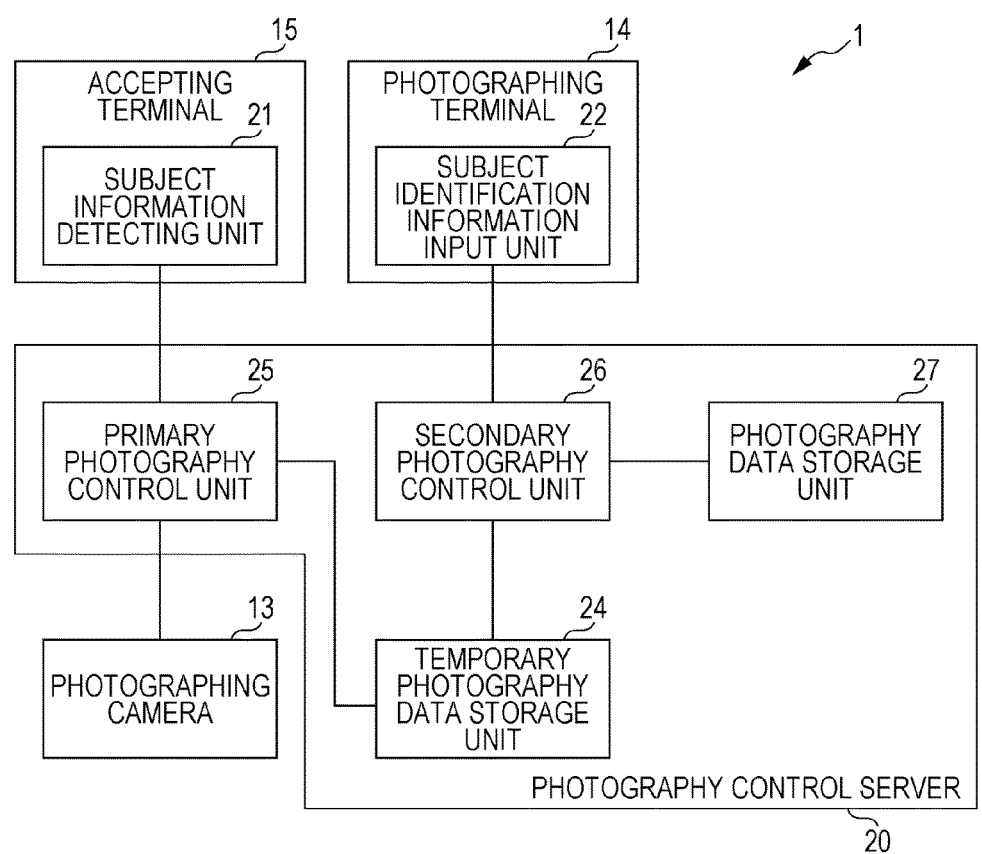
FIG. 7 is a block diagram illustrating an example of the configuration of the photography control system according to the first embodiment of the present disclosure.

Next, the configuration of the photography control system according to the present embodiment will be described. FIG. 7 is a block diagram illustrating an example of the configuration of the photography control system according to the present embodiment. The photography control system 1 illustrated in FIG. 7 has the photographing camera 13, photographing terminal 14, accepting terminal 15, and photography control server 20. The accepting terminal 15 includes a subject information detecting unit 21, and the photographing terminal 14 includes a subject identification information input unit 22. The photography control server 20 includes a temporary photography data storage unit 24, a primary photography control unit 25, a secondary photography control unit 26, and a photography data storage unit 27.

Although the photography control system 1 uses the accepting terminal 15 installed at the pavilion entrance 11 and the accepting terminal 15 installed at the pavilion exit 12, i.e., two accepting terminals 15, FIG. 7 only illustrates one accepting terminal 15, to simplify the drawing. Further, the photographing camera 13, photographing terminals 14 and accepting terminals 15, and photography control server 20 are connected via network through certain communication units to be able to exchange necessary information with each other by communication, but the communication units of each have been omitted from illustration to simplify the drawing.

The hardware configuration of the photography control server 20 is that of a computer having a processor such as a central processing unit (CPU), memory storing programs, and a communication circuit. The processor executes programs, whereby the computer functions as the photography control server 20.

The subject identification information input unit 22 of the photographing terminal 14 has a photography button built in. Note, however, that the photography button has been omitted from illustration, to simplify the drawing.

The accepting terminal 15 includes the subject information detecting unit 21. Examples of the subject information detecting unit 21 include a barcode reader. The barcode reader reads a barcode printed on the subject identification barcode card 16, and detects (or acquires) the value (subject ID) that the barcode indicates. The accepting terminal 15 outputs the acquired subject ID to the photography control server 20 as subject information.

The accepting terminal 15 may include a timer (omitted from illustration). In this case, the accepting terminal 15 may identify the time (detection time) at which the subject ID was detected by the subject information detecting unit 21, using the timer, and output the subject information and the detection time of identification to the photography control server 20.

When outputting the subject information to the photography control server 20, the accepting terminal 15 may transmit information for identifying the accepting terminal 15 along with the subject information. At least one of the detection time and the information for identifying the accepting terminal 15 may be output included in the subject information. The subject information and detection time that the photography control server 20 has received is output to the primary photography control unit 25.

The hardware configuration of the accepting terminal 15 is that of a computer having a processor such as a CPU, memory storing programs, a communication circuit, and a barcode reader. The processor executes programs, whereby the computer functions as the accepting terminal 15.

As described above, the accepting terminal 15 is installed at each of the pavilion entrance 11 and pavilion exit 12 in the present embodiment. When a child entering the pavilion 10 holds the subject identification barcode card 16 up to the accepting terminal 15 at the pavilion entrance 11, the accepting terminal 15 acquires the subject ID. This accepting terminal 15 then outputs this to the photography control server 20 as subject information. The photography control server 20 outputs the received subject information to the primary photography control unit 25. Thus, the primary photography control unit 25 can receive (or acquire) subject information from the accepting terminal 15 at the pavilion entrance 11.

The subject information output from the accepting terminal 15 at the pavilion entrance 11 also is information indicating that the person having the subject identification barcode card 16 of the subject ID that the subject information indicates has entered the pavilion 10, i.e., that this person is in the pavilion 10. In description hereinafter, the person having the subject identification barcode card 16 of the subject ID may also be referred to as the person of the subject ID.

When a person exiting the pavilion 10 holds the subject identification barcode card 16 up to the accepting terminal 15 at the pavilion exit 12, the accepting terminal 15 acquires the subject ID. This accepting terminal 15 then outputs this subject ID to the photography control server 20 as subject information. The photography control server 20 outputs the subject information received from the accepting terminal 15 at the pavilion exit 12 to the primary photography control unit 25. Accordingly, the primary photography control unit 25 can receive (or acquire) the subject information from the accepting terminal 15 at the pavilion exit 12. The subject information output from the accepting terminal 15 at the pavilion exit 12 indicates that the person of the subject ID that the subject information indicates has exited from the pavilion 10.

Upon receiving subject information from the subject information detecting unit 21 that the subject has entered/exited the photography spot, the primary photography control unit 25 performs photography control of the photographing camera 13. For example, in a case of receiving subject information from the accepting terminal 15 at the pavilion entrance 11 in a state where there is not a single person serving as a subject at the photography spot, the primary photography control unit 25 outputs an instruction to start photography by the photographing camera 13 (referred to as a "start photography instruction"). The photography control server 20 outputs the start photography instruction to the photographing camera 13. Upon receiving (or acquiring) this start photography instruction, the photographing camera 13 starts photography. Each time photography is performed, the photographing camera 13 associates the photography data obtained thereby with photography time of the photography data. Description will be made with the understanding that the photography time is associated with the photography data, although this is not mentioned in particular in the following description.

The photographing camera 13 successively outputs the taken photography data to the photography control server 20. The primary photography control unit 25 successively temporarily stores the photography data received (or acquired) by the photography control server 20 in the temporary photography data storage unit 24. The photography data thus is successively added to the temporary photography data storage unit 24.

The primary photography control unit 25 also identifies the time at which the subject information was received (start time) using a timer (omitted from illustration) that the photography control server 20 has. The start time is also referred to as first time. In a case where the primary photography control unit 25 receives subject information and detection time (the time at which the subject ID that the subject information indicates was detected) output from the accepting terminal 15 installed at the pavilion entrance 11, this detection time may be used as the start time. The reason is that the detection time and the start time can be viewed as being the same time.

The start time for the subject ID corresponding to the person entering the pavilion 10 first may be used as a time at which the primary photography control unit 25 instructs starting of photography, or a time at which the photographing camera 13 actually starts photography. The reason is that the above-described detection time, time of receiving the subject information, time of instructing starting of photography, and time of starting photography, can all be viewed as being the same time. The primary photography control unit 25 temporarily saves, in the temporary photography data storage unit 24, information associating the subject ID and start time information with the photography data as a table. The start time information indicates the start time. The start time information is also referred to as first time information.

Upon receiving subject information from the accepting terminal 15 at the pavilion exit 12, the primary photography control unit 25 uses a time (omitted from illustration) that the photography control server 20 has to identify the time at which the subject information was received (end time). The end time is also referred to as a second time. The primary photography control unit 25 has received the same subject ID from the accepting terminal 15 at the pavilion entrance 11 as the subject ID indicating the subject information. Accordingly, information relating to the subject ID is already saved in a table in the temporary photography data storage unit 24.

The primary photography control unit 25 references the table in the temporary photography data storage unit 24, and identifies the same subject ID as the subject ID indicating the subject information that has been received from the accepting terminal 15 at the pavilion exit 12. End time information, indicating the end time identified as the end time for the identified subject ID, is then saved in the table. The end time information is also referred to as second time information. Accordingly, the subject ID, the start time indicated by the start time information, and the end time indicated by the end time information are associated with the photography data, using the table.

Saving this information in a table in the temporary photography data storage unit 24 has the following advantages. For example, in the case of the above-described identified subject ID, a time period identified by the start time and end time associated with this subject ID is the time period over which the person of the subject ID was in the pavilion 10 that serves as the photography spot. Accordingly, the target of photography for the photographing camera 13 during this time period is the person of the subject ID. This means that the target of photography for the photographing camera 13 for the duration from the start time to the end time corresponding to the subject ID is the person of the subject ID. In other words, of the multiple sets of photography data stored in the temporary photography data storage unit 24, images of the person of the subject ID may be included in images of photography data of which the photography time is in the above time period. Accordingly, once the subject ID is identified, photography data taken during the time period over which the person of the subject ID was in the pavilion 10 can be identified out of the multiple sets of photography data temporarily saved in the table in the temporary photography data storage unit 24, by referencing this table.

In a case where the primary photography control unit 25 receives subject information and detection time (the time at which the subject ID that the subject information indicates was detected) output from the accepting terminal 15 installed at the pavilion exit 12, this detection time may be used as the end time. The reason is that the detection time and the end time can be viewed as being the same time.

Also, in a case of receiving subject information from the accepting terminal 15 installed at the pavilion exit 12, the primary photography control unit 25 further determines whether or not there is another person serving as a subject at the photography spot. If there is no other person serving as a subject at the photography spot, the primary photography control unit 25 outputs an instruction to the photographing camera 13 to stop photography (referred to as a "stop photography instruction"). The photography control server 20 outputs the stop photography instruction to the photographing camera 13. Upon receiving this stop photography instruction, the photographing camera 13 stops photography. The end time of the subject ID corresponding to the person exiting the pavilion 10 last may be the time at which the primary photography control unit 25 instructs stopping of photography, or the time at which the photographing camera 13 actually stops photography.

The primary photography control unit 25 centrally manages one or more sets of photography data, taken from the start time of the subject ID corresponding to the person first entering the pavilion 10 and the end time of the subject ID corresponding to the person leaving the pavilion 10 last, in the temporary photography data storage unit 24. Thus, the primary photography control unit 25 may causes the photographing camera 13 to perform photography as long as there is at least one person serving as a subject at the photography spot, and when there is no person serving as a subject remaining at the photography spot, the primary photography control unit 25 may cause the photographing camera 13 to stop photography.

The primary photography control unit 25 also temporarily stores the photography data taken by the photographing camera 13 in the temporary photography data storage unit 24. The primary photography control unit 25 also adds the subject ID indicating the subject information that has been received to the table in the temporary photography data storage unit 24. This enables which time period of photography data has which subject ID person as the target of photography to be confirmed at a later time by referencing the table.

Control of photography including starting and stopping of photography is performed at the photographing camera 13, under the control of the primary photography control unit 25. For example, the photographing camera 13 performs all photography in still images, taking 60 frames of still images per second, for example. The photographing camera 13 associates the photography time at the time of taking the still images with the still images.

The photography data that has been taken is successively output to the photography control server 20. The photography data that the photography control server 20 has received is temporarily saved in the temporary photography data storage unit 24, under control of the primary photography control unit 25. Alternatively, the photographing camera 13 may instruct saving of the photography data. In this case, this instruction is output to the primary photography control unit 25. The primary photography control unit 25 may temporarily save the photography data in the temporary photography data storage unit 24 in accordance with the received instruction.

The temporary photography data storage unit 24 is a memory device (first memory) that temporarily saves photography data, e.g., image data such as still images or moving images, taken by the photographing camera 13. The temporary photography data storage unit 24 is realized by non-volatile memory such as Ferroelectric Random Access Memory (FeRAM), for example, and has functions of temporary storing photography data.

The photographing terminal 14 includes the subject identification information input unit 22 and a communication unit (omitted from illustration). The photographing terminal 14 may also have a display that is omitted from illustration. The subject identification information input unit 22 has a function of externally acquiring identification information identifying a subject (subject ID). The subject identification information input unit 22 is a keyboard, touch panel, or the like, for example, and acquires a subject ID input by the keyboard or touch panel or the like being operated. This configuration enables the subject identification information input unit 22 to externally acquire subject IDs. The subject identification information input unit 22 outputs an acquired subject ID as subject identification information. The photographing terminal 14 outputs this subject identification information to the photography control server 20. The photography control server 20 outputs the received subject identification information to the secondary photography control unit 26.

For example, the subject identification information input unit 22 is provided as a subject ID input function embedded in a terminal which multiple photographers take turns using, such as the photographing terminal 14 illustrated in FIG. 3. Each time a different photographer uses the photographing terminal 14, the touch panel of the photographing terminal 14 is operated by the photographer inputting the subject ID of the subject. Alternatively, in a case where the subject identification information input unit 22 is embedded as a part of photography functions of the individually-owned mobile terminal 17 illustrated in FIG. 6, a barcode reading function of a dedicated program on the mobile terminal 17 may be used to photograph the barcode on the subject identification barcode card 16 before the subject enters the pavilion 10, and thus have the subject ID acquired.

The subject identification information input unit 22 further functions as n input unit for the photographer to input photography instructions and the like. The subject identification information input unit 22 outputs photography instructions that have been input. Upon receiving a photography instruction from a photographer, the subject identification information input unit 22 outputs a photography instruction. The photographing terminal 14 outputs the photography instruction from the subject identification information input unit 22 to the photography control server 20. The photography control server 20 outputs the received photography instruction to the secondary photography control unit 26. The secondary photography control unit 26 extracts one or more sets of photography data regarding which a photography instruction has been given from the multiple sets of photography data temporarily saved in the temporary photography data storage unit 24, in accordance with the photography instruction that has been received, and saves the extracted photography data in the photography data storage unit 27.

For example, as the photographer views images of multiple sets of photography data taken by the photographing camera 13, which are displayed on a display of the photographing terminal 14 or mobile terminal 17, the photographer presses a button for photography provided to the subject identification information input unit 22 of the photographing terminal 14, or touches a button that a photography program running on the mobile terminal 17 displays, at the timing at which photography data which the photographer wants to acquire is displayed. This causes the subject identification information input unit 22 to output a photography instruction. The photography instruction may include information such as the subject ID and the photography time of the photography data that was displayed at the timing of the instruction, for example. The photographing terminal 14 outputs to the photography control server 20 the photography instruction that was output from the subject identification information input unit 22.

The photography control server 20 outputs the received photography instruction to the secondary photography control unit 26. Upon receiving the photography instruction, the secondary photography control unit 26 extracts the instructed photography data from one or more sets of photography data temporarily saved in the temporary photography data storage unit 24, and saves the extracted photography data in the photography data storage unit 27 in a manner associated with the subject ID. Thus, the photographer can give a photography instruction and acquire photography data displayed on the display at the timing of the instruction.

Note that the photography data displayed on the photographing terminal 14 or mobile terminal 17 of the photographer is only photography data of the time period over which the person of the subject ID was at the photography spot, out of the multiple sets of photography data temporarily saved in the temporary photography data storage unit 24. The secondary photography control unit 26 extracts photography data corresponding to an image displayed on the display of the photographing terminal 14 or the mobile terminal 17 at the point of the photographer giving the photography instruction, out of the multiple sets of photography data temporarily saved in the temporary photography data storage unit 24, and saves this as photography data of the subject in the photography data storage unit 27, in a manner associated with the subject ID.

The photography data storage unit 27 is memory (second memory) that saves photography data extracted by the secondary photography control unit 26. The photography data storage unit 27 is realized by non-volatile memory such as a hard disk for example, and has functions of saving photography data. Although a configuration is illustrated in FIG. 7 where the photography control server 20 includes the photography data storage unit 27, this is not restrictive. For example, the photography data storage unit 27 may be included in a cloud server (omitted from illustration) that is physically separate from the photography control server 20. In this case, the photography control server 20 and the cloud server are connected by a network including the Internet, with the photography data extracted by the secondary photography control unit 26 and information such as a subject ID associated with the photography data being output to the cloud server.

It is sufficient for the cloud server to save photography data received from the photography control server 20 in the photography data storage unit 27. Alternatively, an arrangement may be made where, only upon receiving the subject ID from the mobile terminal of the photographer and the received subject ID matching the subject ID associated with the photography data, will the cloud server extract the photography data from the photography data storage unit 27 and output to the mobile terminal of the photographer. Thus, only the photographer that knows the subject ID can acquire photography data via the Internet.

The above-described subject information detecting unit 21, primary photography control unit 25, subject identification information input unit 22, and secondary photography control unit 26, function by processors executing programs stored in memory, thereby controlling the above-described functional units.

1-3. Operations

Next, operations of the photography control system 1 illustrated in FIG. 7 will be described. The operations of the photography control system 1 are executed by a combination of primary photography processing and secondary photography processing.

1-3-1. Primary Photography Processing

Figure 8:
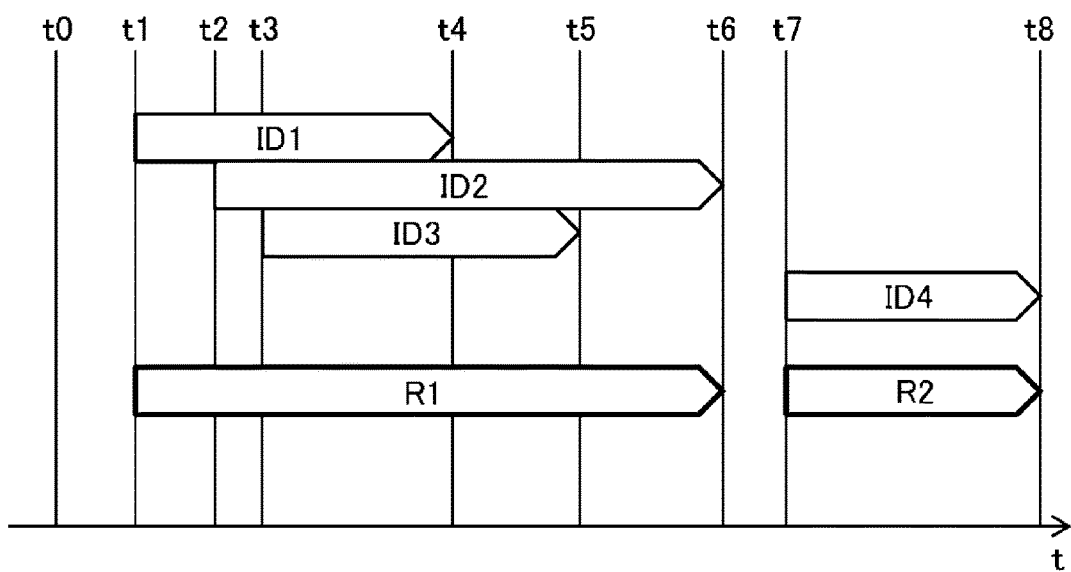
FIG. 8 is a time chart illustrating an example of the flow of time in primary photography processing in the photography control system illustrated in FIG. 7.

First, operations of primary photography processing of the photography control system 1 will be described. FIG. 8 is a time chart illustrating an example of the flow of time in the primary photography processing of the photography control system 1. This time chart illustrates the time up to a subject ID that is the same as the subject ID acquired by the subject information detecting unit 21 that the accepting terminal 15 at the pavilion entrance 11 has, being acquired by the subject information detecting unit 21 of the accepting terminal 15, and the time from the primary photography control unit 25 instructing the photographing camera 13 to start photography up to instructing stopping of photography.

In the following description the person of the subject ID may also be referred to as the subject of the subject ID. Also, a person may be referred to as a subject. For example, the subject of the subject ID1 holds the subject identification barcode card 16 up to the accepting terminal 15 at the pavilion entrance 11 at time t1, and enters the pavilion 10 that is a photography spot. Thereafter, the subject of the subject ID1 holds the same subject identification barcode card 16 up to the subject information detecting unit 21 that the accepting terminal 15 at the pavilion exit 12 has at time t4, and exits the pavilion 10. The time bar ID1 from time t1 to time t4 represents the time period that the subject of the subject ID1 was in the pavilion 10. The time bar R1 from time t1 to time t6 indicates photography data R1 taken from instruction to start photography by the primary photography control unit 25 at time t1 till instruction to stop photography by the primary photography control unit 25 at time t6.

In the same way, the time bar ID2 indicates that the time period over which the subject of the subject ID2 was in the pavilion 10 was from time t2 to time t6, and the time bar ID3 indicates that the time period over which the subject of the subject ID3 was in the pavilion 10 was from time t3 to time t5. The time bar ID4 further indicates that the time period over which the subject of the subject ID4 was in the pavilion 10 was from time t7 to time t8, and the time bar R2 indicates the photography data R2 taken from time t7 to time t8.

Figure 9:
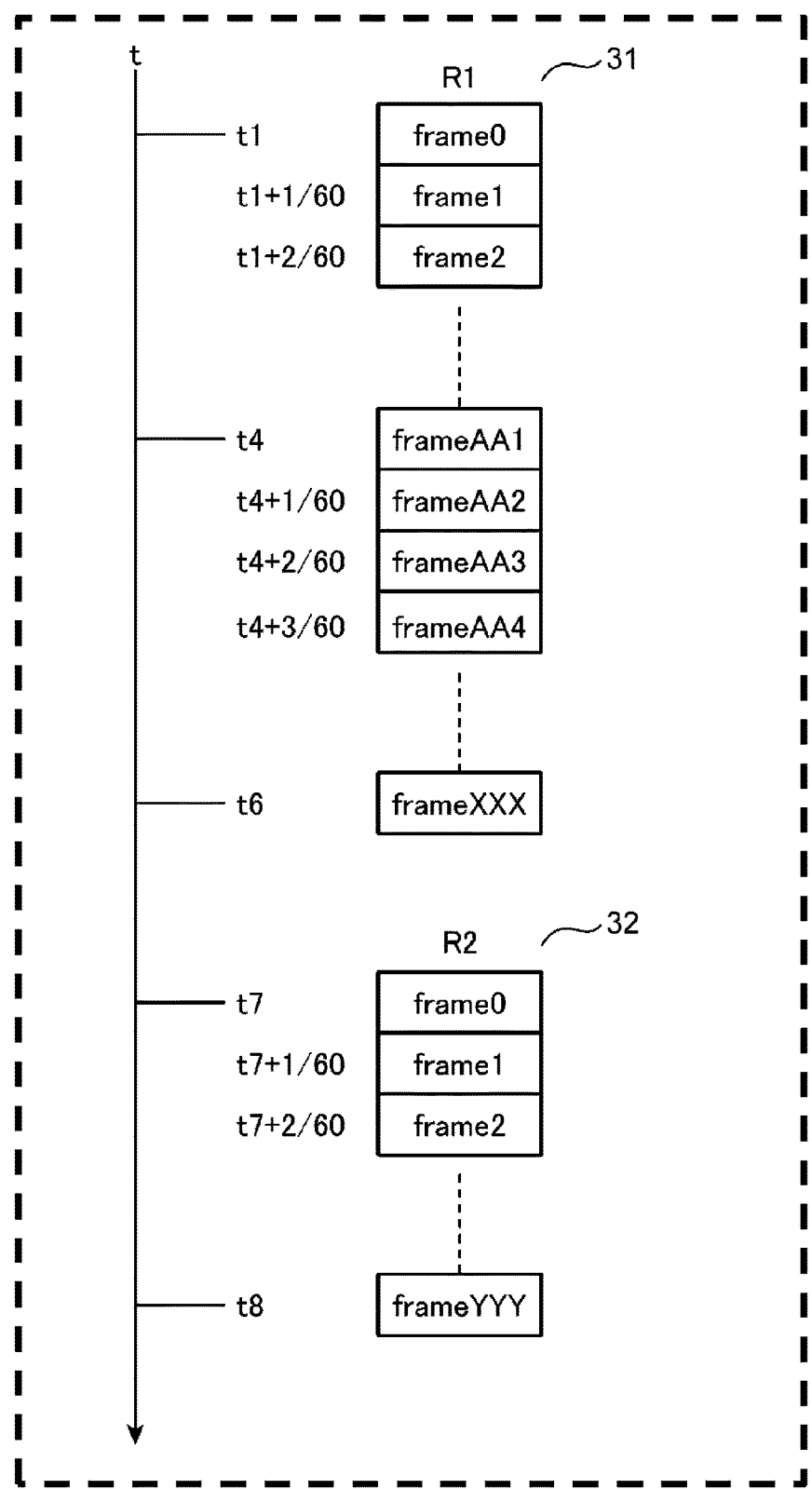
FIG. 9 is a conceptual diagram illustrating an example of photography data taken in primary photography processing in the photography control system illustrated in FIG. 7.

FIG. 9 is a conceptual diagram illustrating an example of photography data taken in the primary photography processing of the photography control system 1 illustrated in FIG. 7. The photography data illustrated in FIG. 9 indicates photography data 31 corresponding to the photography data R1 and photography data 32 corresponding to the photography data R2 taken by the photographing camera 13, in response to the photography instruction from the primary photography control unit 25. Since all photography is performed as still images and 60 frames are taken per second in the present embodiment, image data (photography data) corresponding to one still image, and photography time associated with this still image, are saved in the temporary photography data storage unit 24 every 1/60 second. Multiple sets of photography data are temporarily saved in the temporary photography data storage unit 24 in this example.

The photography data 31 in FIG. 9 represents the photography data R1. The frame0, frame1, frame2, and so on through frameXXX, are each photography data corresponding to a still image taken by the photographing camera 13, and these are collectively called photography data R1.

Photography data is image data of still images, as described earlier. The time at which the primary photography control unit 25 gives the photography start instruction at time t1 as described above and the photographing camera 13 receives this photography start instruction and first performs photography, is the photography time of frame0. Note that the time at which the primary photography control unit 25 gives the photography start instruction and the photography time of frame0 can be viewed as being the same time, so the photography time of frame0 will be described as being time t1 hereinafter, for the sake of brevity of description.

Here, frame0 represents image data taken at time t1, frame1 represents image data taken at time t1+1/60 seconds, and frameXXX represents image data taken at time t6, Thus, the photography time of photography data taken immediately before the primary photography control unit 25 gives a photography stop instruction at time t6 as described above and the photographing camera 13 receives this photography stop instruction and stops photography, is the photography time of frameXXX. Accordingly, although there is difference between the photography time of frameXXX and time t6, these can be viewed as being the same time, so the photography time of frameXXX is described as being time t6. The photography data 32 represents the photography data R2.

FIG. 10A is a diagram illustrating an example of a table managing correlation between subject IDs of subjects that are photography targets of the photographing camera 13 and photography data, in the primary photography processing of the photography control system 1 illustrated in FIG. 7. FIG. 10A illustrates the content of the table saved in the temporary photography data storage unit 24 at the point of time t4 in FIG. 8.

The table in FIG. 10A indicates which of the photography data included in the photography data R1 has which subject as a photography target. The data corresponding to this table is temporarily saved in the temporary photography data storage unit 24 along with the photography data. For example, the subject of the subject ID1 is included in the photography data taken from in the period from time t1 to time t4 in the photography data included in the photography data R1, as illustrated in FIG. 10A, for example. In other words, this indicates that the subject of subject ID1 is a photography target of the photographing camera 13 in the period from time t1 to time t4, i.e., that the subject of subject ID1 is in the pavilion 10 that is the photography spot.

This also indicates that the time period where the subject of the subject ID2 is a photography target starts from time t2, but the end time for subject ID2 is not entered yet. This means that the subject of subject ID2 is still at the photography spot at time t4. Similarly, this indicates that the subject of subject ID3 is at the photography spot from time t3.

For example, only the subject of subject ID1 is a photography target of the photographing camera 13 over the time from time t1 to time t2. During time from time t2 to time t3, the subject of subject ID2 also is a photography target of the photographing camera 13, in addition to the subject of subject ID1. The subject of subject ID3 further is a photography target of the photographing camera 13, in addition to the subject of subject ID1 and the subject of subject ID2. Thus, this indicates that the subjects of subject ID1 through subject ID3 each are photography targets in the photography data taken from time t3 to time t4, for example.

FIG. 11 is a diagram illustrating an example of a table managing correlation between subject IDs and photography data, in the primary photography processing in the photography control system 1 illustrated in FIG. 7. FIG. 11 illustrates the content of the table saved in the temporary photography data storage unit 24 at time t8 in FIG. 8, after time has elapsed from time t4 in FIG. 10A.

The table illustrated in FIG. 11 indicates that a time t6, the state in the pavilion 10 is that there is not a single person to serve as a subject, and photography by the photographing camera 13 has stopped. That is to say, the table illustrated in FIG. 11 indicates that photography by the photographing camera 13 has stopped at time t6. This also indicates that photography data of the subject of subject ID4 regarding which photography was newly started at time t7 is photography data R2 that is separate from the photography data R1, and photography has been stopped at time t8.

Figure 12:
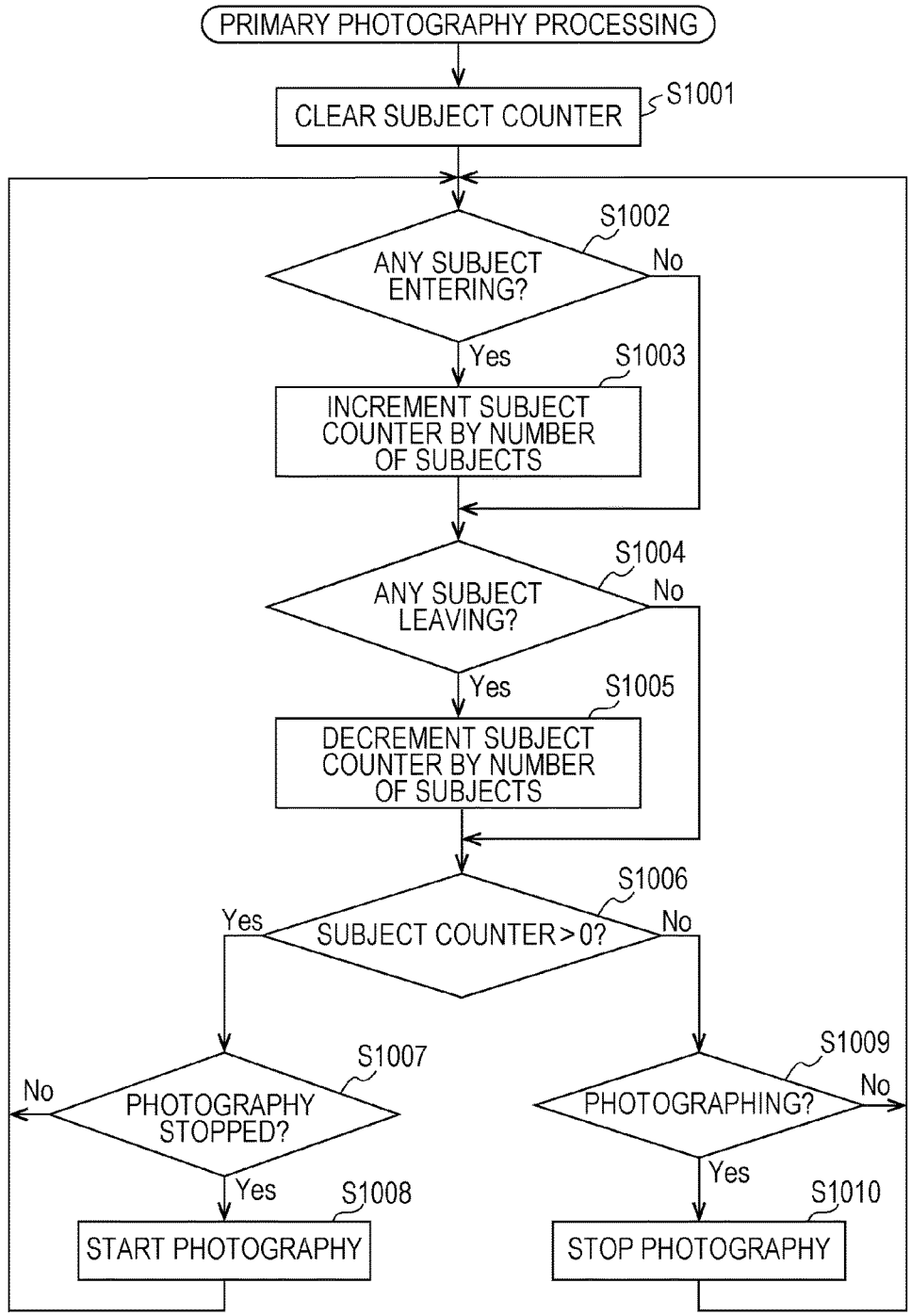
FIG. 12 is a flowchart illustrating an example of procedures of primary photography processing in the photography control system illustrated in FIG. 7.

FIG. 12 is a flowchart illustrating an example of procedures of the primary photography processing in the photography control system 1 illustrated in FIG. 7. When the photography control system 1 starts the primary photography processing, first, the primary photography control unit 25 sets the value of an internal subject counter to 0 (S1001). When the value of the subject counter is 0, this means that there is not a single person in the pavilion 10 serving as a subject, i.e., that there is not one person who has held up the subject identification barcode card 16 and entered the pavilion 10. Normally, this processing needs to be prepared before opening the pavilion 10.

Next, the primary photography control unit 25 determines whether or not there is a subject entering the pavilion 10 (step S1002). For example, upon detecting a subject ID of a new subject, the subject information detecting unit 21 of the accepting terminal 15 at the pavilion entrance 11 outputs this subject ID as subject information. This subject information is output to the primary photography control unit 25, as described earlier. Thus, the primary photography control unit 25 determines whether or not there is a subject entering the pavilion 10 by checking whether or not subject information has been received from the accepting terminal 15 at the pavilion entrance 11 in step S1002. In a case where no subject information has been received from the accepting terminal 15 at the pavilion entrance 11, the primary photography control unit 25 determines that there is a subject entering the pavilion 10 (Yes in step S1002), and saves information associating the subject ID indicated by the subject information and the time at which the subject information was received (start time) in the temporary photography data storage unit 24 as a table. Subsequently, the flow advances to step S1003.

In step S1003, the primary photography control unit 25 increments the value of the subject counter by a value corresponding to the number of subject information sets received. In a case where there is only one accepting terminal 15 at the pavilion entrance 11, the value by which the value of the subject counter is incremented will always be 1. However, in a case where multiple accepting terminals 15 are installed at the pavilion entrance 11, the primary photography control unit 25 may receive subject information from these accepting terminals 15 at the same time. In this case, the subject counter may be incremented by a number corresponding to the number of subject information sets received.

On the other hand, in a case where the primary photography control unit 25 determines in step S1002 that no subject is entering the pavilion 10 (No in step S1002), i.e., no subject information has been received, the flow advances to S1004.

Next, in step S1004, the primary photography control unit 25 determines whether or not there is a subject leaving the pavilion 10. For example, upon detecting a subject ID of a subject, the subject information detecting unit 21 of the accepting terminal 15 at the pavilion exit 12 outputs this subject ID as subject information. This subject information is output to the primary photography control unit 25, as described earlier. Thus, the primary photography control unit 25 determines whether or not there is a subject exiting the pavilion 10 by checking whether or not subject information has been received from the accepting terminal 15 at the pavilion exit 12 in step S1004. In a case where subject information has been received, determination is made that there is a subject exiting from the pavilion 10 (Yes in step S1004), the primary photography control unit 25 references the table in the temporary photography data storage unit 24, and identifies the same subject ID as a subject ID received from the accepting terminal 15 of the pavilion exit 12. The time at which the subject information was received is then saved in the table as the end time of the identified subject ID. Subsequently, the flow advances to step S1005.

In step S1005, the primary photography control unit 25 decrements the value of the subject counter by a value corresponding to the number of subject information sets received. In a case where there is only one accepting terminal 15 at the pavilion exit 12, the value by which the value of the subject counter is decremented will always be 1. However, in a case where multiple accepting terminals 15 are installed at the pavilion exit 12, the primary photography control unit 25 may receive subject information from these accepting terminals 15 at the same time. In this case, the subject counter may be decremented by a number corresponding to the number of subject information sets received.

The number of people who have entered the pavilion 10 at the point of performing the processing so far is the value of the subject counter. That is to say, at the above-described point in time, the number of subjects serving as photography targets at the photography spot of the photographing camera 13, i.e., the number of subject IDs, is finalized.

Next, the primary photography control unit 25 checks whether or not the value of the subject counter is greater than 0. That is to say, the primary photography control unit 25 checks whether or not there is a subject serving as a photography target at the photography spot (step S1006). In a case where the value of the subject counter is greater than 0, determination is made that there is a subject at the photography spot, and the flow advances to step S1007. On the other hand, in a case where the value of the subject counter is 0, determination is made that there is not a single subject at the photography spot, and the flow advances to step S1009.

In step S1007, the primary photography control unit 25 determines whether or not photography by the photographing camera 13 is stopped. In a case where photography by the photographing camera 13 is stopped, the primary photography control unit 25 instructs the photographing camera 13 to start photography (step S1008). The instruction to start photography is output from the photography control server 20 to the photographing camera 13. The primary photography control unit 25 saves the photography data that the photographing camera 13 has taken as photography data R1 in the temporary photography data storage unit 24. The primary photography control unit 25 also saves information relating to the photography data R1 in the table associating the subject ID that the subject information indicates and the start time from step S1002. This table is saved in the temporary photography data storage unit 24.

The photography data that the photographing camera 13 has taken is output to the photography control server 20. The primary photography control unit 25 saves the photography data that the photography control server 20 has received in the temporary photography data storage unit 24. More specifically, the primary photography control unit 25 saves the multiple sets of photography data received by the photography control server 20 as photography data R1. The photographing camera 13 continues to output photography data to the photography control server 20 each time photography data is obtained, and the primary photography control unit 25 repeats processing of saving the photography data that the photography control server 20 has received in the temporary photography data storage unit 24 as photography data R1, until an instruction to stop photography is received from the photography control server 20. After step S1008, the flow returns to step S1002.

On the other hand, a case where photography by the photographing camera 13 is not stopped is a case where the photographing camera 13 is performing operations of photography at certain time intervals (e.g., every $\frac{1}{60}$ seconds), i.e., currently is performing photography. In a case where the photography by the photographing camera 13 is not stopped (case of No in step S1007), the flow returns to step S1002.

In step S1009, the primary photography control unit 25 determines whether the photographing camera 13 is currently photographing, and in a case where the photographing camera 13 is photographing, gives an instruction for the photographing camera 13 to stop photographing (step S1010), and the flow returns to step S1002. Instruction to stop photography is output from the photography control server 20 to the photographing camera 13. Upon receiving the instruction to stop photographing, the photographing camera 13 stops photographing. On the other hand, in a case where the photographing camera 13 is not photographing (No in step S1009), the flow returns to step S1002.

Next, a specific example will be described regarding primary photography processing in the photography control system 1. The following description deals with how what sort of processing is performed by the flowchart in FIG. 12 following the time chart in FIG. 8.

In a state where there is no subject in the pavilion 10, i.e., in a state where the value of the subject counter at the primary photography control unit 25 is 0, photography by the photographing camera 13 is stopped. This corresponds to time t0 to time t1 and time t6 to time t7 in the time chart in FIG. 8, and corresponds to the state immediately following step S1001 in the flowchart in FIG. 12.

When the first subject holds up the subject identification barcode card 16 of subject ID1 to the accepting terminal 15 at the pavilion entrance 11 at time t1, the subject information detecting unit 21 reads the barcode and detects the subject ID1, and outputs the detected subject ID1 as subject information. The subject information is output to the primary photography control unit 25, as described earlier.

The primary photography control unit 25 has received the subject information in step S1002, and accordingly determines that the subject of the subject ID1 will inter the pavilion 10, and the flow advances to step S1003. The primary photography control unit 25 saves information associating the subject ID1 that the subject information indicates and the time at which the subject information was received (start time) in the temporary photography data storage unit 24 as a table.

In step S1003, the value of the subject counter is incremented by 1. At this point, the value of the subject counter is 1. In step S1004, no notification of subject information has been received from the accepting terminal 15 installed at the pavilion exit 12, so determination is made that there is not subject newly exiting from the pavilion 10, and the flow advances to step S1006. Determination is made in step S1006 that the value of the subject counter is greater than 0, and the flow advances to step S1007. The photographing camera 13 is in a state of having stopped photography at this time, so the flow advances to step S1008, where the photographing camera 13 is instructed to start photography, and the flow returns to step S1002.

Upon receiving the instruction to start photography, the photographing camera 13 repeatedly performs an operation of photographing once every 1/60 seconds. The primary photography control unit 25 saves the still images that have been taken in the temporary photography data storage unit 24 in the order of time of photography, as photography data R1. The first photography is data immediately after the subject has entered the pavilion 10, and thus is saved as photography data at time t1, which is frame0 in FIG. 9. Photography of the second photograph is performed at time t1+1/60 seconds, which is frame1 in FIG. 9. Thereafter, the photographing camera 13 repeats photography until the primary photography control unit 25 gives a photography instruction to stop photography.

The primary photography control unit 25 also adds "R1" to the table temporarily saved in the temporary photography data storage unit 24 to indicate that the photography data associated with the subject of subject ID1 is the photography data R1. The table immediately after starting photography has saved therein information of the combination of ID1 corresponding to the subject ID1, the start time t1, and the photography data R1. At this point, the end time is not set. The content of the table at this time is as illustrated in FIG. 10B.

Next, at time t2, the subject of subject ID2 holds up the subject identification barcode card 16 to the accepting terminal 15 at the pavilion entrance 11. The subject information detecting unit 21 of the accepting terminal 15 reads the barcode and acquires the subject ID2, and outputs the subject ID2 as subject information. The subject information is output to the primary photography control unit 25 as described earlier. The primary photography control unit 25 is at this time performing the loop processing illustrated in FIG. 12.

In step S1002, the primary photography control unit 25 determines that the subject of the subject ID2 indicated by the subject information has entered the pavilion 10, and advances to step S1003. At this time, the primary photography control unit 25 saves information associating the subject ID2 that the subject information indicates and the time t2 at which the subject information was received (start time) with the photography data R1 in the temporary photography data storage unit 24 as a table. The content of the table saved in the temporary photography data storage unit 24 at this time as that illustrated in FIG. 10C.

In step S1003, the value of the subject counter is incremented by 1. At this point, the value of the subject counter is 2. In step S1004, no notification of subject information has been received from the accepting terminal 15 installed at the pavilion exit 12, so determination is made that there is not subject newly exiting from the pavilion 10, and the flow advances to step S1006. Determination is made in step S1006 that the value of the subject counter is greater than 0, and the flow advances to step S1007. The photographing camera 13 is in a state of having started photography, so the flow returns to step S1002.

Next, at time t3, the subject of subject ID3 holds up the subject identification barcode card 16 to the accepting terminal 15 at the pavilion entrance 11. The subject information detecting unit 21 of the accepting terminal 15 reads the barcode and acquires the subject ID3, and outputs the subject ID3 as subject information. The subject information is output to the primary photography control unit 25 as described earlier. The primary photography control unit 25 is at this time performing the loop processing illustrated in FIG. 12.

The primary photography control unit 25 performs the processing of step S1002 to step S1003 in the same way as described above, making the value of the subject counter to be 3, and saves information of the combination of the subject ID3 that the subject information indicates, the start time t3, and photography data R1, in the temporary photography data storage unit 24 as a table. The content of the table saved in the temporary photography data storage unit 24 at this time as that illustrated in FIG. 10D.

Next, at time t4, the subject of subject ID1 holds up the subject identification barcode card 16 to the accepting terminal 15 at the pavilion exit 12. The subject information detecting unit 21 of the accepting terminal 15 reads the barcode and acquires the subject ID1, and outputs the subject ID1 as subject information. The subject information is output to the primary photography control unit 25 as described earlier. The primary photography control unit 25 is at this time performing the loop processing illustrated in FIG. 12.

The primary photography control unit 25 has not received subject information from the accepting terminal 15 at the pavilion entrance 11 in step S1002, and accordingly judges that no subject has newly entered the pavilion 10, and the flow advances to S1004. In step S1004, the subject information has been received from the accepting terminal 15 installed at the pavilion exit 12, so determination is made that the subject of subject ID1 has left the pavilion 10, and the flow advances to step S1005. The time at which the subject information was received is saved in the table in the temporary photography data storage unit 24 as the end time of the subject ID1 in step S1004. The content of the table saved in the temporary photography data storage unit 24 at this time as that illustrated in FIG. 10A.

In step S1005, the value of the subject counter is decremented by 1. At this point, the value of the subject counter is 2. Determination is made in step S1006 that the value of the subject counter is greater than 0, and the flow advances to step S1007. The photographing camera 13 is in a state of having started photography, so the flow returns to step S1002.

In the same way, at time t5, the subject of subject ID3 holds up the subject identification barcode card 16 to the accepting terminal 15 at the pavilion exit 12. The subject information detecting unit 21 of the accepting terminal 15 reads the barcode and acquires the subject ID3, and outputs the subject ID3 as subject information. The subject information is output to the photography control server 20 from the accepting terminal 15 installed at the pavilion exit 12. The photography control server 20 outputs the received subject information to the primary photography control unit 25. The primary photography control unit 25 is at this time performing the loop processing illustrated in FIG. 12.

The primary photography control unit 25 performs the processing of step S1004 to step S1005, in the same way as described above, making the value of the subject counter 1, and the end time t5 corresponding to subject ID3 is saved in the table in the temporary photography data storage unit 24. The content of the table saved in the temporary photography data storage unit 24 at this time as that illustrated in FIG. 10E.

In the same way, at time t6, the subject of subject ID2 holds up the subject identification barcode card 16 to the accepting terminal 15 at the pavilion exit 12. The subject information detecting unit 21 of the accepting terminal 15 reads the barcode and acquires the subject ID2, and outputs the subject ID2 as subject information. The subject information is output to the photography control server 20 form the accepting terminal 15 installed at the pavilion exit 12. The photography control server 20 outputs the received subject information to the primary photography control unit 25. The primary photography control unit 25 is at this time performing the loop processing illustrated in FIG. 12.

The primary photography control unit 25 judges that no subject has newly entered the pavilion 10 in step S1002, and accordingly the flow advances to S1004. In step S1004, the subject information has been received from the accepting terminal 15 installed at the pavilion exit 12, so determination is made that the subject of subject ID2 has left the pavilion 10, and the flow advances to step S1005. The time at which the subject information was received is saved in the table in the temporary photography data storage unit 24 as the end time of the subject ID2 in step S1004. The content of the table saved in the temporary photography data storage unit 24 at this time as that illustrated in FIG. 10F. The value of subject counter is also decremented by 1 at step S1005. The value of the subject counter at this point is 0.

The value of the subject counter is 0 in the determination in step S1006, so the flow advances to step S1009. Photography is being performed by the photographing camera 13, so determination is made in step S1009 that photography is being performed, and the flow advances to step S1010. The primary photography control unit 25 instructs the photographing camera 13 to stop photography in step S1010. FIG. 9 illustrates that the final frame of photography data R1 is frameXXX, and the photography time is t6.

Thus, one or more sets of photography data from time t1 to time t6 are each temporarily saved in the temporary photography data storage unit 24 as photography data R1 in the primary photography processing of the photography control system 1. Instructions to start photography and instructions to end photography by the photographing camera 13 are given in accordance with input of subject IDs of subjects at the accepting terminal 15 at the pavilion entrance 11 and the accepting terminal 15 at the pavilion exit 12, whereby control of starting photography and ending photography at the photographing camera 13 is performed. Further, the photography data R1 is saved in the temporary photography data storage unit 24, and during which time period of the photography data R1 each of the subjects has been a photography target is saved in the table in the temporary photography data storage unit 24.

In the same way, upon the subject of subject ID4 being photographed form time t7 to time t8 and photography data R2 being saved, the start time t, the end time t8, and the photography data R2 correspond to the subject ID4 as illustrated in the table in FIG. 11, and the images of the photography data R2 in FIG. 9 are from frame0 to frameYYY. This so far has been a description of the primary photography processing that the photography control system 1 performs.

1-3-2. Secondary Photography Processing

Figure 13:
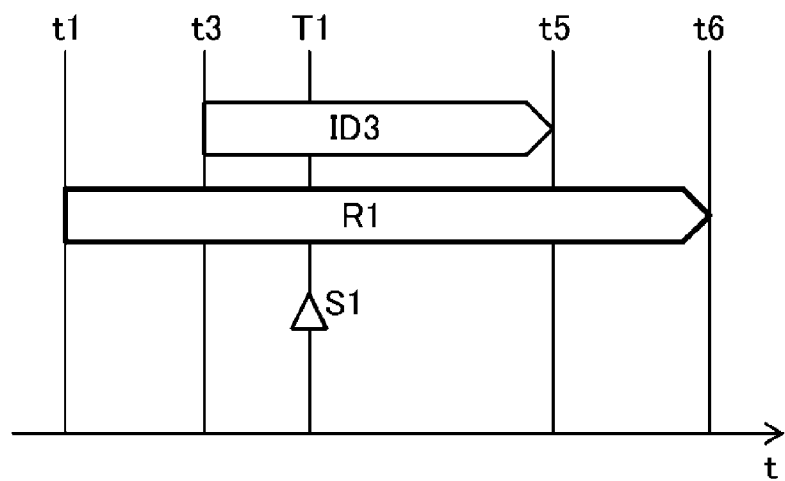
FIG. 13 is a time chart illustrating an example of the flow of time in secondary photography processing in the photography control system illustrated in FIG. 7.

Next, operations of the secondary photography processing of the photography control system 1 will be described. FIG. 13 is a time chart illustrating an example of the flow of time in secondary photography processing of the photography control system 1 illustrated in FIG. 7. This time chart illustrates the photography time period of the subject of subject ID3 in the primary photography processing illustrated in FIG. 8, and a photography instruction S1 in the secondary photography processing.

In the primary photography processing, the photography data R1 of the photographing camera 13 is taken during the time period from time t1 to time t6 (time bar R1), and out of this, time t3 through time t5 is the time period that the subject of the subject ID3 was at the photography spot of the pavilion 10 (time bar ID3). The photography data R1 is temporarily saved in the temporary photography data storage unit 24. It can be seen from the table saved in the temporary photography data storage unit 24 that the subject of the subject ID3 was the photography target of the photographing camera 13 for the photography time period from time t3 to time t5.

The photographer operates the subject identification information input unit 22 of the photographing terminal 14 to give the photography instruction S1. The photography instruction S1 includes time T1 at which the photography instruction was given, and the subject ID. The photographing terminal 14 outputs the photography instruction S1 to the photography control server 20. The photography control server 20 outputs the received photography instruction S1 to the secondary photography control unit 26. The time at which the photography instruction was given is also referred to as a third time.

Upon receiving the photography instruction S1, the secondary photography control unit 26 performs secondary photography processing. More specifically, the secondary photography control unit 26 determines whether or not the subject of the subject ID included in the received photography instruction S1 was in the pavilion 10 at the time T1 (time of giving the photography instruction) included in the photography instruction S1. This determination can be made based on the table in the temporary photography data storage unit 24.

In a case where the subject of the subject ID included in the received photography instruction S1 has been determined to be in the pavilion 10 at the time T1 (time of giving the photography instruction) included in the photography instruction S1, the secondary photography control unit 26 extracts a frameTT1 corresponding to the time T1 of giving the photography instruction S1 from the photography data R1 in the temporary photography data storage unit 24. The secondary photography control unit 26 saves the frameTT1 corresponding to the extracted photography data in the photography data storage unit 27. The secondary photography control unit 26 also saves information associating the subject ID (e.g., ID3), photography time (e.g., T1), and photography instruction (e.g., S1), with the extracted photography data (e.g., frameTT1), in a table in the photography data storage unit 27.

In a case where the person of subject ID3 is a child, for example, the photographer who is the parent of this child may operate the subject identification information input unit 22 of the photographing terminal 14 to input the subject ID3 before giving the photography instruction S1. In this case, the photographing terminal 14 outputs the subject ID3 as subject identification information to the photography control server 20 before giving the photography instruction S1. The photography control server 20 outputs the received subject identification information to the secondary photography control unit 26. Upon receiving the subject identification information, the secondary photography control unit 26 may identify the time period during which the subject ID indicated in the subject identification information is a photography target, and extract photography data of this time period from the photography data R1.

Even in a case where the time of the secondary photography control unit 26 receiving the subject identification information from the photographing terminal 14 is later than time t5, one or more sets of photography data may be extracted from the photography time of time t3 through 5. Although it is sufficient for one or more set of photography data to be extracted, an example of a case where multiple sets of photography data are extracted will be described here.

The extracted multiple sets of photography data are output from the photography control server 20 to the photographing terminal 14. The photographing terminal 14 displays the multiple sets that have been received on a display in order of photography time. Accordingly, the photographer can view the photography data including the subject of the subject ID as images, on the display of the photographing terminal 14. For example, a case will be assumed where an image corresponding to photography time T1 is displayed on the display, and the photographer operates the photographing terminal 14 to instruct acquisition of this photography data. In this case, the photographing terminal 14 outputs an instruction to acquire the photography data (photography instruction S1) to the photography control server 20. The photography instruction S1 includes the photography time T1 of the photography displayed on the display at the time of giving the photography instruction, and the subject ID.

The photography control server 20 outputs the received photography instruction S1 to the secondary photography control unit 26. Thus, the secondary photography control unit 26 receives the photography instruction S1 from the photographing terminal 14. The secondary photography control unit 26 extracts the frameTT1 corresponding to the photography time T1 from the photography data R1 in the temporary photography data storage unit 24. The secondary photography control unit 26 saves the frameTT1 corresponding to the extracted photography data in the photography data storage unit 27.

Figure 14:
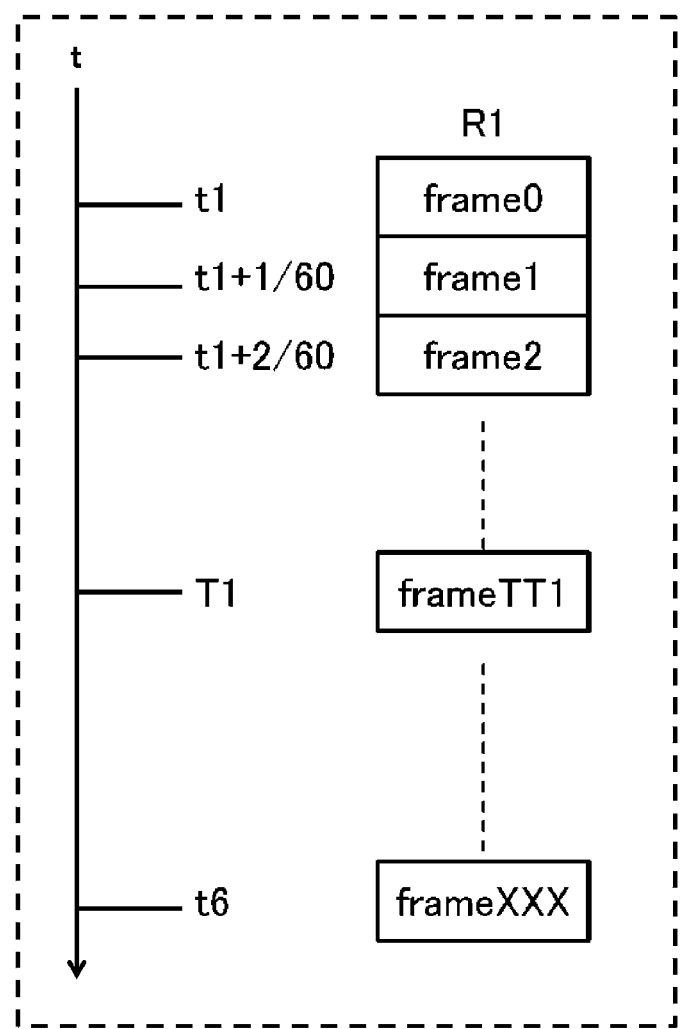
FIG. 14 is a conceptual diagram illustrating an example of photography data taken in secondary photography processing in the photography control system illustrated in FIG. 7.

FIG. 14 is a conceptual diagram illustrating an example of the relationship between photography data R1 taken in the primary photography processing of the photography control system 1 illustrated in FIG. 7 and photography data taken (acquired) by the photography instruction S1 in secondary photography processing. FIG. 14 illustrates that the photography data R1 is multiple sets of photography data from frame0 through frameXXX, and that the photography data (photography frame) corresponding to the photography instruction S1 is frameTT1. Data corresponding to this table is saved in the photography data storage unit 27 along with the photography data.

Figures 15, 16:
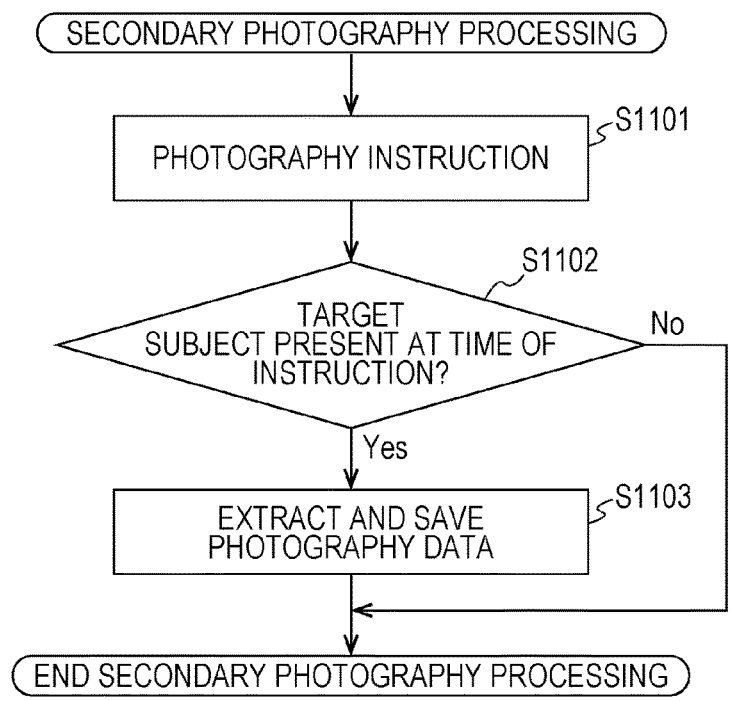
FIG. 15 is a diagram illustrating an example of a table managing correlation between subject IDs, photography time, photography instructions and photography data, in secondary photography processing in the photography control system illustrated in FIG. 7.
FIG. 16 is a flowchart illustrating an example of procedures of secondary photography processing in the photography control system illustrated in FIG. 7.

FIG. 15 is a diagram illustrating an example of a table saved in the photography data storage unit 27. More specifically, the table in FIG. 15 manages information associating the subject ID3 received from the photographing terminal 14, the photography instruction S1, and the photography time T1 of the extracted photography data, with the frameTT1, in the secondary photography processing, as a table. FIG. 15 illustrates that with regard to subject ID3, the photography time of the photography data corresponding to the photography instruction S1 in FIG. 14 is T1, and the photography data corresponding to the photography instruction S1 is frameTT1.

FIG. 16 is a flowchart illustrating an example of procedures of secondary photography processing in the photography control system 1 illustrated in FIG. 7. An example of a case where secondary photography processing is performed while performing primary photography processing will be described here.

Upon starting the secondary photography processing, the photography control system 1 stands by for a photography instruction from the photographing terminal 14. The photographer gives an instruction by pressing a photography button (omitted from illustration) embedded in the subject identification information input unit 22 of the photographing terminal 14, for example. When the photography button is pressed, the subject identification information input unit 22 outputs a photography instruction. The photography instruction includes the subject ID and time information indicating the time at which the photography instruction was given (e.g., the time at which the button was pressed, or the photography time of the photography data displayed on the display when the button was pressed). The time, at which the photography instruction was given, is also referred to as a third time. The time information, indicating the time at which the photography instruction was given, is also referred to as third time information. This photography instruction is output from the photographing terminal 14 to the secondary photography control unit 26. The secondary photography control unit 26 thus receives the photography instruction (step S1101).

Next, the secondary photography control unit 26 checks whether or not the subject ID included in the received photography instruction is a valid subject ID regarding the time at which the photography instruction was given, i.e., whether or not the subject of that subject ID was in the pavilion 10 at the time when the photography instruction was given (step S1102). This checking can be performed by referencing the table saved in the temporary photography data storage unit 24, for example.

In a case where the specified subject ID is valid, i.e., the subject of that specified subject ID is in the pavilion 10 (Yes in step S1102), the secondary photography control unit 26 extracts photography data, i.e., a photography image, at a photography time matching the time indicated by the time information included in the received photography instruction, out of the photography data taken in the primary photography processing, stores this in the photography data storage unit 27 (step S1103), and the secondary photography processing ends. In a case where the specified subject ID is invalid, i.e., the subject of the specified subject ID is not in the pavilion 10 at the time of photography instruction (No in step S1102), the photography instruction is invalidated, and the secondary photography processing ends without storing the photography data.

Alternatively, the following processing may be performed before giving a photography instruction from the photographing terminal 14. For example, the photographer uses the subject identification information input unit 22 of the photographing terminal 14 to input a subject ID. The subject identification information input unit 22 outputs the input subject ID as subject identification information. The subject identification information is output from the photographing terminal 14 to the photography control server 20. The photography control server 20 outputs the subject identification information to the secondary photography control unit 26. Upon receiving the subject identification information, the secondary photography control unit 26 checks whether the subject of the subject ID that the subject identification information indicates is in the pavilion 10, which is the photography spot, by referencing the table in the temporary photography data storage unit 24.

In a case where determination is made that the subject of the subject ID is in the pavilion 10, photography data of which the photography time is the received time, and photography data following this photography data, are extracted from the temporary photography data storage unit 24. The photography data extracted from the temporary photography data storage unit 24 is successively output from the photography control server 20 to the photographing terminal 14. The photographing terminal 14 successively displays the received photography data on a display. Thus, the photographer operating the photographing terminal 14 can give instructions while viewing the photography data displayed on the display of the photographing terminal 14.

Alternatively, in a case where determination is made that the subject of the subject ID is in the pavilion 10, photography data having a photography time at or after the start time corresponding to the received subject ID in the above-described table may be successively extracted from the temporary photography data storage unit 24. In this case, the photographing terminal 14 can view the photography data from the time that the subject of the subject ID has entered the pavilion 10. In this case, the photography instruction S1 may include, as the time of giving the photography instruction, the photography time of the photography data displayed on the display at the time of pressing the button. The secondary photography control unit 26 may extract photography data of the photography time included in the photography instruction S1 from the temporary photography data storage unit 24, and store it in the photography data storage unit 27 (step S1103).

Next, a specific example of secondary photography processing in the photography control system 1 will be described. The photography instruction in the secondary photography processing is given from a photographing terminal 14 installed outside of the pavilion 10. A photographer using the photographing terminal 14 uses the subject identification information input unit 22 of the photographing terminal 14 to input the subject ID of a subject that the photographer wants to photograph.

Thus, the photographer can use the photographing terminal 14 to view the photography data taken in the primary photography processing as described above. The photographer also uses the subject identification information input unit 22 to give photography instructions from the photographing terminal 14 while the photography data is being displayed on the photographing terminal 14. An example of a method that can be used to output a photography instruction is to give an instruction by pressing a photography button embedded in the subject identification information input unit 22 of the photographing terminal 14.

Upon pressing input of the photography button being performed, the subject identification information input unit 22 of the photographing terminal 14 outputs a photography instruction including the subject ID and the time at which the photography instruction was given. The photography instruction is output from the photographing terminal 14 to the photography control server 20. The photography control server 20 outputs the received photography instruction to the secondary photography control unit 26.

For example, in a case where photography data taken in the primary photography processing has been taken from time t1, and a secondary photography instruction is given 10 seconds later from this, a photography time of t1+10 seconds is specified. Accordingly, even in a case where the display of photography data taken in the primary photography processing, being displayed on the photographing terminal 14, is somewhat lagging behind the current time, the photography instruction by the photographer is performed regarding the desired timing as to the photography data being displayed, so instruction can be performed without any problem even if off from the actual photography time.

Upon receiving the photography instruction from the photographing terminal 14, the secondary photography control unit 26 checks whether or not the subject ID included in the received photography instruction is a valid subject ID regarding the time at which the photography instruction was given, i.e., whether or not the subject of that subject ID was in the pavilion 10 at the time when the photography instruction was given. That is to say, the subject is determined to be in the pavilion 10, unless an end time of the received subject ID is input in the table saved in the temporary photography data storage unit 24 at the time included in the received photography instruction. In this case, the secondary photography control unit 26 extracts photography data, i.e., a photography image, at a photography time matching the time instructed by the subject identification information input unit 22, out of the photography data taken in the primary photography processing, stores this in the photography data storage unit 27, and the secondary photography processing ends.

On the other hand, in a case where an end time of the subject ID included in the received photography instruction has been input in the table saved in the temporary photography data storage unit 24 at the time included in the received photography instruction, and the time of the photography instruction is later than this end time, determination is made that the subject of the subject ID is not in the pavilion 10. In this case, the photography data regarding which the photography instruction has been given does not include the subject of the subject ID, so the photography instruction becomes invalid, and the secondary photography processing ends without saving the photography data in the photography data storage unit 27.

Now, a case where a photography instruction S1 at photography time T1 has been acquired at the subject identification information input unit 22 with regard to the time period of the photography data R1 in the primary photography processing, as illustrated in FIG. 13, will be described. In this example, the time T1 is from time t3 through time t5 illustrated in FIG. 8, for example. Description will be made regarding an example where the content of the table saved in the temporary photography data storage unit 24 during this period is that illustrated in FIG. 10D.

The secondary photography control unit 26 receives the photography instruction S1 from the photographer (step S1101 in FIG. 16). The secondary photography control unit 26 then determines whether or not the subject of the subject ID3 is a photography target at the photography time T1 included in the photography instruction S1, by referencing the table saved in the temporary photography data storage unit 24 in the primary photography processing illustrated in FIG. 10D (step S1102).

The photography time T1 is from time t3 to time t5, so at this point photography of the photography data R1 is continuing in the primary photography processing, and the end time of the subject ID 3 is not set in the temporary photography data storage unit 24. This means that in the photography data at time T1 in the photography data R1 regarding which a photography instruction has been given, the subject of the subject ID3 can be determined to be valid as a photography target (Yes in S1102). Accordingly, the flow advances to step S1103.

The secondary photography control unit 26 then extracts frameTT1 from the photography data R1 illustrated in FIG. 14 as a frame corresponding to the photography time T1, and saves it in the photography data storage unit 27 as photography data of the subject ID3. The secondary photography control unit 26 also saves information associating the subject ID3, photography time T1, photography instruction S1, and photography data frameTT1, as a table in the photography data storage unit 27 (step S1103), as photography information such as illustrated in the table in FIG. 15.

Thus, according to the photography control system 1 of the present embodiment, the photographer can acquire photography data of a subject in the pavilion 10 from a remote location, by using the subject ID that the subject has. In a case where the secondary photography control unit 26 receives the subject ID3 before receiving the photography instruction S1, the table in the temporary photography data storage unit 24 may be referenced to check whether or not the subject of the received subject ID3 is in the pavilion 10 which is the photography spot in the above description. In this case, the secondary photography control unit 26 references the content of the table illustrated in FIG. 10D, and determines that the subject of the subject ID3 is still in the pavilion 10 since the start time of the subject ID3 is t3 and there is no information of the end time for this subject ID. The secondary photography control unit 26 in this case may successively extract photography data having a photography time of time t3 or having a photography time of the time at which the subject ID3 was received or thereafter, from the temporary photography data storage unit 24 (or photography data R1). The extracted photography data is output from the photography control server 20 to the photographing terminal 14. The photographing terminal 14 successively displays the received photography data on the display. Accordingly, the photographer can view the photography data displayed on the display of the photographing terminal 14.

Although description has been made above that the time T1 is the time at which a photography instruction was given, but this is not restrictive. For example, the time T1 may be information indicating the photography time of the photography data displayed on the display at the time at which the photography instruction was given at the photographing terminal 14. This so far has been a description of the secondary photography processing that is performed in the photography control system 1.

Although description has been made above regarding a case where secondary photography processing of the subject of subject ID3 is performed while the subject of subject ID3 is in the pavilion 10, photography instruction of the subject of subject ID3 may be performed after time t5 as well, for example. Assumption will be made that, in a case where the secondary photography control unit 26 receives subject identification information (subject ID3) output from the photographing terminal 14 later than time t5, the content of the table saved in the temporary photography data storage unit 24 is that illustrated in FIG. 10E. The secondary photography control unit 26 in this case can identify the time period in the photography data R1 where the subject of the subject ID3 is a photography target is photography data from the start time t3 to the end time t5. Accordingly, the secondary photography control unit 26 can successively transmit photography data in the temporary photography data storage unit 24 (or photography data R1) of which the photography time is time t3 to time t5. The photographing terminal 14 then displays the received photography data from time t3 to time t5 on the display, in order of photography time. Thus, the photographer operating the photographing terminal 14 can give instructions while viewing the photography data displayed on the display of the photographing terminal 14. Further, all photography data being displayed is photography data where the subject of the subject ID3 is the photography target.

Upon pressing input of the photography button being performed, the subject identification information input unit 22 of the photographing terminal 14 outputs a photography instruction including the subject ID, and time information indicating the photography time T1 of photography data displayed on the display at the time of giving the photography instruction. The photography instruction is output from the photographing terminal 14 to the photography control server 20. The photography control server 20 outputs the received photography instruction to the secondary photography control unit 26. In this case, the secondary photography control unit 26 may extract the photography data of the photography time T1 indicated by the time information included in the received photography instruction from the temporary photography data storage unit 24 (or photography data R1), and store the extracted photography data in the photography data storage unit 27. If this processing is implemented, S1102 in FIG. 16 does not necessarily have to be performed.

Although an example has described in the present embodiment where the photographing camera 13, photographing terminal 14, accepting terminal 15, and photography control server 20 are all physically separate entities, as illustrated in FIG. 7, this is not restrictive. For example, the requisites of the photography control server 20 may be assembled into the photographing camera 13. In this case, the device obtained by assembling the requisites of the photography control server 20 into the photographing camera 13 may be referred to either as a photographing camera or a photography control server. Conversely, the requisites of the photography control server 20 may be assembled into the photographing terminal 14, for example. In this case, the device obtained by assembling the requisites of the photography control server 20 into the photographing terminal 14 may be referred to either as a photographing terminal or a photography control server.

1-4. Advantages

According to the present embodiment, photography of the photography spot in the pavilion 10 is performed by the photographing camera 13, by at least one subject being in the photography spot in the primary photography processing, and in the secondary photography processing only a photographer who can know the subject ID for each subject can perform photography (extracting photography data of which the subject ID matches, from the photography data taken by the primary photography processing) of the time period when the subject is in the photography spot. If there are multiple photographing terminals 14, even if photography instructions are given at the same time from these photographing terminal 14, photography data can be acquired at the respective desired timings.

2. Second Embodiment

Next, a photography control system according to a second embodiment of the present disclosure will be described with reference to drawings. The photography control system is a system for performing automatic photography of users by photographing cameras installed at photography spots, such as theme parks, amusement facilities, sightseeing destinations, and so forth. Description will be made in the present embodiment regarding an example of a case where a commemorative photography spot has been provided in a photography area in front of a monument, as a photography spot in an amusement facility, and commemorative photography is made in moving images. Note that the present embodiment assumes that only those who agree to be photographed together in commemorative photography will enter the photography area. Those who agree to be photographed together will be collectively referred to as a set. Description will be made in the present embodiment regarding an example of a case where commemorative photography is performed in the commemorative photography spot with two people as one set.

2.1. Overview

Figure 17:
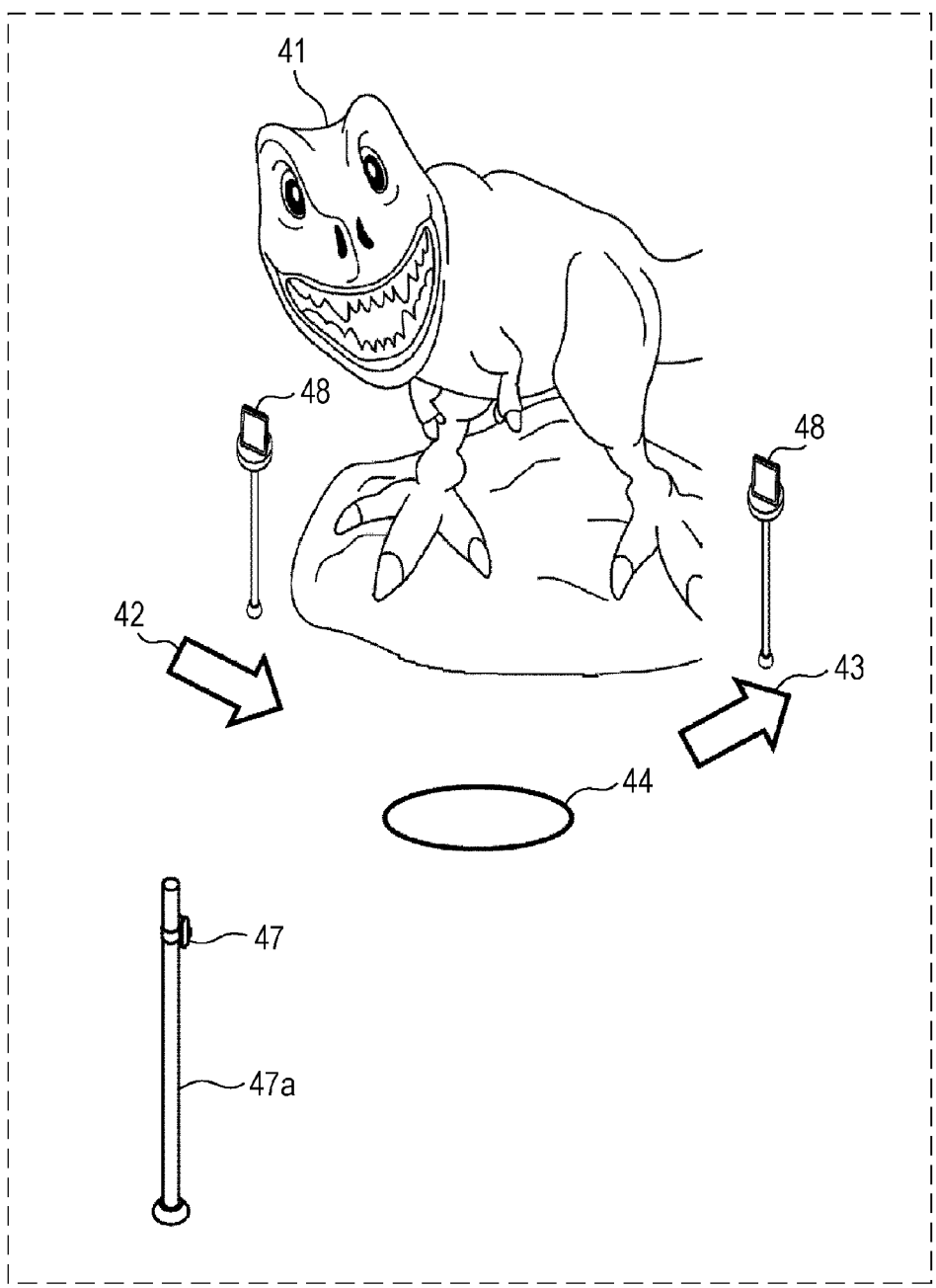
FIG. 17 is a diagram illustrating an example of a scene where a photography control system according to a second embodiment of the present disclosure is being used.

FIG. 17 is a diagram illustrating an example of a scene where a photography control system according to the second embodiment of the present disclosure is being used. In FIG. 17, an area including the photography spot has a monument 41, a photography area entrance 42, a photography area exit 43, and a commemorative photography spot 44. A photographing camera 47 is installed at a position for photography of the commemorative photography spot 44, and an accepting terminal 48 is installed at each of near the photography area entrance 42 and near the photography area exit 43. The area including the photography spot is also referred to as a photography area.

The commemorative photography spot 44 is positioned such that a photograph of a desirable angle can be taken if a subject stands at this position for photography by the photographing camera 47, and is a circle drawn on the ground serving as a mark. The photographing camera 47 is attached to a pole 47a and faces the commemorative photography spot 44, so as to be able to photograph subjects who are people at the commemorative photography spot 44 along with the monument 41. The accepting terminal 48 according to the present embodiment has a photography function and recognition function to read barcodes, e.g., later-described QR codes (a registered trademark), as identification information to identify subjects.

When a person holds a QR code (registered trademark) up to the accepting terminal 48, the accepting terminal 48 reads the QR code (registered trademark), and detects the value that the QR code (registered trademark) indicates as a subject ID. Thus, the accepting terminal 48 at the photography area entrance 42 externally acquires the subject ID. The accepting terminal 48 outputs subject identification information including the acquired subject ID and the time at which the subject ID was detected, to a photography control server 50. The photography control server 50 will be described later. Subject identification information from the accepting terminal 48 at the photography area entrance 42 indicates that the person of the subject ID that the subject identification information indicates has entered the photography area. Subject identification information from the accepting terminal 48 at the photography area exit 43 indicates that the person of the subject ID that the subject identification information indicates has left the photography area.

The accepting terminals 48 installed at each of the photography area entrance 42 and photography area exit 43 in the present embodiment further have functions for detecting moving bodies. Detection of moving bodies is performed using an infrared sensor, for example. The accepting terminal 48 installed at the photography area entrance 42 has an area from the photography area entrance 42 to the commemorative photography spot 44 as a detection range (referred to as "first detection range"), for example, and detects moving bodies in this area. Upon detecting a moving body in the first detection range, the accepting terminal 48 outputs moving body detection information indicating that a moving body has been detected, as subject information. This subject information is output from the accepting terminal 48 installed at the photography area entrance 42 to the photography control server 50.

Upon receiving (or acquiring) the subject information, the photography control server 50 outputs an instruction to start photography by the photographing camera 47. Upon receiving (or acquiring) the instruction to start photography, for example, the photographing camera 47 starts taking a moving image. The photographing camera 47 takes moving images at 30 frames per second, for example. Each of the image frames obtained by performing photography at 1/30 second intervals is referred to as a set of photography data. As a matter of course, photography data of a moving image acquired by shooting by the photographing camera 47 will include multiple sets of photography data.

The accepting terminal 48 installed at the photography area exit 43 has an area from the commemorative photography spot 44 to the photography area exit 43 as a detection range (referred to as "second detection range"), for example, and detects moving bodies in this area. Upon detecting a moving body in the second detection range, the accepting terminal 48 installed at the photography area exit 43 outputs, as subject information, moving body detection information indicating that a moving body has been detected. The output subject information is output from the accepting terminal 48 installed at the photography area exit 43 to the photography control server 50.

The accepting terminal 48 at the photography area exit 43 performs detection of moving bodies at predetermined time intervals, for example, so while the moving body is in the second detection range, moving body detection information will be output at the predetermined time intervals. Once a moving body is detected and thereafter the moving body is no longer detected, the accepting terminal 48 at the photography area exit 43 measures the amount of time over which the state of no moving body being detected continues from the current point, using a timer (omitted from illustration). When the time over which the state of no moving body is detected has continued for a certain amount of time, the accepting terminal 48 at the photography area exit 43 outputs information indicating that no moving body has been detected for a certain amount of time, to the photography control server 50 as subject information.

Upon having received (or acquired) subject information from the accepting terminal 48 installed at the photography area exit 43, the photography control server 50 instructs the photographing camera 47 to end (or stop) photography. The photographing camera 47 ends photography when the instruction to stop photography has been received (or acquired).

The photographing camera 47 outputs the photography data that has been taken to the photography control server 50. The photography control server 50 temporarily saves the photography data of the moving image that has been received in first memory. The photography control server 50 also saves information associating the start time at which shooting of the photography data for the moving image has been started, and the end time when shooting was ended, with the photography data of the moving image, in first memory (omitted from illustration) as a table. Thus, when a moving body is detected near the commemorative photography spot 44, the photographing camera 47 starts photography, and when no moving body is detected for a certain amount of time, the photographing camera 47 stops photography. Known technology can be used for the moving body detection method. For example, much literature and many algorithms have been disclosed for methods of detecting moving bodies using infrared sensors, so detailed description will be omitted here.

The photographing camera 47, accepting terminals 48, and photography control server 50 are connected by network, and are capable of exchanging necessary information with each other through communication. The network includes a network corresponding to the Internet, to enable photography data taken by the photographing camera 47 to be provided to a mobile terminal that the user owns via the Internet.

Figure 18:
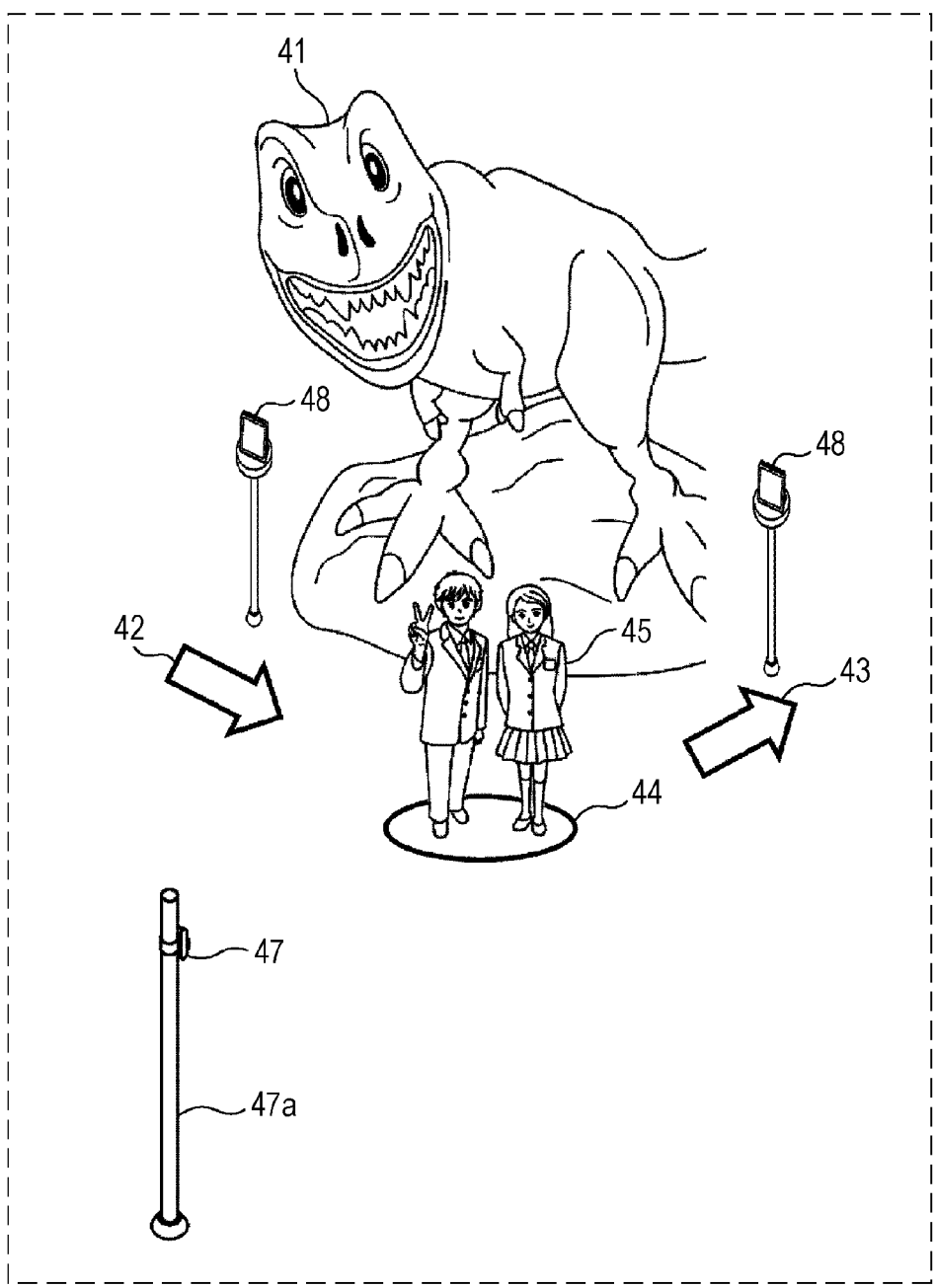
FIG. 18 is a diagram illustrating an instance of performing photography in the scene in FIG. 17 where the photography control system is being used.

FIG. 18 is a diagram illustrating an instance of performing photography in the scene in FIG. 17 where the photography control system is being used. For example, a subject 45 to be photographed can have photography performed by the photographing camera 47 at an ideal position, by standing at the commemorative photography spot 44 in FIG. 18.

Figure 19:
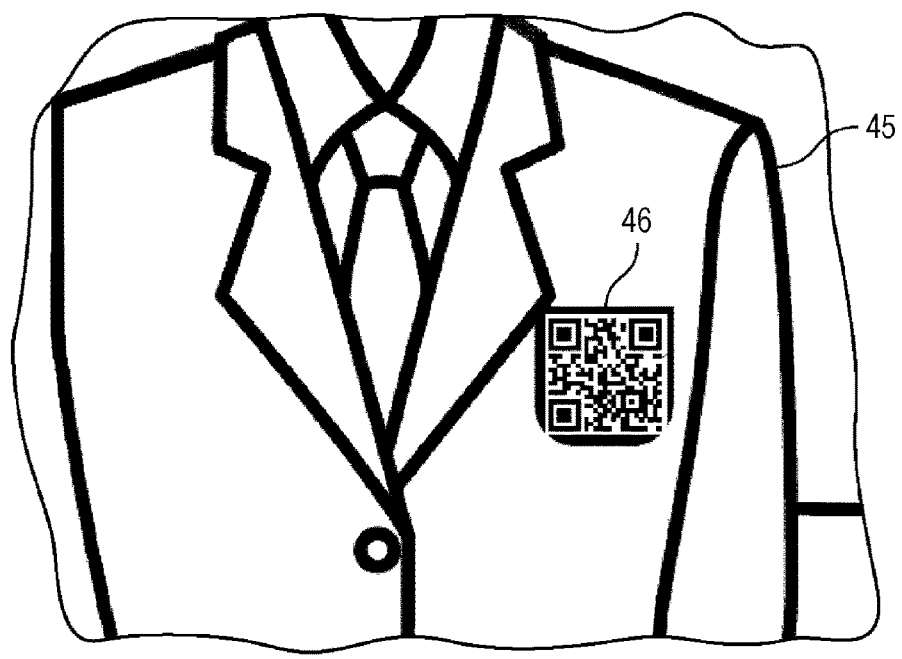
FIG. 19 is a diagram illustrating an example of a subject wearing a subject identification barcode tag illustrated in FIG. 18.

FIG. 19 is a diagram illustrating an example of a subject 45 wearing a subject identification barcode tag illustrated in FIG. 18. In FIG. 19, the subject 45 is wearing a subject identification barcode tag 46. In the present embodiment, a QR code indicating identification information of the person who is the subject 45 (hereinafter referred to as "subject ID") is printed on the subject identification barcode tag 46, and the subject 45 carries this so as to be taken by the photographing camera 47. For example, the subject 45 carries the subject identification barcode tag 46 by a method such as being stuck a garment being worn in the form of a sticker, or attached by a safety pin like a badge, or the like, so that the subject identification barcode tag 46 is photographed by the photographing camera 47 at the same time as the subject 45.

In the present embodiment, first, the subject 45 wearing the subject identification barcode tag 46 enters the photography area where there is the monument 41. The accepting terminal 48 is installed at the photography area entrance 42. The subject identification barcode tag 46 is read by the QR code photographing and recognition functions that the accepting terminal 48 has, by the subject 45 holding the subject identification barcode tag 46 up to the accepting terminal 48, thereby acquiring the subject ID. The acquired subject ID is output from the accepting terminal 48 at the photography area entrance 42 to the photography control server 50, for example. The subject ID that the photography control server 50 has received is saved in memory (omitted from illustration). Thus, the present photography control system (e.g., the photography control server 50) can be notified in advance that the subject 45 has entered the photography area.

When the subject 45 nears the commemorative photography spot 44 from the photography area entrance 42, the present photography control system (e.g., the accepting terminal 48 installed at the photography area entrance 42) detects the movement of the person corresponding to the subject ID, as a moving body. Information that a moving body has been detected is output from the accepting terminal 48 at the photography area entrance 42 to the photography control server 50 as subject information. Upon having received the subject information from the accepting terminal 48 at the photography area entrance 42, the photography control server 50 instructs the photographing camera 47 to start photography. Upon receiving the instruction to start photography, the photographing camera 47 starts shooting a moving image. The subject 45 that is moving from the photography area entrance 42 toward the commemorative photography spot 44 is not facing the photographing camera 47 straight on, so the probability that the subject identification barcode tag 46 is not in the photography data taken by the photographing camera 47 is high at this point.

However, when the subject 45 reaches the commemorative photography spot 44 and turns toward the photographing camera 47 for commemorative photography, the subject identification barcode tag 46 is more readily taken in the photography data that the photographing camera 47 takes, and the subject ID is more readily acquired from the image of the subject identification barcode tag 46 included in the image of the photography data.

When the subject 45 who has finished the commemorative photography starts to move from the commemorative photography spot 44 toward the photography area exit 43, the subject identification barcode tag 46 is less readily taken in the photography data that the photographing camera 47 takes. When the subject 45 leaves the detection region of the accepting terminal 48 installed at the photography area exit 43, the accepting terminal 48 stops detecting a moving body. When a certain amount of time elapses from the point that no moving body is detected, the accepting terminal 48 outputs moving body detection information to the photography control server 50 as subject information. Upon having received the subject information from the accepting terminal 48 installed at the photography area exit 43, the photography control server 50 instructs the photographing camera 47 to stop shooting. Upon receiving the instruction to stop photography, the photographing camera 47 stops shooting.

When the subject 45 holds up the subject identification barcode tag 46 to the accepting terminal 48 at the photography area exit 43, the accepting terminal 48 at the photography area exit 43 detects (or acquires) the subject ID, and outputs this subject ID to the photography control server 50 as subject information. According to this configuration, the accepting terminal 48 installed at the photography area exit 43 notifies the present photography control system (photography control server 50) that the subject 45 is not in the photography area where the monument 41 is located.

When the subject 45 leaves the photography area, the present photography control system (e.g., photography control server 50) extracts each of the multiple image frames included in the moving image photography data saved in the first memory as still images, and determines whether or not an image of the subject identification barcode tag 46 can be detected from these still images. In a case where an image of the subject identification barcode tag 46 can be detected, the photography control server 50 detects the value (subject ID) that the subject identification barcode tag 46 indicates. Detecting a subject ID from a still image corresponding to an image frame will be referred to as "reading a subject ID from an image frame", and an image frame from which a subject ID has been read will be referred to as an "image frame from which a subject ID has been read".

In a case where a subject ID has been read from an image frame, the photography control server 50 matches this subject ID with the subject ID that the subject identification information indicates. In a case where these match, this means that the subject ID that the subject identification information indicates has been read from the image frame (i.e., has been detected). The photography control server 50 determines that the subject of the subject ID indicated by the subject identification information is in this still image. The photography control server 50 extracts, from the photography data of the moving image, the image frame regarding which determination has been made that the subject of the subject ID is in the image, and saves as photography data (photography data taken at the commemorative photography spot 44) in second memory (omitted from illustration). The photography control server 50 also sets the oldest photography time of the image frames regarding which determination has been made that the subject of the subject ID is in the image, as the start time, and the newest photography time as the end time. The photography control server 50 saves information associating the subject ID, start time, and end time, with the extracted data, in the second memory as a table.

Note that the photography control server 50 may output photography data of a moving image taken of the subject 45 to a dedicated cloud server (omitted from illustration) for the subject 45, on the Internet. This cloud server may save photography data in memory (omitted from illustration). A person serving as the subject 45 may operate a mobile terminal (omitted from illustration) owned by him/herself and access the memory in the cloud server, thereby acquiring photography data of the moving image.

2-2. Configuration

Figure 20:
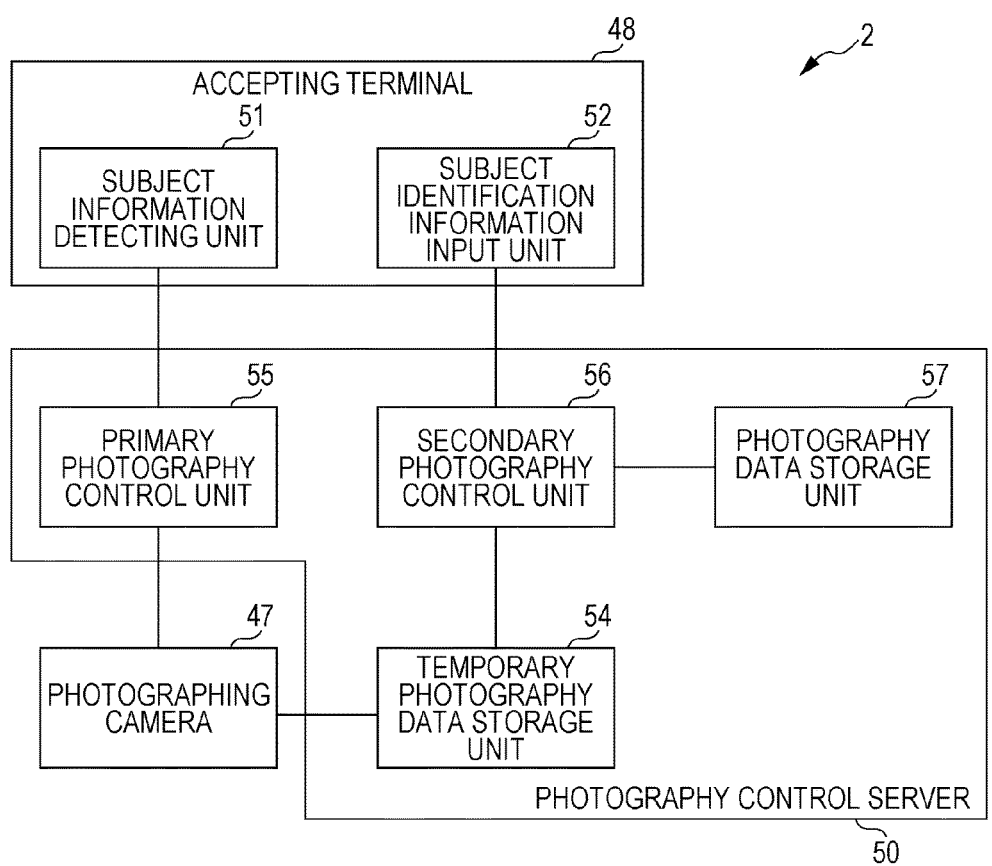
FIG. 20 is a block diagram illustrating an example of the configuration of the photography control system according to the second embodiment of the present disclosure.

Next, the configuration of the photography control system according to the present embodiment will be described. FIG. 20 is a block diagram illustrating an example of the photography control system according to the present embodiment. The photography control system 2 illustrated in FIG. 20 has the photographing camera 47, the accepting terminal 48, and the photography control server 50. The accepting terminal 48 has a subject information detecting unit 51 and a subject identification information input unit 52. The photography control server 50 has a temporary photography data storage unit 54, a primary photography control unit 55, a secondary photography control unit 56, and a photography data storage unit 57.

Although the photography control system 2 uses the accepting terminal 48 installed at the photography area entrance 42 and the accepting terminal 48 installed at the photography area exit 43, FIG. 20 only illustrates one accepting terminal 48, to simplify the drawing. Further, the photographing camera 47, accepting terminals 48, and photography control server 50 are connected via network through certain communication units to be able to exchange necessary information with each other by communication, but the communication units of each have been omitted from illustration to simplify the drawing.

The subject 45 holds up the subject identification barcode tag 46 that is being worn to the accepting terminal 48 installed at the photography area entrance 42. The subject identification information input unit 52 of the accepting terminal 48 installed at the photography area entrance 42 detects (or acquires) the subject ID from the subject identification barcode tag 46 worn by the subject 45, and outputs as subject identification information.

The output subject identification information is output from the accepting terminal 48 installed at the photography area entrance 42 to the photography control server 50. The photography control server 50 outputs the received subject identification information to the secondary photography control unit 56. The secondary photography control unit 56 stores the subject ID indicated by the received subject identification information in memory (omitted from illustration) or the like. Thus, the secondary photography control unit 56 can receive (acquire) the subject identification information output from the subject identification information input unit 52.

After the accepting terminal 48 installed at the photography area entrance 42 has acquired the subject ID, the subject 45 moves from the photography area entrance 42 toward the commemorative photography spot 44. When the subject information detecting unit 51 of the accepting terminal 48 installed at the photography area entrance 42 detects the subject 45 heading from the photography area entrance 42 toward the commemorative photography spot 44 as a moving body, the subject information detecting unit 51 outputs moving body detection information indicating that a moving body has been detected, as subject information. This moving body detection information (subject information) indicates that the subject 45 is near the commemorative photography spot 44 that is the photography spot.

According to this configuration, the subject information detecting unit 51 externally acquires subject information. The acquired subject information is output from the accepting terminal 48 installed at the photography area entrance 42 to the photography control server 50. Note that in the detection of the subject 45 as a moving body, the subject information detecting unit 51 does not necessarily have to perform determination regarding whether the moving body is a subject. The reason is that after having held the subject identification barcode tag 46 up to the accepting terminal 48 installed at the photography area entrance 42, the subject 45 moves from the photography area entrance 42 toward the commemorative photography spot 44.

The output subject information is output from the accepting terminal 48 installed at the photography area entrance 42 to the photography control server 50. The subject information received by the photography control server 50 is output to the primary photography control unit 55. Upon receiving the subject information, the primary photography control unit 55 determines that the subject is moving from the photography area entrance 42 toward the commemorative photography spot 44, and instructs the photographing camera 47 to start photography. This instruction is output from the photography control server 50 to the photographing camera 47. Upon having received (or acquired) the instruction to start photography, the photographing camera 47 starts photography of a moving image.

Upon receiving subject information indicating that the subject is near the commemorative photography spot 44 from the subject information detecting unit 51, the primary photography control unit 55 instructs the photographing camera 47 to start photography of a moving image.

After having detected the subject moving from the commemorative photography spot 44 toward the photography area exit 43, the subject information detecting unit 51 of the accepting terminal 48 installed at the photography area exit 43 measured the amount of time elapsed from the point that the moving body is no longer detected. When a state from this point that the moving body is no longer detected continues for a certain amount of time, the subject information detecting unit 51 outputs moving body detection information indicating that the moving body is no longer detected, as subject information.

The output subject information is transmitted from the accepting terminal 48 installed at the photography area exit 43 to the photography control server 50. The subject information received by the photography control server 50 is output to the primary photography control unit 55. Upon receiving the subject information, the primary photography control unit 55 instructs ending of photography. This instruction is output from the photography control server 50 to the photographing camera 47. The photographing camera 47 that has received the instruction to end photography, ends photography.

The photographing camera 47 is connected to the photography control server 50, more specifically to the primary photography control unit 55, with control of photography including starting and stopping of photography being performed under the control of the primary photography control unit 55. The photographing camera 47 also has functions of automatic adjusting focus in images being taken, and so forth.

Upon receiving an instruction to start photography from the primary photography control unit 55, the photographing camera 47 according to the present embodiment performs photography as a moving image. For example, the photographing camera 47 shoots moving images of 30 frames per second. The photography data that has been taken is output from the photographing camera 47 to the photography control server 50. The photography data received by the photography control server 50 is temporarily saved in the temporary photography data storage unit 54. The photography data of the moving image, and information associating the start time when shooting of the moving image started and end time when shooting of the moving image ended, are saved on the temporary photography data storage unit 54 as a table.

The temporary photography data storage unit 54 is a memory device (first memory) that temporarily saves photography data taken by the photographing camera 47. The temporary photography data storage unit 54 is realized by non-volatile memory such as FeRAM, for example, and has functions of temporary storing photography data.

The subject identification information input unit 52 has functions of acquiring subject IDs. The subject identification information input unit 52 according to the present embodiment is provided as an ID input function embedded in a terminal such as the accepting terminal 48 illustrated in FIG. 18, where the subject 45 holding the subject identification barcode tag 46 up to the accepting terminal 48 enables the barcode to be read and the value that the barcode indicates (subject ID) to be acquired. The subject ID that has been acquired is output from the accepting terminal 48 to the photography control server 50 as subject identification information identifying the subject. The subject identification information received by the photography control server 50 is output to the secondary photography control unit 56.

The secondary photography control unit 56 stores the subject ID indicated by the subject identification information received from the subject identification information input unit 52 in memory (omitted from illustration). The secondary photography control unit 56 extracts photography data from the moving image photography data that has been temporarily saved in the temporary photography data storage unit 54, in accordance with the subject ID stored in memory, and saves the extracted photography data in the photography data storage unit 57.

The secondary photography control unit 56 according to the present embodiment extracts each of the image frames included in the photography data saved in the temporary photography data storage unit 54 as still images, and determines whether or not the subject ID can be read from these still images. In a case where the subject ID has been read from a still image, this subject ID is matched with the subject ID that the subject identification information indicates. In a case where these match, this means that the subject of the subject ID that the subject identification information indicates is in the image frame corresponding to the still image. The secondary photography control unit 56 also saves the image frame, regarding which determination has been made that the subject of the subject ID is in the image, in the photography data storage unit 57 as photography data.

The photography data in the present embodiment is a moving image, so even in a case where the subject ID could not be read in consecutive frames immediately after an image frame where the subject ID was read, there are cases where the same subject ID is read again in later image frames. In this case, the secondary photography control unit 56 determines that the same subject ID is in image frames where the subject ID could not be read, as well. In this case, the maximum permissible number of image frames where the subject ID is not readable may be decided beforehand.

For example, if the number of image frames decided beforehand is ten, and the subject ID was read from a certain image frame (first image frame) but not read in the immediately following image frame, and there is another image frame where the subject ID can be read (second image frame) within ten frames from the first image frame, the secondary photography control unit 56 may determine that the same subject ID is in the image frames where the subject ID is not readable between the first image frame and the second image frame. The number of image frames decided on may be an optional value. Thus, even in a case where the subject ID temporarily becomes unreadable due to the subject 45 moving within the commemorative photography spot 44, the moving image can be continuously extracted.

The photography data storage unit 57 is a memory device that saves photography data extracted by the secondary photography control unit 56 (second memory). The photography data storage unit 57 is realized by non-volatile memory such as a hard disk for example, and has functions of saving photography data. The configuration of the photography data storage unit 57 is not restricted to the above-descried example, and may be configured on a cloud server connected by the Internet. In this case, only the user (photographer) that knows the subject ID can acquire photography data via the cloud server.

The above-described subject information detecting unit 51, primary photography control unit 55, subject identification information input unit 52, and secondary photography control unit 56, function by processors executing programs stored in memory, thereby controlling the above-described functional units.

2-3. Operations

Next, operations of the photography control system 2 illustrated in FIG. 20 will be described. The operations of the photography control system 2 are executed by a combination of primary photography processing and secondary photography processing.

2-3-1. Primary Photography Processing

Figures 21, 22:
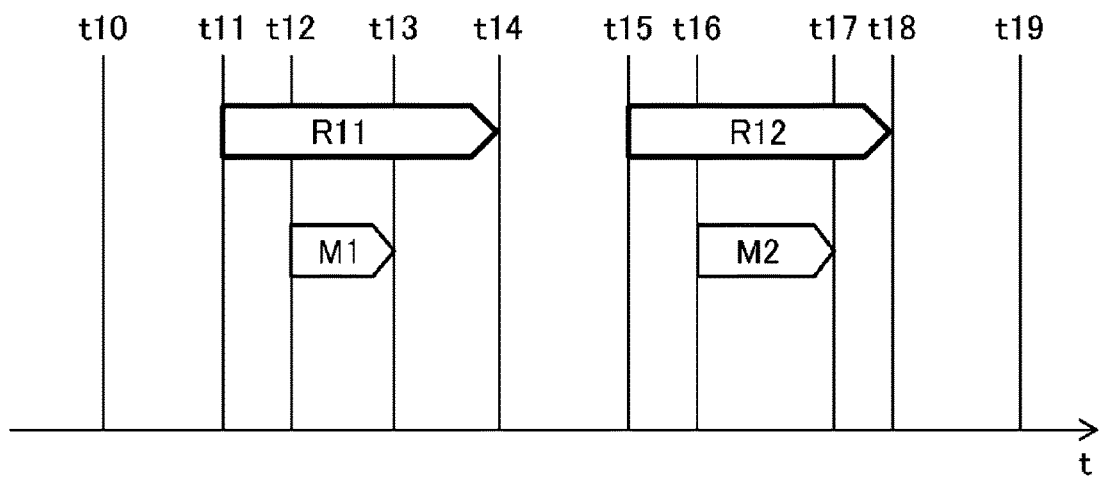
FIG. 21 is a time chart illustrating an example of the flow of time in primary photography processing in the photography control system illustrated in FIG. 20.
FIG. 22 is a diagram illustrating an example of a table managing photography data in primary photography processing in the photography control system illustrated in FIG. 20.

First, operations of primary photography processing of the photography control system 2 will be described. FIG. 21 is a time chart illustrating an example of the flow of time in the primary photography processing of the photography control system 2. This time chart illustrates the time up to a subject ID detected at the subject identification information input unit 52 of the accepting terminal 48 at the photography area entrance 42 being detected by the subject identification information input unit 52 of the accepting terminal 48 at the photography area exit 43, the time of the primary photography control unit 55 instructing the photographing camera 47 to start photography, the time of instructing ending of photography, and the time at which the subject identification barcode tag 46 of the same ID as the detected subject ID begins to show up in the photography data taken by the photographing camera 47 and the time at which it show up no more.

Time t10 is the time at which the subject 45 has held the subject identification barcode tag 46 up to the accepting terminal 48 at the photography area entrance 42 and the subject identification information input unit 52 has detected the subject ID. Time t19 is the time at which the subject 45 has held the subject identification barcode tag 46 up to the accepting terminal 48 at the photography area exit 43 and the subject identification information input unit 52 has detected the subject ID. Since the subject 45 is in the photography area from time t10 to time t19, detection of the subject ID is performed only on photography data of this time period, out of the photography data that has been taken.

Time t11 and time t15 are times at which the subject information detecting unit 51 of the accepting terminal 48 at the photography area entrance 42 has started to detect a moving body near the commemorative photography spot 44. The primary photography control unit 55 instructs the photographing camera 47 to start photography, and the photographing camera 47 that has received this instruction starts photography of a moving image by the photographing camera 47 from this point in time. Also, time t14 and time t18 are times at which a state where no moving body was detected has continued for a predetermined amount of time after the subject information detecting unit 51 of the accepting terminal 48 at the photography area exit 43 no longer detects a moving body near the commemorative photography spot 44. The primary photography control unit 55 instructs the photographing camera 47 to stop photography at these points in time. Accordingly, the time bar R11 from time t11 to time t14 indicates the time period where the photography data R11 was taken, and the time bar R12 from time t15 to time t18 indicates the time period where the photography data R12 was taken.

Time t12 and time t16 are times where the subject identification barcode tag 46 was first detected from the image frames of the photography data R11 and R12, respectively. Time t13 and time t17 are times where the subject identification barcode tag 46 was no longer detected from the image frames of the photography data R11 and R12, respectively. Accordingly, the time bar M1 from time t12 to time t13 represents the time period of image frames where the subject identification barcode tag 46 was detected from the photography data R11, and the time bar M2 from time t16 to time t17 represents the time period of image frames where the subject identification barcode tag 46 was detected from the photography data R12.

FIG. 22 is a diagram illustrating an example of a table that manages the photography data from primary photography processing of the photography control system 2 illustrated in FIG. 20, representing the content at the point of time t19 in FIG. 21, for example. The table illustrated in FIG. 22 indicates that the photography data R11, taken by a photography request from the primary photography control unit 55, was taken with photography starting at time t11 and photography ending at time t14, and in the same way, the photography data R12 was taken with photography starting at time t15 and photography ending at time t18. The data corresponding to this table is saved in the temporary photography data storage unit 54 along with the photography data.

Figure 23:
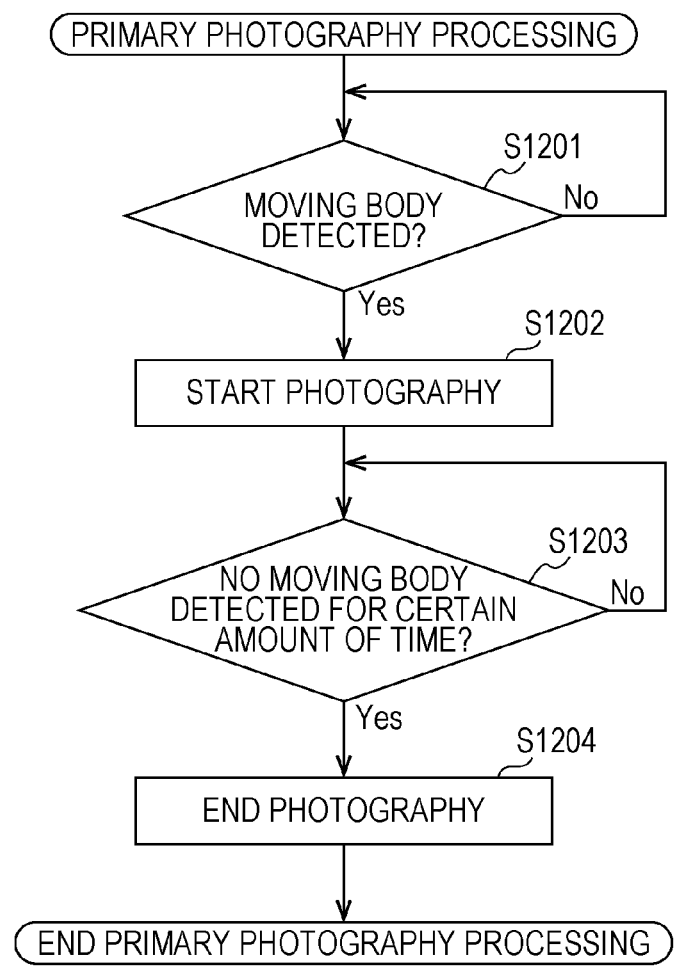
FIG. 23 is a flowchart illustrating an example of procedures of primary photography processing in the photography control system illustrated in FIG. 20.

FIG. 23 is a flowchart illustrating an example of procedures for primary photography processing of the photography control system 2 illustrated in FIG. 20. Upon detecting the subject 45 moving from the photography area entrance 42 toward the commemorative photography spot 44, the subject information detecting unit 51 of the accepting terminal 48 at the photography area entrance 42 outputs information of this detection as subject information. This subject information is output to the primary photography control unit 55, as described earlier. The primary photography control unit 55 determines whether or not there is a moving body, by determining whether or not subject information has been received from the accepting terminal 48 at the photography area entrance 42 (step S1201). In a case of having received subject information from the accepting terminal 48 at the photography area entrance 42, determination is made that there is a moving body heading from the photography area entrance 42 toward the commemorative photography spot 44, and the flow advances to step S1202. On the other hand, in a case of having received no subject information from the accepting terminal 48 at the photography area entrance 42, determination is made that there is no moving body heading from the photography area entrance 42 toward the commemorative photography spot 44, and the flow returns to step S1201.

In step S1202, the primary photography control unit 55 instructs the photographing camera 47 to start photography. The photographing camera 47 that has received this instruction to start photography starts shooting a moving image.

Upon detecting the subject 45 moving from the commemorative photography spot 44 toward the photography area exit 43, the subject information detecting unit 51 of the accepting terminal 48 at the photography area exit 43 outputs information of this detection as (moving body detection information). The accepting terminal 48 at the photography area exit 43 outputs this moving body detection information to the photography control server 50. The photography control server 50 outputs the moving body detection information received from the accepting terminal 48 at the photography area exit 43 to the primary photography control unit 55. The accepting terminal 48 at the photography area exit 43 may perform moving body detection information at certain time intervals. For example, as long as the moving body is present between the commemorative photography spot 44 and the photography area exit 43 in this case, the primary photography control unit 55 will continue to receive moving body detection information from the accepting terminal 48 at the photography area exit 43 at certain time intervals.

In a case where the subject information detecting unit 51 of the accepting terminal 48 at the photography area exit 43 detects a moving body and then does not detect the moving body any more, the subject information detecting unit 51 measures the amount of time where a state of not detecting the moving body has elapsed (duration) from the point that the moving body was no longer detected. This measurement can be made using a timer (omitted from illustration), for example. In a case where the moving body is detected again before a certain duration is reached, the subject information detecting unit 51 resets the duration, and measures the duration when the moving body that has been detected again is no longer detected again.

When a state where no moving body is detected continues for a certain amount of time, the subject information detecting unit 51 of the accepting terminal 48 at the photography area exit 43 outputs information indicating that the moving body has not been detected from a certain amount of time, as subject information. This subject information indicates that the subject 45 has left the photography area. This subject information is output from the accepting terminal 48 at the photography area exit 43 to the photography control server 50. The photography control server 50 outputs the subject information received form the accepting terminal 48 at the photography area exit 43 to the primary photography control unit 55.

In step S1203, the primary photography control unit 55 determines whether or not the moving body has not been detected for a certain amount of time, by determining whether or not subject information has been received from the accepting terminal 48 at the photography area exit 43. In a case where subject information has been received from the accepting terminal 48 at the photography area exit 43, the primary photography control unit 55 determines that the moving body has not been detected for a certain amount of time (Yes in step S1203), and the flow advances to step S1204. Otherwise (No in step S1203), the flow returns to step S1203.

In step S1204, the primary photography control unit 55 instructs the photographing camera 47 to stop photography. The photographing camera 47 that has received the instruction to stop photography, stops photography. The photography data of the moving image shot by the photographing camera 47 during the time from starting to ending photography is temporarily saved in the temporary photography data storage unit 54. At this time, the primary photography control unit 55 saves information associating the time at which taking of the moving image started (start time) and the time at which taking of the moving image ended (end time) with the photography data of the moving image, in the temporary photography data storage unit 54 as a table.

Next, a specific example of primary photography processing in the photography control system 2 will be described. The time period up to time t10 in FIG. 21, i.e., the state where step S1201 is being repeated in FIG. 23, indicates that there is no subject in the photography area.

Time t10 is the time at which the subject 45 has held the subject identification barcode tag 46 up to the accepting terminal 48 at the photography area entrance 42. This does not serve as a trigger to perform anything in the primary photography processing.

Time t11 is the time at which the subject information detecting unit 51 of the accepting terminal 48 at the photography area entrance 42 has started to detect the subject 45 moving from the photography area entrance 42 toward the commemorative photography spot 44 as a moving body. The subject information detecting unit 51 of the accepting terminal 48 installed at the photography area entrance 42 outputs information indicating that a moving body has been detected, as subject information. This subject information is output to the primary photography control unit 55, as described earlier. Upon receiving the subject information, the primary photography control unit 55 determines in step S1201 that a moving body has been detected, and the flow advances to step S1202.

In step S1202, the primary photography control unit 55 instructs the photographing camera 47 to start taking a moving image. This instruction to start photography is output to the photographing camera 47, as described earlier. The photographing camera 47 takes moving images at 30 frames per second, for example. The photographing camera 47 successively transmits the image frames taken every ⅟30 seconds, for example, to the photography control server 50. The photography control server 50 successively saves the image frames successively received from the photographing camera 47 in the photography data R11 in the temporary photography data storage unit 54. Information of the time of starting photography by the photographing camera 47 is also added to the table in the temporary photography data storage unit 54.

Upon detecting the subject 45 heading from the commemorative photography spot 44 toward the photography area exit 43, the subject information detecting unit 51 of the accepting terminal 48 at the photography area exit 43 outputs this information that has been detected (moving body detection information). This moving body detection information is output to the primary photography control unit 55, as described above. Detection of the moving body heading from the commemorative photography spot 44 toward the photography area exit 43 is performed at certain time intervals. Each time a moving body is detected by the accepting terminal 48 at the photography area exit 43, moving body detection information is output to the primary photography control unit 55.

On the other hand, when the moving body is no longer detected, the subject information detecting unit 51 of the accepting terminal 48 at the photography area exit 43 measures the amount of time over which a state continues where the moving body is not detected, from this point where the moving body is no longer detected. When a state where the moving body is not detected continues for a certain amount of time, information indicating that the moving body has not been detected for a certain amount of time is output as subject information. This subject information is output to the primary photography control unit 55, as described earlier. This, the primary photography control unit 55 determines whether or not the moving body is no longer detected for a certain amount of time, by determining whether or not subject information has been received from the accepting terminal 48 at the photography area exit 43.

In a case of having received subject information from the accepting terminal 48 at the photography area exit 43, the primary photography control unit 55 determines that the moving body is no longer detected for a certain amount of time (Yes in step S1203), and the flow advances to step S1204. Otherwise (No in step S1203), the flow returns to step S1203.

For example, the time at which the primary photography control unit 55 receives the subject information from the accepting terminal 48 at the photography area exit 43 and the primary photography control unit 55 determines that no moving body has been detected for a certain amount of time in step S1203, is time t14. At this time, the primary photography control unit 55 instructs the photographing camera 47 to end photography. The instruction to end photography is output from the photography control server 50 to the photographing camera 47. The photographing camera 47 that has received the instruction to end photography, ends photography.

Although time t19 is the time at which the subject 45 has held the subject identification barcode tag 46 up to the accepting terminal 48 at the photography area exit 43, this does not serve as a trigger to perform anything in the primary photography processing. This so far has been a description of the primary photography processing performed in the photography control system 2.

2-3-2. Secondary Photography Processing

Next, secondary photography processing in the photography control system 2 will be described. FIG. 24 is a diagram illustrating an example of a table associating subject IDs and photography data, in secondary photography processing in the photography control system 2 illustrated in FIG. 20. The table in FIG. 24 shows that photography data M1 taken of a subject of which the subject ID is ID5 (subject ID5) is photography data of which the photography time is from time t12 to time t13, and that photography data M2 taken of a subject of which the subject ID is ID5 is photography data of which the photography time is from time t16 to time t17. The data corresponding to this table is saved in the photography data storage unit 57 along with the photography data. Thus, the photography data M1 extracted from the photography data R11 is associated with the subject 1D5 and saved in the photography data storage unit 57. In the same way, the photography data M2 extracted from the photography data R12 is associated with the subject 1D5 and saved in the photography data storage unit 57.

Figure 25:
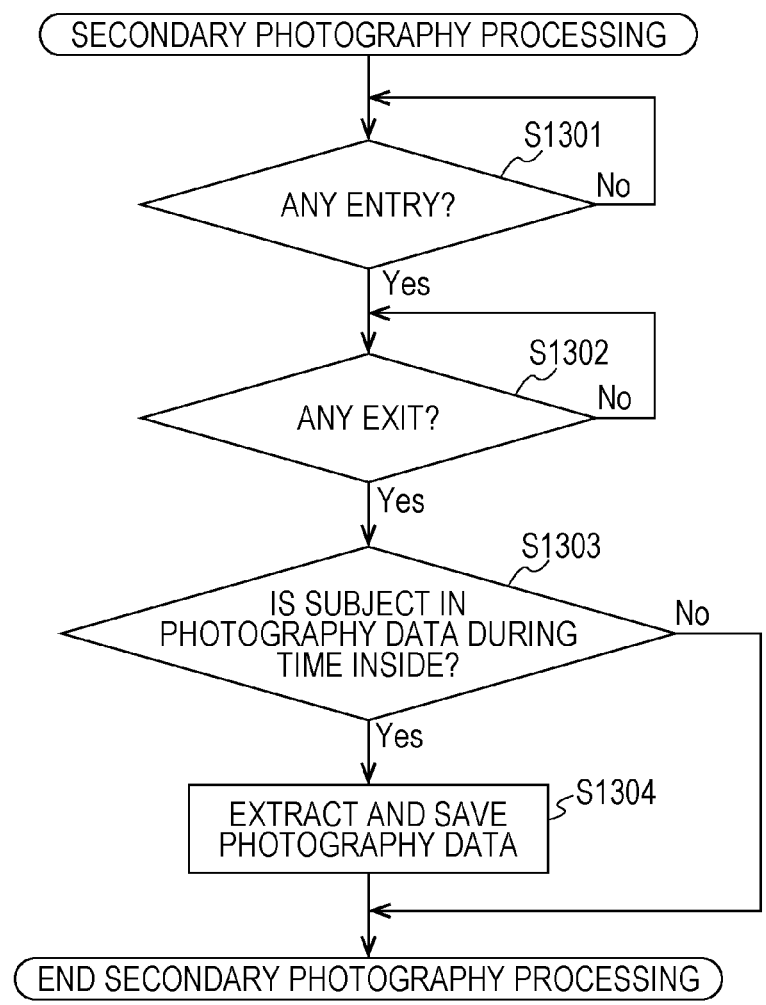
FIG. 25 is a flowchart illustrating an example of procedures of secondary photography processing in the photography control system illustrated in FIG. 20.

FIG. 25 is a flowchart illustrating an example of procedures of the secondary photography processing in the photography control system 2 illustrated in FIG. 20. First, determination is made regarding whether or not a person, who is the subject 45, has entered from the photography area entrance 42 (step S1301). Upon the subject 45 holding the subject identification barcode tag 46 up to the accepting terminal 48 installed at the photography area entrance 42, the subject identification information input unit 52 of the accepting terminal 48 installed at the photography area entrance 42 detects the subject ID, and outputs subject identification information including the detected subject ID and the time of detection (time of entry). This subject identification information is output to the secondary photography control unit 56 as described earlier. Thus, the secondary photography control unit 56 can determine whether or not there has been an entry, by determining whether or not subject identification information has been received from the accepting terminal 48 at the photography area entrance 42. In a case where subject identification information has been received from the accepting terminal 48 at the photography area entrance 42, the secondary photography control unit 56 determines that there has been an entering person (Yes in step S1301), and the flow advances to step S1302. On the other hand, in a case where no subject identification information has been received from the accepting terminal 48 at the photography area entrance 42, the secondary photography control unit 56 determines that there has been no entering person (No in step S1301), and the flow returns to step S1301.

Upon the subject 45 holding the subject identification barcode tag 46 up to the accepting terminal 48 installed at the photography area exit 43, the subject identification information input unit 52 of the accepting terminal 48 installed at the photography area exit 43 detects the subject ID, and outputs the detected subject ID as subject identification information. This subject identification information is output to the secondary photography control unit 56, as described earlier. Accordingly, the secondary photography control unit 56 determines whether or not there has been an exiting person by determining whether or not subject identification information has been received from the accepting terminal 48 at the photography area exit 43. In a case where subject identification information has been received from the accepting terminal 48 at the photography area exit 43, determination is made that there has been an exiting person (Yes in step S1302), and the flow advances to step S1303. On the other hand, in a case where no subject identification information has been received from the accepting terminal 48 at the photography area exit 43, determination is made that there has been no exiting person (No in step S1302), and the flow returns to step S1302.

Assumption is being made here that the subject ID indicated by the subject identification information received in both step S1301 and step S1302 is subject ID5. Further, the time period over which the subject 45 having the subject ID5 was in the photography area is from time t1 to time t19.

In step S1303, the secondary photography control unit 56 determines whether or not there is photography data that the subject 45 is in, in the photography data (moving image) for the time that the subject 45 was in the photography area. In a case where determination is made that there is photography data that the subject 45 is in (Yes in step S1303), the flow advances to step S1304, and otherwise (No in step S1303), the secondary photography processing ends.

If photography data that the subject 45 is in can be extracted from the photography data taken in the primary photography processing at the time period when the subject 45 was in the photography area, after the subject 45 has exited the photography area, the secondary photography control unit 56 determines that the subject 45 is in the extracted photography data. That is to say, determination is made that the subject 45 is in the photography data (moving image) for the time that the subject 45 was in the photography area.

In step S1303, the secondary photography control unit 56 first references the table in the temporary photography data storage unit 54 and identifies photography data temporarily saved, to use for extracting the photography data taken of the subject 45. In this case, the photography data is the photography data R11 and photography data R12. The secondary photography control unit 56 then attempts to detect the subject ID from the photography data R11 and photography data R12 saved in the primary photography processing.

Description will be made here regarding processing of extracting the subject ID from the photography data R11 of the moving image, to simplify description. The subject ID that the subject identification information indicates is subject ID5. Processing for detecting the subject ID from the photography data R12 of the moving image is the same as the processing for detecting the subject ID from the photography data R11 of the moving image, so description will be omitted here.

Now, detection of the subject ID from the photography data R11 is performed by extracting each of the image frames included in the photography data R11 of the moving image as still images, and determining whether or not the subject ID can be read from these still images, as described earlier. In a case where the subject ID has been read from a still image, this subject ID is matched with the subject ID that the subject identification information indicates. In a case where these match, determination is made that the subject of the subject ID that the subject identification information indicates is in the image frame corresponding to the still image.

In step S1304, the secondary photography control unit 56 extracts the image frames in the photography data R11 regarding which determination has been made that the subject of subject ID5 is in, and the extracted photography data is saved in the photography data storage unit 57 as photography data M1. Description will be made here assuming that there are multiple sets of extracted photography data.

Note that even in a case where the subject ID could not be read in consecutive frames immediately after an image frame where the subject ID was read, there are cases where the same subject ID is read again in later image frames. In this case, the secondary photography control unit 56 determines that the same subject ID is in image frames where the subject ID could not be read, as well. Thus, even if the subject temporarily turns sideways and the subject identification barcode tag 46 is not in the images, these can be determined to be image frames that the subject is in. Image frames regarding which determination has been made that the subject is in are saved in the photography data storage unit 57 as photography data M1 (step S1304), and the secondary photography processing ends.

Information associating the subject ID5, oldest time in photography time out of the image frames regarding which determination has been made that the subject of subject ID5 is in (start time t12), and newest time in photography time (end time t13), with the photography data M1, is saved in the table in photography data storage unit 57. Further, as a result of performing step S1303 and step S1304 on the photography data R12, information associating the subject ID5, oldest time in photography time out of the image frames regarding which determination has been made that the subject of subject ID5 is in (start time t16), and newest time in photography time (end time t17), with the photography data M2, is saved in the table in photography data storage unit 57.

Next, a specific example of the secondary photography processing in the photography control system 2 will be described. In the secondary photography processing according to eth present embodiment, the subject 45 first holds up the subject identification barcode tag 46 to the accepting terminal 48 installed at the photography area entrance 42 at time t10 in FIG. 21, upon which the subject identification information input unit 52 of the accepting terminal 48 reads the QR code printed on the subject identification barcode tag 46, and detects (or acquires) the value that the QR code indicates (subject ID5). The subject identification information input unit 52 outputs subject identification information including the time at which the subject ID5 was detected (entering time) and the subject ID5. This subject identification information is output to the secondary photography control unit 56, as described earlier. A determination of Yes is yielded in step S1301 by the secondary photography control unit 56 receiving the subject identification information from the accepting terminal 48 at the photography area entrance 42. Note that much literature and many algorithms have been disclosed for methods of reading the QR code and detecting the value indicated by the QR code, so detailed description will be omitted here.

Next, the subject 45 holds up the subject identification barcode tag 46 to the accepting terminal 48 installed at the photography area exit 43 at time t19, upon which the subject identification information input unit 52 of the accepting terminal 48 reads the QR code printed on the subject identification barcode tag 46, and detects (or acquires) the value that the QR code indicates (subject ID5). The subject identification information input unit 52 outputs subject identification information including the time at which the subject ID5 was detected (exiting time) and the subject ID5. This subject identification information is output to the secondary photography control unit 56, as described earlier. A determination of Yes is yielded in step S1302 by the secondary photography control unit 56 receiving the subject identification information from the accepting terminal 48 at the photography area exit 43.

During step S1301 to step S1302, i.e., which the subject 45 of the subject ID5 is in the photography area, the photography data R11 of the subject 45 from time t11 to time t14, and the photography data R12 of the subject 45 from time t15 to time t18, are each saved in the temporary photography data storage unit 54.

The secondary photography control unit 56 according to the present embodiment extracts photography data that the subject of subject ID5 is in, from the photography data R11 of a moving image and the photography data R12 of a moving image, that are saved in the temporary photography data storage unit 54 (step S1303).

It can be seen from FIG. 21 that the photography data taken by the primary photography processing during the start time t10 through end time t19 is the two of the photography data R11 from time t11 to time t14, and the photography data R12 from time t15 to time t18. The secondary photography control unit 56 extracts photography data that the subject 45 is in from these two sets of photography data.

In step S1303, the secondary photography control unit 56 first starts the task of reading out and extracting the photography data R11 from the temporary photography data storage unit 54. Whether or not the subject 45 is in the photography data is determined by detecting the QR code of the subject identification barcode tag 46 that the subject 45 is carrying as illustrated in FIG. 19, from the image data obtained by extracting each frame of the moving image that is the photography data as still images, and determining the subject ID that the QR code indicates is the subject ID acquired by the subject identification information input unit 52, i.e., whether or not the subject ID5. The moving image extracted as photography data of the subject ID5 n the present embodiment is a moving image started from the frame where the subject ID5, which is the subject ID of the subject 45, was first detected, i.e., from the frame at time t12 in FIG. 21.

The secondary photography control unit 56 then checks the time at which the QR code of the subject identification barcode tag 46 is no longer detected from the images where the frames of the moving image that is the photography data have been successively extracted as still images, or the subject ID that the detected QR code is other than the subject ID5, and sets the time t13 at which the subject ID5 is no longer detected as the end time for the photography data regarding the subject ID5. Thus, the secondary photography control unit 56 extracts photography data of the time period where the subject 45 is included, from the photography data R11 taken in the primary photography processing, and saves this in the photography data storage unit 57 as photography data M1.

The secondary photography control unit 56 also saves information that the photography data M1 of the subject ID5 has been saved as a moving image from time t12 to time t13 in the table in the photography data storage unit 57, as information of the photography data that has been taken. In the same way, the task of reading out and extracting the photography data R12 from the temporary photography data storage unit 54 is performed, and a moving image of the subject ID5 from time t16 to time t17 is saved in the photography data storage unit 57 as photography data M2.

Thus, the subject 45 can shoot a moving image using the photographing camera 47 at the commemorative photography spot 44 in front of the monument 41. The subject 45 can also access the moving image photography data of the subject ID5 saved in the photography data storage unit 57. The photography data taken with regard to the subject ID5 of the subject identification barcode tag 46 that the subject 45 carries may be saved in a cloud region dedicated for the subject ID5 on the Internet, and the subject 45 can acquire the photography data by accessing this cloud region. This so far has been description of the secondary photography processing performed in the photography control system 2.

Although an example has described in the present embodiment where the photographing camera 47, accepting terminal 48, and photography control server 50 are all physically separate entities, this is not restrictive. For example, the requisites of the photography control server 50 may be assembled into the photographing camera 47. In this case, the device obtained by assembling the requisites of the photography control server 50 into the photographing camera 47 may be referred to either as a photographing camera or a photography control server. Conversely, the requisites of the photography control server 50 may be assembled into the accepting terminal 48. In this case, the device obtained by assembling the requisites of the photography control server 50 into the accepting terminal 48 may be referred to either as an accepting terminal or a photography control server.

2-4. Advantages

According to the present embodiment, a moving image of around the commemorative photography spot 44 may be taken by primary photography processing during the time period where the moving body is being detected, and in the secondary photography processing detect the subject ID of the subject 45 from the moving image that has been taken, extract only a moving image of the time period where the subject 45 is in the moving image, and save in the photography data storage unit 57. Thus, only the subject him/herself having the subject ID can acquire photography data of him/herself at the time period when the subject was at the photography spot.

3. Third Embodiment

Next, a photography control system according to a third embodiment of the present disclosure will be described with reference to drawings. The photography control system is a system for providing a service where a subject him/herself can operate a photographing camera installed at photography spots, such as theme parks, amusement facilities, sightseeing destinations, and so forth, to perform photography and acquire photography data. Description will be made in the present embodiment regarding an example where a commemorative photography spot has been provided in a photography area in front of a monument, as a photography spot in an amusement facility, and commemorative photography is made in still images. Note that the present embodiment assumes that only one set of subjects enter the commemorative photography spot at one time.

3.1. Overview

Figure 26:
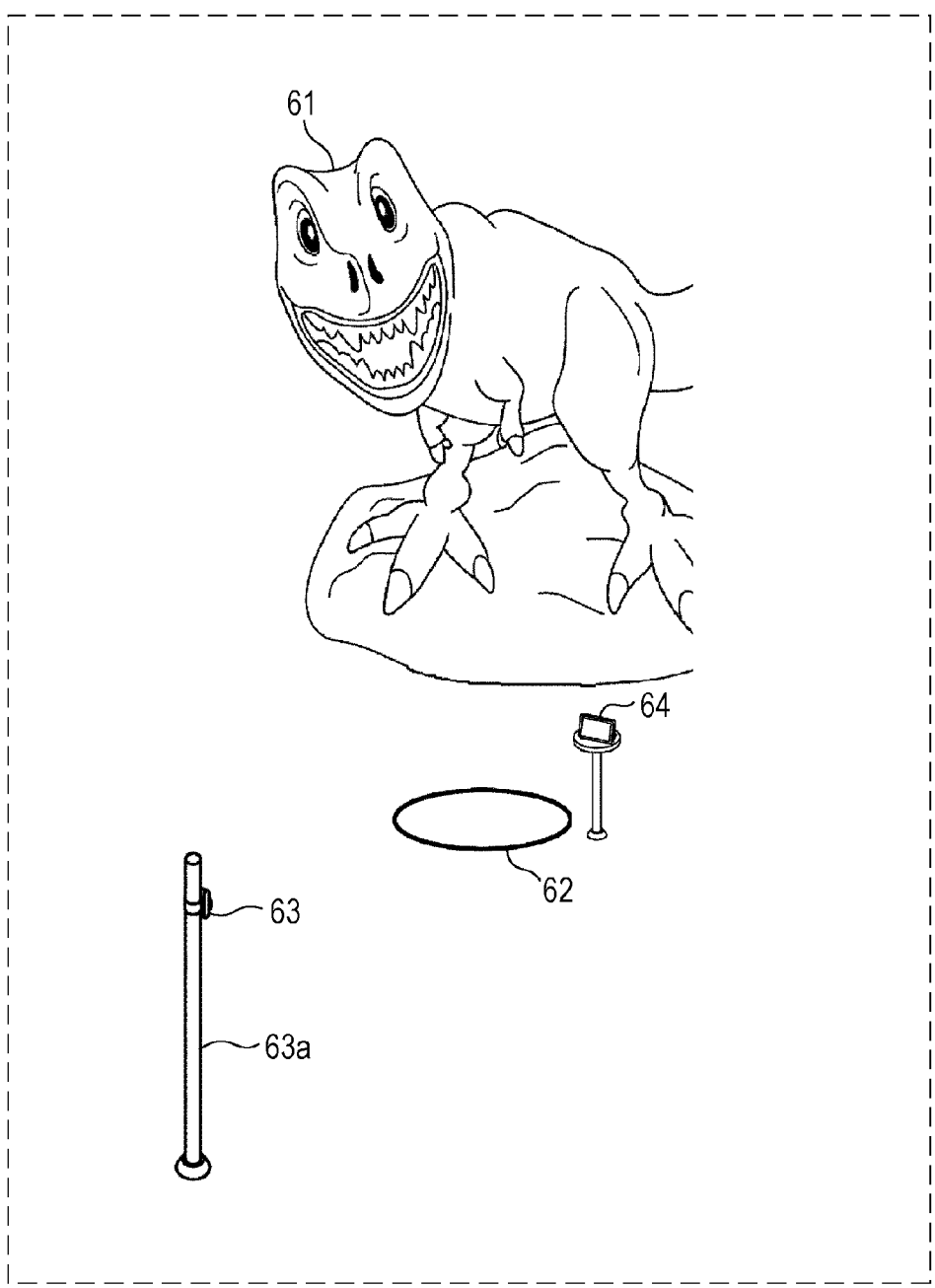
FIG. 26 is a diagram illustrating an example of a scene where a photography control system according to a third embodiment of the present disclosure is being used.

FIG. 26 is a diagram illustrating an example of a scene where a photography control system according to the third embodiment of the present disclosure is being used. In FIG. 26, the photography spot has a monument 61, a commemorative photography spot 62, a photographing camera 63, and a photographing terminal 64. The commemorative photography spot 62 is positioned such that a photograph of a desirable angle can be taken if a subject stands at this position for photography by the photographing camera 63, and is a circle drawn on the ground serving as a mark. The photographing camera 63 is attached to a pole 63*a* and faces the commemorative photography spot 62, so as to be able to photograph subjects who are people at the commemorative photography spot 62 along with the monument 61. The photographing terminal 64 according to the present embodiment has later-described IC chip detection functions, and a photography button that the photographer presses as a trigger for photography.

Figure 27:
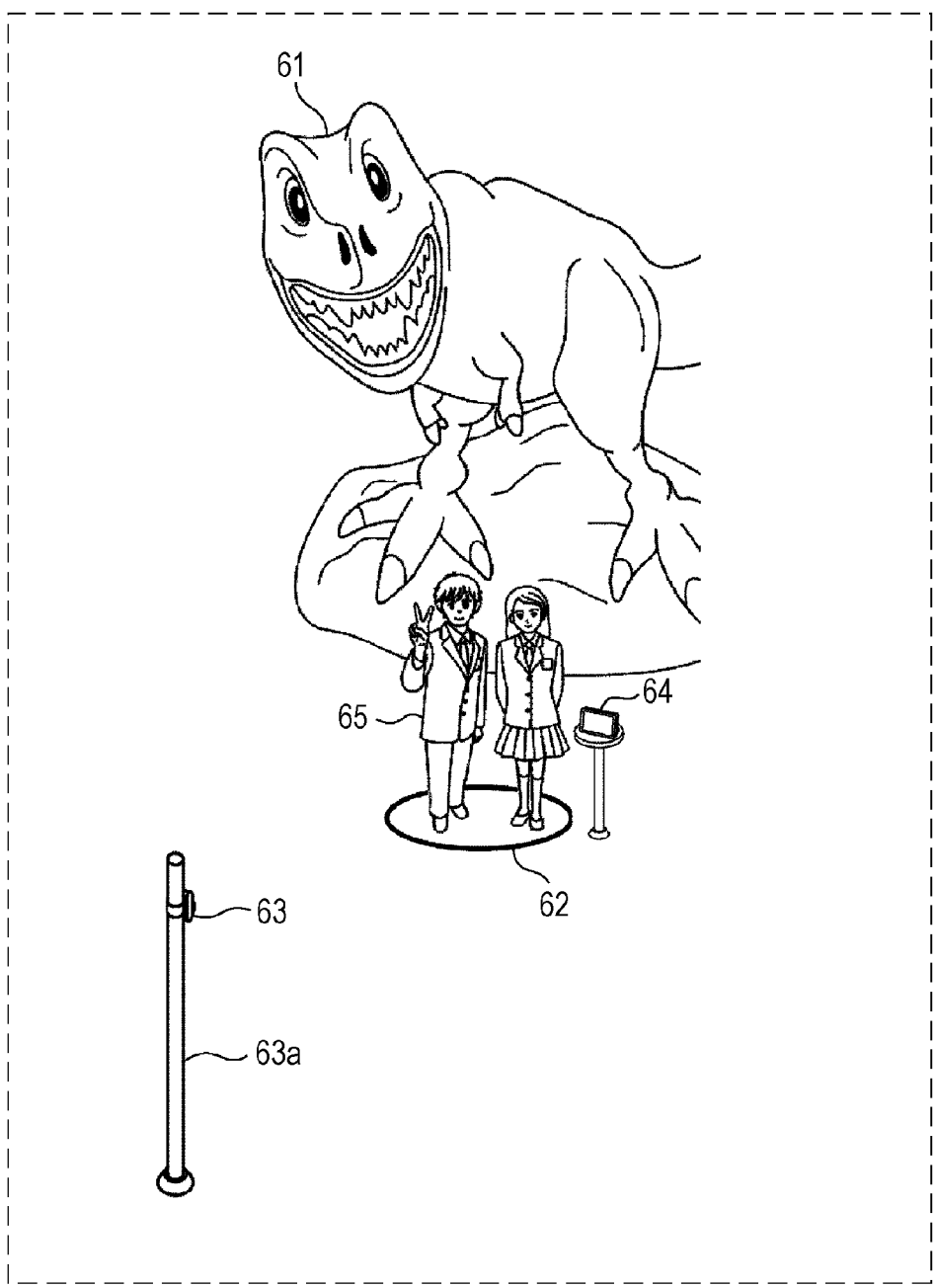
FIG. 27 is a diagram illustrating an instance of performing photography in the scene in FIG. 26 where the photography control system is being used.

FIG. 27 is a diagram illustrating an instance of performing photography in the scene in FIG. 26 where the photography control system is being used. A subject 65 is standing at the commemorative photography spot 62 in FIG. 27.

Figure 28:
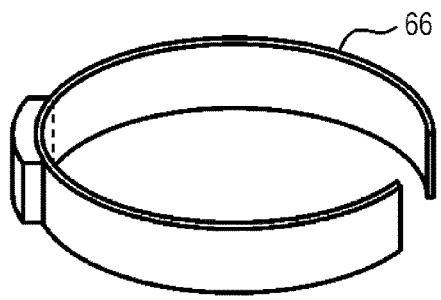
FIG. 28 is a diagram illustrating the external view of an example of a subject identification wristband worn by a subject, as illustrated in FIG. 27.

FIG. 28 is a diagram illustrating the external view of an example of a subject identification wristband worn by the subject 65 illustrated in FIG. 27. The subject identification wristband 66 illustrated in FIG. 28 is used to identify subjects. The subject identification wristband 66 has an embedded IC chip, in which identification information for identifying the subject (identification information unique to the subject) is registered. The photographing terminal 64 is capable of reading the identification information of the subject. Much literature and many algorithms have been disclosed for arrangements to read identification information of a subject registered in an IC chip, so detailed description will be omitted here.

The photographing camera 63 and photographing terminal 64 are connected by network, and are capable of exchanging necessary information with each other through communication. The network includes a network corresponding to the Internet, to enable photography data taken by the photographing camera 63 to be provided to the user via the Internet. The photographing camera 63 and photographing terminal 64 are each connected to a photography control server 70 via the network. Details of the photography control server 70 will be described later.

In the present embodiment, the subject 65 operates the photographing terminal 64 at the commemorative photography spot 62 to photography the subject him/herself and the monument 61 using the photographing camera 63. The subject 65 holds up the subject identification wristband 66 serving as his/her own (subject) identification information (hereinafter referred to as "subject ID") to the photographing terminal 64. The photographing terminal 64 reads the subject ID, and performs photography operation by the subject 65.

In the present embodiment, the subject 65 is also the photographer. Upon the subject 65 pressing the photography button provided to the photographing terminal 64, the photographing terminal 64 outputs a photography instruction to the photography control server 70. The photography control server 70 receives (or acquires) the photography instruction, and instructs the photographing camera 63 to start photography. Upon receiving (or acquiring) the instruction to start photography, the photographing camera 63 performs photography.

The photography data taken by the photographing camera 63 is output to the photography control server 70. The photography control server 70 associates the received (or acquired) photography data with the subject ID, and saves in memory (omitted from illustration). The photography data may be associated with the subject ID and saved in a photography data storage unit in an Internet cloud. In this case, the subject 65 accesses the photography data storage unit in the Internet cloud using his/her own subject ID after performing photography, and thus can acquire the photography data that has been taken, i.e., image data of the photograph.

3-2. Configuration

Figure 29:
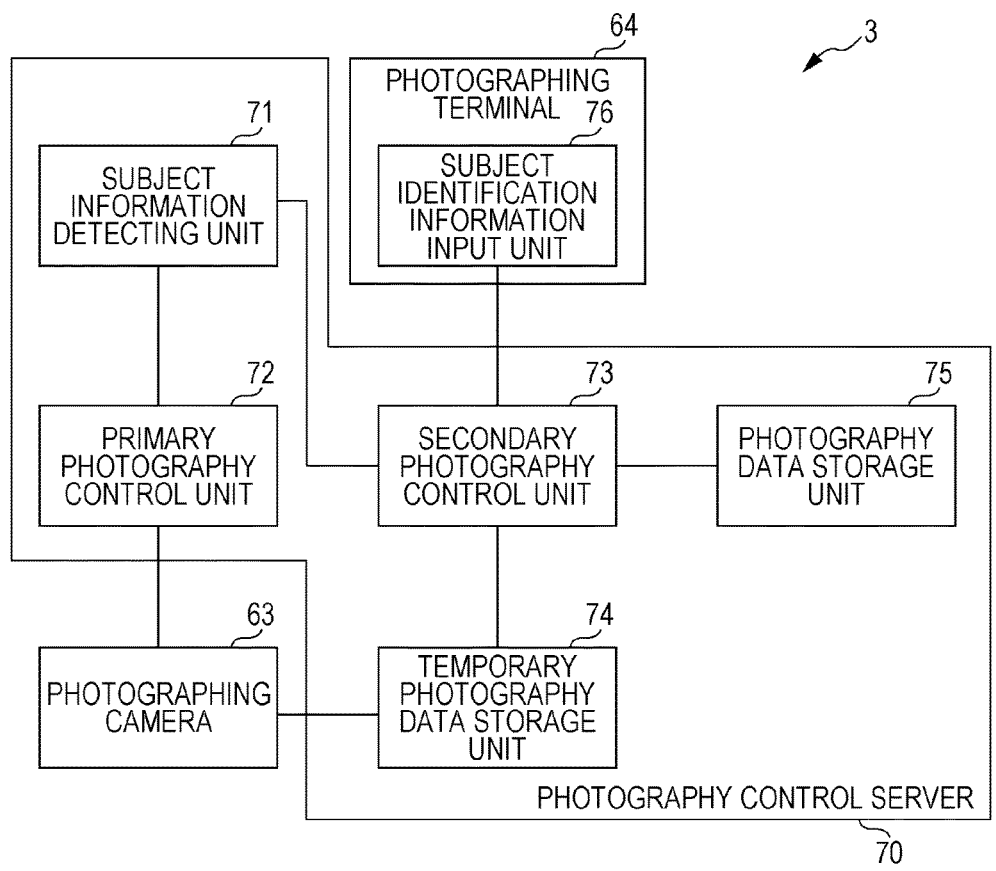
FIG. 29 is a block diagram illustrating an example of the configuration of the photography control system according to the third embodiment of the present disclosure.

Next, the configuration of the photography control system according to the present embodiment will be described. FIG. 29 is a block diagram illustrating an example of the configuration of the photography control system according to the third embodiment. The photography control system 3 illustrated in FIG. 29 has the photographing camera 63, photographing terminal 64, and photography control server 70. The photography control server 70 includes a subject information detecting unit 71, a primary photography control unit 72, a secondary photography control unit 73, a temporary photography data storage unit 74, and a photography data storage unit 75. The photographing terminal 64 includes a subject identification information input unit 76.

Note that the photographing camera 63, photographing terminal 64, and photography control server 70 are connected via network through certain communication units to be able to exchange information with each other by communication, but the communication units of each have been omitted from illustration in FIG. 29 to simplify the drawing. Also, a photography button is embedded in the subject identification information input unit 76 of the photographing terminal 64, but illustrating of the photography button has also been omitted to simplify the drawing.

When the subject holds the subject identification wristband 66 up to the photographing terminal 64, the subject identification information input unit 76 reads the subject ID registered in the IC chip embedded in the subject identification wristband 66. Thus, the subject identification information input unit 76 externally acquires the subject ID. The acquired subject ID is output from the photographing terminal 64 to the photography control server 70 as subject identification information. The photography control server 70 outputs the received (or acquired) subject identification information to the secondary photography control unit 73. Thus, the secondary photography control unit 73 can receive (or acquire) subject identification information from the photographing terminal 64.

The secondary photography control unit 73 stores the subject ID that the received subject identification information indicates in memory (omitted from illustration). In a case of performing photography, the subject 65 who is at the commemorative photography spot 62 presses the photography button embedded in the subject identification information input unit 76.

Upon the photography button being pressed, the subject identification information input unit 76 outputs information indicating that the photography button has been pressed (i.e., a photography trigger). The photography trigger is output from the photographing terminal 64 to the photography control server 70. The photography trigger that the photography control server 70 has received is output to the secondary photography control unit 73. Accordingly, the secondary photography control unit 73 can receive (or acquire) the photography trigger from the photographing terminal 64. When the photography trigger has been received, the secondary photography control unit 73 outputs the subject ID sorted in memory to the subject information detecting unit 71. According to this arrangement, when the photography button that the photographing terminal 64 has is pressed, the subject information detecting unit 71 can receive (or acquire) the subject ID from the secondary photography control unit 73.

The subject information detecting unit 71 outputs the subject ID received from the secondary photography control unit 73 to the primary photography control unit 72 as subject information. Subject information is output from the subject information detecting unit 71 in conjunction with the subject 65 at the commemorative photography spot 62 pressing the photography button. Accordingly, the subject information indicates that the subject 65 is at the commemorative photography spot 62 which is a photography spot.

The primary photography control unit 72 takes the subject information received from the subject information detecting unit 71 as a trigger, and instructs the photographing camera 63 to perform photography. The photography instruction may include the received subject ID.

The photography instruction is output from the photography control server 70 to the photographing camera 63. The photographing camera 63 receives the photography instruction from the primary photography control unit 72 and performs photography of the commemorative photography spot 62. The photographing camera 63 correlates information indicating the time of performing photography (photography time) and photograph data acquired by performing photography at this time. The photography time may be included in the photograph data, or may be separate from the photograph data.

The photographing camera 63 gives instructions to save the photography data in the temporary photography data storage unit 74. This instruction is output to the photography control server 70 along with the photography data and the subject ID. The photography control server 70 follows the received instructions to save the photography data in the temporary photography data storage unit 74. The photography control server 70 also temporarily stores information associating the photography data received from the photographing camera 63 with the subject ID and photography time of the photography data, in the temporary photography data storage unit 74 as a table.

The secondary photography control unit 73 receives the subject ID from the subject identification information input unit 76, reads the photography data taken by the photographing camera 63 from the temporary photography data storage unit 74, confirms that the subject ID of the photography data saved in the temporary photography data storage unit 74 and the subject ID received from the subject identification information input unit 76 match, and having confirmed this, saves the photography data in a region of the photography data storage unit 75 associated with the subject ID. Note that the subject information detecting unit 71, primary photography control unit 72, subject identification information input unit 76, and secondary photography control unit 73 function by processors executing programs stored in memory, thereby controlling the above-described functional units.

3-3. Operations

Figures 30, 31:
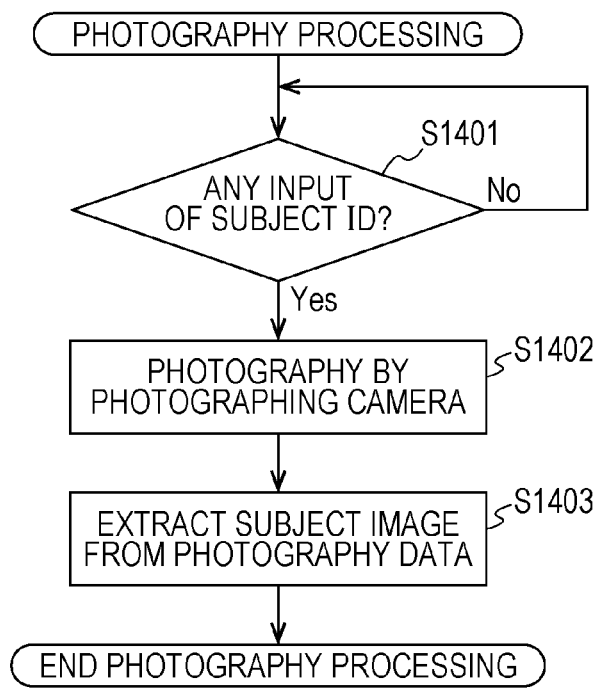
FIG. 30 is a diagram illustrating an example of a table managing correlation between subject IDs and photography data, in photography processing in the photography control system illustrated in FIG. 29.
FIG. 31 is a flowchart illustrating an example of procedures of photography processing in the photography control system illustrated in FIG. 29.

Next, operations of the photography control system 3 illustrated in FIG. 29 will be described. FIG. 30 is a diagram illustrating an example of a table associating the subject ID and photography data in the photography processing of the photography control system 3 illustrated in FIG. 29. In the table in FIG. 30, the photography data P1 taken of a subject of subject ID6 is shown to have been taken at time t21, and the photography data P2 taken of the subject of subject ID6 is shown to have been taken at time t22. Data corresponding to this table is saved in the table in the photography data storage unit 75 along with the photography data. Thus, the photography data P1 is associated with the subject ID6 and saved in the photography data storage unit 75 along with the photography data.

FIG. 31 is a flowchart illustrating an example of procedures of the photography processing in the photography control system 3 illustrated in FIG. 29. Upon acquiring the subject ID from the IC chip in the subject identification wristband 66, the subject identification information input unit 76 outputs the subject ID as subject identification information. This subject identification information is output to the secondary photography control unit 73, as described earlier.

In step S1401, the secondary photography control unit 73 determines whether or not there has been acquisition of a subject ID at the photographing terminal 64, by determining whether or not subject identification information has been received from the photographing terminal 64, for example. In a case where subject identification information has been received from the photographing terminal 64, determination is made that the photographing terminal 64 has acquired the subject ID (Yes in step S1401), and the flow advances to step S1402. On the other hand, in a case where subject identification information has not been received from the photographing terminal 64, determination is made that the photographing terminal 64 has not acquired a subject ID (No in step S1401), and the flow returns to step S1401.

When the subject 65 presses the photography button embedded in the subject identification information input unit 76 of the photographing terminal 64, the subject identification information input unit 76 outputs a photography trigger. This photography trigger is output to the photography control server 70. The photography control server 70 receives this trigger and instructs photography by the photographing camera 63.

Upon receiving this instruction for photography, the photographing camera 63 performs photography. The photographing camera 63 also gives an instruction to save the photography data in the temporary photography data storage unit 74. This instruction is output to the photography control server 70 along with the photography data. The photography control server 70 saves photography data received according to the instruction in the temporary photography data storage unit 74 (step S1402).

Specifically, upon receiving the photography trigger from the photographing terminal 64, the secondary photography control unit 73 outputs the subject ID stored in memory to the subject information detecting unit 71. This means that the subject identification information (subject ID) received in step S1401 is output to the subject information detecting unit 71. The subject information detecting unit 71 outputs the subject ID received (or acquired) from the secondary photography control unit 73 to the primary photography control unit 72 as subject information. Upon receiving the subject information from the subject information detecting unit 71, the primary photography control unit 72 instructs the photographing camera 63 to perform photography. The photographing camera 63 temporarily saves the photography data that has been taken in the temporary photography data storage unit 74.

Next, the secondary photography control unit 73 reads the temporarily-saved photography data from the temporary photography data storage unit 74, and saves the photography data in the photography data storage unit 75 upon having confirmed that the subject ID of the photography data saved in memory and the subject ID acquired at the subject identification information input unit 76 match. Information associating the photography data, the subject ID, and the date and time of photography, is saved in the photography data storage unit 75 as a table (step S1403).

Next, a specific example of the photography processing in the photography control system 3 will be described. First, the subject 65 moves to the commemorative photography spot 62 where there is the monument 61, and holds the subject identification wristband 66 that has the subject ID embedded up to the photographing terminal 64. The subject identification information input unit 76 acquires the subject ID of the subject identification wristband 66 that the photographing terminal 64 has detected, i.e., the ID6 (subject ID6) in the present embodiment. The subject identification information input unit 76 repeatedly performs detection of subject ID until a subject ID is acquired from the subject 65. Once a subject ID is acquired, the subject identification information input unit 76 outputs the acquired subject ID to the secondary photography control unit 73 as subject identification information. The secondary photography control unit 73 receives the subject identification information (Yes in step S1401) and advances to the next processing (step S1402).

The secondary photography control unit 73 that has received the subject identification information stands by for a photography instruction from the photographer, i.e., the subject 65. In the present embodiment, the photographer gives a photography instruction by pressing the photography button provided to the photographing terminal 64. An arrangement may be made where the photographing terminal 64 further has a display unit, whereby an image for confirmation of the image that the photographing camera 63 is going to take can displayed, so the subject 65 can confirm the position of the photographing camera 63, and find a desirable pose for photography.

At time t21, the subject 65 presses the photography button of the photographing terminal 64, thereby issuing a photography trigger to the secondary photography control unit 73. The secondary photography control unit 73 that has received the photography trigger outputs the subject ID to the subject information detecting unit 71.

The subject information detecting unit 71 that has received the subject ID from the secondary photography control unit 73 outputs the received subject ID to the primary photography control unit 72 as subject information. The primary photography control unit 72 takes the subject information from the subject information detecting unit 71 as a trigger to instruct the photographing camera 63 to perform photography.

In the present embodiment, upon receiving an instruction for photography from the primary photography control unit 72, the photographing camera 63 performs photography of the commemorative photography spot 62. The photographing camera 63 saves the photography data in the temporary photography data storage unit 74 in a manner associated with the subject ID (step S1402). Photography data in the present embodiment is a data of a single image, i.e., photograph data.

Next, the secondary photography control unit 73 confirms that the subject ID of the photography data saved in the temporary photography data storage unit 74 and the acquired subject ID match, and save the photography data in the photography data storage unit 75 in a manner associated with the subject ID (step S1403).

FIG. 30 illustrates an example of associating photography data and subject ID, as information saved in the form of a table. For example, this indicates that the photography data P1 regarding which the photography instruction was given at time t21 is associated with the subject ID6. This also indicates that the subject 65 gave a photography instruction for a second photograph at time t22, which was saved as photography data P2. Data indicating recording of these photographs is also saved in the photography data storage unit 75. Accordingly, the photography data saved in the photography data storage unit 75 associated with the subject ID can only be accessed by the subject 65 who can know the subject ID6, and thus can acquire the photography data from the photography data storage unit 75.

The photography processing performed in the photography control system 3 has been described so far. Although an example has described in the present embodiment where the photographing camera 63, photographing terminal 64 and photography control server 70 are all physically separate entities, this is not restrictive. For example, the requisites of the photography control server 70 may be assembled into the photographing camera 63. In this case, the device obtained by assembling the requisites of the photography control server 70 into the photographing camera 63 may be referred to either as a photographing camera or a photography control server. Conversely, the requisites of the photography control server 70 may be assembled into the photographing terminal 64. In this case, the device obtained by assembling the requisites of the photography control server 70 into the photographing terminal 64 may be referred to either as an photographing terminal or a photography control server.

3-4. Advantages

According to the present embodiment, by holding up to the photographing terminal 64 the subject identification wristband 66 in which is registered the subject ID of the subject 65, and pressing the photography button provided to the photographing terminal 64, the subject 65 can take his/her own photograph at the commemorative photography spot 62, and can acquire the taken photography data using the subject ID. Other photographers who cannot know the subject ID of the subject 65 can neither photograph the subject 65 at the commemorative photography spot 62 nor acquire photography data that the subject 65 has taken, so the subject 65 can perform photography with privacy protected using the photography control system 3.

4. Modifications

Although three embodiments of the photography control system according to the present disclosure have been described above, the photography control system that has been exemplarily illustrated may be modified as follows, and it goes without saying that the present disclosure is not restricted to the photography control system described above.

(1) Although the above embodiments do not describe how to delete photography data and table information temporarily saved in the temporary photography data storage unit, the photography data and table information can be deleted by a method appropriate for the usage form of the photography control system, such as deleting at nighttime in a case where the photography control system is stopped at night, deleting when all target subjects have executed the photography spot (or photography area), deleting when available memory is running low, deleting at the point that primary photography processing has ended, and so forth.

(2) Although the first embodiment described above has been described regarding an arrangement where the pavilion entrance 11 and pavilion exit 12 are provided at different locations, and the accepting terminals are installed at both, one accepting terminal 15 can be used to detect both entry and exiting in a case where there is only one entry/exit. In the same way, an arrangement may be made regarding the photography area entrance 42 and photography area exit 43, where there is only one entry/exit, and a single accepting terminal detects both entry and exiting.

(3) Although an arrangement has been illustrated in the above embodiments where a subject identification barcode card, subject identification barcode tag, and subject identification wristband are used as examples for identifying the subject ID, other identification methods may be used depending on the usage form of the photography control system. For example, in a case of detecting the subject ID from images in the photography data such as in the photography control system 2, feature information indicating features of facial images of the person serving as the subject may be used as a subject ID. The subject can thus be identified by facial recognition. A linear barcode or color barcode or the like may be used instead of a QR code.

Also, in a case where there is no need to detect the subject ID from images in the photography data, as in the photography control system 1 and photography control system 3, IC functions of a smartphone, radio-frequency (RF) tags, Bluetooth (a registered trademark) tags, light ID, and various other such devices can be used for identification instead of devices such as the subject identification barcode card and subject identification wristband having an IC chip embedded. Much literature and many algorithms have been disclosed for ID detection or identification methods by facial recognition, color barcodes, RF tags, Bluetooth tags, light ID, and so forth, so detailed description will be omitted here.

(4) There may be cases in the above embodiments where the subject forgets to perform exiting procedures with the accepting terminal at the pavilion exit 12 or photography area exit 43. Arrangements may be made, for example, where when the subject enters a different pavilion or photography area, exiting processing of the previous pavilion or photography area is automatically performed, exiting processing is automatically performed after a predetermined amount of time has passed after having entered a pavilion or photography area, or the like. Further, an arrangement may be made where photography by the photographing camera is stopped after a predetermined amount of time has passed after having entered a pavilion or photography area.

(5) Although description has been made in the above embodiments where there is only one photographer as to one photographing camera at the same time, multiple photographing terminals may be used to photography multiple photographers having different subject IDs at the same time. The present photography control system is not one where the photographer directly gives photography instructions to the photographing camera, but the photographing camera performs photography and the photographer gives extraction instructions regarding photography data that has been temporarily saved. Accordingly, even if multiple photographers give instructions at exactly the same timing, photography data that each photographer can be satisfied with can be acquired by the same photography data being saved under the subject IDs of each.

In the example of the photography control system 1, photography is performed at 60 frames per second from the start of photography by the photographing camera, so delay of photography data in a case of the photographer giving an instruction can be kept within 1/60 seconds for any photographer. However, in a case of commemorative photography involving faster movement, such as photographing a subject riding on a roller coaster in an amusement park for example, performing primary photography at a faster frame rate can enable photography data to be acquired at a timing that satisfies the photographer.

(6) Although a case has been described in the above embodiments where there is only one photographing camera that is the object of a photographing terminal, an arrangement may be made where photography data is acquired by one photographing terminal handling photography data from multiple photographing cameras. An arrangement may also be made where, in a case that the subject ID acquired by the subject information detecting unit 21 and the subject ID acquired by the subject identification information input unit 22 match, the secondary photography control unit 26 notifies the user of the photography spot where the subject can be photographed. For example, an arrangement may be made where a list of multiple photography spots are displayed on a photographing terminal, and photography areas where there is an accepting terminal at the entrance to which the subject has held up a barcode or the like are highlighted, so the user can tell which photography area the subject is at, and can perform photography at that photography area.

In a case of installing a dedicatee program in an individually-owned mobile terminal connected to the Internet to use as the photographing terminal, photography (extraction from temporarily-saved photography data) can be performed from a remote location, such as from the home for example, as long as the user knows the subject ID beforehand. This would enable taking photographs of children on a field trip, for example.

(7) Although an arrangement has been described in the above embodiments where the photographing terminal has a photography button, and the photographer performs photography, i.e., instruction of the timing of acquisition of photography data, by pressing the photography button, an arrangement may be made where a button is displayed on a screen of the photographing terminal, so that the photographer can give instruction by touching the button on a touch panel on the screen.

(8) In the above embodiments, in a case where the delay time for displaying photography data taken by the photographing camera on the photographing terminal is short, the photographer can give instructions while viewing the actual subject instead of an image displayed on the photographing terminal. Conversely, photography data taken in the past may be displayed on the photographing terminal to give photography instructions. For example, in a case where the photographer and the subject are the same person, the photographer him/herself may inter the photography area where photography data from primary photography is taken, and then exit the photography area, confirm the photography data, and acquire a photograph from a desired timing.

(9) Although an arrangement has been described in the above embodiments where all photography data during detection of a moving body in the primary photography processing by the photography control system 2 is saved in the temporary photography data storage unit, no photography data (image frames) where no subject ID is detected will be extracted in the secondary photography processing. Accordingly, storage capacity of the temporary photography data storage unit can be conserved, by saving just photography data in the temporary photography data storage unit regarding which a subject ID has been detected beforehand in the primary photography processing.

(10) Although an arrangement has been described in the above embodiments where conditions for performing primary photography in the photography control system 2 are that the subject is in the photography area and also a moving body is being detected, an arrangement may be made where just detection of a moving body is the photography condition, without using whether or not the subject is in the photography area as a condition. Further, an arrangement may be made where there are not photography conditions in the primary photography, with photography being performed at all times.

(11) Although an arrangement has been described in the above embodiments where the photographer instructs the photography timing in the photography control system 1, an arrangement may be made where the accepting terminal detects the subject ID when the subject gets into a ride at an attraction, for example, a photography data corresponding to the subject ID is acquired by automatic photography being performed each time the ride passes in front of the photographing camera.

(12) Although an arrangement has been described in the above embodiments where the photography control system 2 extracts photography data taken where the subject has been taken by the photographing camera so that the subject ID is in the picture, an arrangement may be made where an ID specially for an attraction that the subject is going to ride is printed, for example, and the subject ID and the attraction-specific ID are associated when getting on, so that image data, where the attraction-specific ID is detected from an image in the photography data, is saved as the photography data corresponding to the subject ID.

(13) Although an arrangement has been described in the above embodiments where the temporary photography data storage unit is realized by non-volatile memory such as FeRAM, this may be realized by using a hard disk, storage in an Internet cloud, voltage memory such as RAM, or the like.

(14) Although an arrangement has been described in the above embodiments where the photography data of the time period where the subject ID is detected is saved in the temporary photography data storage unit 24 in the photography control system 2, photography data may be extracted for a certain amount of time after the subject ID is first detected. This arrangement enables the subject to assume various poses, including those where the subject ID would not be in the picture, after the subject ID is shown to the photographing camera to begin with.

(15) Although an arrangement has been described in the above embodiments where only one set of subjects enter the photography area at one time, an arrangement may be made where multiple sets of subjects enter at the same time. For example, even in a case where subject identification barcode tags of multiple sets of subjects are detected in the same frame, photography data corresponding to the respective subject IDs can be saved in a manner associated with the subject IDs of each.

(16) Although an arrangement has been described in the above embodiments where the photography control system 2 starts secondary photography processing after the subject exits the photography area, secondary photography processing may be started before the subject exits the photography area.

(17) Although description has been made in the above embodiments regarding an arrangement where photography data of still images corresponding to the subject ID is extracted from photography data of continuously-taken still images, an arrangement where photography data of a moving image corresponding to the subject ID is extracted from photography data of a moving image, and photography data of still images corresponding to the subject ID is extracted from photography data of still images, an arrangement may be made where photography data of a moving image corresponding to the subject ID is extracted from photography data of continuously-taken still images, or where photography data of still images corresponding to the subject ID is extracted from photography data of moving images.

(18) Although an arrangement has been described in the above embodiments where one photographing camera is at one photography area, multiple photographing cameras may be installed in a single photography area. In this case, the subject ID detected when entering triggers primary photography processing by multiple photographing cameras, and photography data corresponding to the subject ID can be acquired from photography data taken by each of the photographing camera. The photography control server may have as many temporary photography data storage units as there are photographing cameras. In this case, the photography data taken by the multiple photographing cameras may each be temporarily saved in the corresponding temporary photography data storage units. One or more sets of photography data corresponding to the subject ID may be extracted from the multiple sets of photography data temporarily saved in the multiple temporary photography data storage units. The one or more sets of extracted photography data may be stored in the temporary photography data storage units in a manner associated with the identification information. Alternatively, the photography control server may have a single temporary photography data storage unit, with the multiple sets of photography data taken by the multiple photographing cameras being temporarily saved in this temporary photography data storage unit.

(19) Although an arrangement has been described in the above embodiments where moving body detection acts as the photography starting trigger for primary photography processing in the photography control system 2, person detection may be used instead of moving body detection. In a case where the subject is riding in a ride and passes in front of the photographing camera, the time period at which the ride passes in front of the photographing camera may be used as a trigger to perform photography.

(20) Although the validity of the subject ID itself is not confirmed in the above embodiments, usage conditions may be applied where at least one of usable photographing camera and usable date and time is restricted. In this case, usable photographing cameras and photographing terminals can be restricted, and usable dates and times can be restricted.

(21) Although an arrangement has been described in the above embodiments where photography data is extracted at the point of instructing photography to the photographing terminal, photography data from a point a certain amount of time later than the photography instruction may be extracted. For example, extracting photography data at a point after having said, "Say cheese!" after pressing the photography button will enable the subject to assume a photo pose after the photography button has been pressed.

(22) Although an arrangement has been described in the above embodiments where input of the subject ID to the photographing terminal and instructing of photography by the photography button are separate procedures, an arrangement may be made where photography data is extracted with input of the subject ID as a trigger, or where photography data is extracted after a certain amount of time has elapsed after having input the subject ID.

(23) Although an arrangement has been described in the above embodiments where photography data can be viewed only in a case of inputting the subject ID to the photographing terminal, an arrangement may be made where images from the photographing camera are constantly displayed on the photographing terminal.

(24) Although an arrangement has been described in the above embodiments where the photography data storage unit is configured in a cloud server connected by the Internet, the photography data storage unit may be configured in a server within the sightseeing destination or amusement facility or the like, so as to be downloadable for a dedicated terminal on-site. An arrangement may also be made where a dedicated program is installed in a mobile terminal of the photographer and used, so as to directly save to the mobile terminal of the photographer.

(25) Although an arrangement has been described in the above embodiments where a combination table is saved in the photography data storage unit regarding information of association of photography data and subject IDs, an arrangement may be made where saving regions are separately provided for each subject ID, and photography data for each subject is saved in the respective saving areas, thereby realizing an arrangement that does not use a combination table for information of association with subject IDs.

(26) Although an arrangement has been described in the above embodiments where one secondary photography control unit is correlated with one temporary photography data storage unit, an arrangement may be made where one secondary photography control unit extracts photography data from multiple temporary photography data storage units.

(27) Although an arrangement has been described in the above embodiments where one secondary photography control unit is correlated with one photography data storage unit, an arrangement may be made where multiple secondary photography control units save photography data in a single photography data storage unit. This arrangement enables photography data saved by multiple photography control systems to be collectively acquired from the photography data storage unit using the subject ID.

(28) Although an arrangement has been described in the above embodiments where one temporary photography data storage unit is correlated with one photographing camera, an arrangement may be made where multiple photographing cameras temporarily save photography data in a single temporary photography data storage unit.

(29) Although an arrangement has been described in the above embodiments where one photographing camera is correlated with one primary photography control unit, an arrangement may be made where one primary photography control unit is correlated with multiple photographing cameras photographing the subject at the photography spot in different photography states. The different photography states may be the multiple photographing cameras being installed facing different directions, the multiple photographing cameras being set to different zoom ratios, and so forth. This enables usage where the subject at a photography spot can be photographed from multiple angles at the same time, or photographed at different zoom ratios at the same time.

(30) Control programs made up of program code such as machine code or high-level programming language, to cause processors, and circuits connected to the processors, in the subject information detecting unit, primary photography control unit, subject identification information input unit, and secondary photography control unit, to execute the processes regarding these devices, may be recorded in recording media and may be circulated and distributed via various communication routes or the like.

Examples of such recording media include IC cards, hard disks, optical discs, flexible disks, read-only memory (ROM), flash memory, and so forth. Control programs circulated and distributed are provided to be used by being stored in memory or the like that can be read by a processor, and the functions such as those described in the embodiments are realized by the processor executing the control programs. In addition to directly executing control programs, the processor may also execute programs by compiling or by interpreting.

(31) The functional components (subject information detecting unit, primary photography control unit, subject identification information input unit, secondary photography control unit, and so forth) described in the embodiments may be realized as circuits executing the functions thereof, or may be realized by one or multiple processors executing programs.

Note that the functional components are typically realized as large scale integration (LSI). These may be individually formed as single chips, or part or all may be integrated as a single chip. Although description has been made regarding an LSI, these may be referred to as integrated circuit (IC), system LSI, super LSI, or ultra LSI, depending on the degree of integration thereof. Techniques for integrated circuits are not restricted to LSI, and dedicated circuits or general-purpose processors may be used. Field programmable gate arrays (FPGA) programmed after manufacturing of the LSI, and reconfigurable logic devices capable of reconfiguration of junctions within the LSI or setup of circuit sections within the LSI, can be used to the same end. Further, in the event of the advent of an integrated circuit technology which would replace LSIs by advance of semiconductor technology or a separate technology derived therefrom, such a technology may be used for integration of the functional blocks, as a matter of course.

(32) The above embodiments and modifications may be partially combined.

The photography control method according to the present disclosure enables identifying a user that can perform photography and acquisition of photography data when photographing a subject at a photography spot using photographing cameras installed facing the photography spot, and accordingly is suitable for a system for commemorative photography at theme parks, amusement spots, sightseeing destinations, and so forth.

What is claimed is:

1. A photography control method of a photography control system for extracting at least one set of photography data of a subject from a plurality of sets of photography data a) obtained between a time the subject entered and exited a pavilion with a photographing camera i) that is installed facing a photography spot ii) that starts photographing automatically in response to acquiring first subject entrance information on the subject with a first device at the pavilion entrance, and iii) that stops photographing in response to acquiring first subject exit information with a second device at the pavilion exit, and elapsing of a predetermined time, and b) by extracting the at least one set of photography data from the plurality of sets of photography data when the at least one set of photography data was taken during the time period between the acquiring of the first subject entrance information at the pavilion entrance and the acquiring of the first subject exit information at the pavilion exit, and when at least one set of photography data contains an optically readable code matching identification information identifying the subject acquired by the first and second devices at the pavilion entrance and pavilion exit, respectively, the method comprising:

i) acquiring the first subject entrance information indicating the entrance time at which a subject has entered an area including the photography spot with the first device at the pavilion entrance;

ii) acquiring the first subject exit information indicating the exit time at which the subject has exited the area including the photography spot with the & second device at the pavilion exit located at a location different from the first device;

iii) photographing, using the photographing camera, the photography spot to obtain the plurality of sets of photography data by automatically starting photographing of the subject at the photography spot in response to detection by the first device of the first subject entrance information at the pavilion entrance, and automatically stopping photographing in response to detecting by the second device of the first subject exit information at the pavilion exit, and elapsing of a predetermined time;

iv) saving the plurality of sets of photography data, taken by the photographing camera, in a first photography data storage unit in association with identification information of the subject acquired by the first device;

v) acquiring the identification information identifying the subject with the first and second devices;

vi) determining the time period between the time the first device detects entry of the subject into the area and the time the second device detects exiting of the subject from the area;

vii) extracting, from the plurality of sets of photography data saved in the first photography data storage unit, the at least one set of photography data taken during the determined time period between the time the first device detects entry of the subject into the pavilion and the time the second device detects exiting of the subject from the pavilion, corresponding to the identification information acquired in the acquiring of identification information by extracting the at least one set of photography data from the plurality of sets of photography data in response to taking the at least one set of photography data during the time period between the time the first device detects entry of the subject at the pavilion entrance and the time the second device detects exit of the subject at the pavilion exit of the subject when the photographing camera is automatically started and stopped in response to acquiring of the first subject entrance and exit information at the pavilion entrance and exit, respectively, and reading the optically readable code with a third device different from the first and second devices, and matching the optically readable code with the identification information of the subject in the first photography data storage unit; and xiii) saving the extracted at least one set of photography data in a second photography data storage unit in a manner associated with the identification information of the subject.

2. The photography control method according to claim 1, wherein, in the acquiring of the first subject entrance information, information that is the same information that the identification information indicates is acquired as the subject information, wherein, the first subject information is acquired when the subject enters the area.

3. The photography control method according to claim 1,
wherein, in the acquiring of the first subject entrance information, moving body detection information indicating that a moving body in the area has been detected is acquired as the subject information.

4. The photography control method according to claim 1,
wherein, in the acquiring of the first subject entrance information, the identification information acquired in the acquiring of the identification information is acquired as the first subject information.

5. The photography control method according to claim 1,
wherein, in the photographing, the photography spot is taken by the photographing camera repeatedly at a predetermined time interval,
wherein the photographing is ended when a certain amount of time has elapsed from starting of photography.

6. The photography control method according to claim 2, further comprising:
saving first time information in the first photography data storage unit, the first time information being the entrance time and indicating a first time at which the first subject information was acquired;
wherein, in the photographing, the photography spot is taken by the photographing camera repeatedly at a predetermined time interval,
wherein, the one or more sets of photography data, to be obtained in the photographing, are a plurality of sets of photography data of which photography times taken by the photographing camera are different from each other.

7. The photography control method according to claim 2, further comprising:
saving the first subject information and first time information in the first photography data storage unit, the first time information being the entrance time and indicating a first time at which the first subject information was acquired;
acquiring second subject information which is the same information as the first subject information but is determined at the exit time when the subject exits from the area;
saving second time information in the first photography data storage unit, the second time information being the exit time and indicating a second time at which the second subject information was acquired;
wherein, in the photographing, the photography spot is taken by the photographing camera repeatedly at a predetermined time interval,
wherein, the one or more sets of photography data, to be obtained in the photographing, are a plurality of sets of photography data of which photography times taken by the photographing camera are different from each other,
wherein, in the acquiring of the identification information, third time information is acquired in addition to the identification information, the third time information indicating a third time which is instructed by a user, the third time being a time between the first time and the second time,
wherein, in the extracting, one set of photography data, of which a photography time matches the third time, is extracted, as the at least one set of photography data, from the plurality of sets of photography data saved the first photography data storage unit.

8. The photography control method according to claim 1,
wherein, in the photographing, the photography spot is taken by the photographing camera repeatedly at a predetermined time interval,
wherein, the one or more sets of photography data, to be obtained in the photographing, are a plurality of sets of photography data of which photography times taken by the photographing camera are different from each other, and
wherein, in the extracting, one set of photography data of which a photography time is instructed by a user, is extracted, as the at least one set of photography data, from the plurality of sets of photography data saved in the first photography data storage unit.

9. The photography control method according to claim 1,
wherein, in the photographing, the photography spot is taken by the photographing camera repeatedly at a predetermined time interval,
wherein, the one or more sets of photography data, to be obtained in the photographing, are a plurality of sets of photography data of which photography times taken by the photographing camera are different from each other,
wherein, in the acquiring of the identification information, the identification information is acquired from at least one set of photography data which includes information corresponding to the identification information and which is one of the plurality of sets of photography data stored in the first photography data storage unit, and
wherein, in the extracting, the at least one set of photography data, from which the identification information was acquired, is extracted from the first photography data storage unit.

10. The photography control method according to claim 1,
wherein, in the acquiring of the identification information, the identification information is acquired by detecting the information corresponding to the identification information from the at least one set of photography data.

11. The photography control method according to claim 1,
wherein the identification information is expressed using a barcode.

12. The photography control method according to claim 1,
wherein the identification information is features information indicating features of a facial image of the subject.

13. The photography control method according to claim 1,
wherein the identification information has usage conditions restricting a date and time at which the photographing camera can be used.

14. The photography control method according to claim 2, further comprising:
notifying a terminal operated by a user regarding a photography spot where the subject can be photographed, in a case where the first subject information acquired in the acquiring of the first subject information and the identification information acquired in the acquiring of the identification information match.

15. The photography control method according to claim 1,
wherein the photographing camera is a plurality of photographing cameras,
wherein the first photography data storage unit is a plurality of first photography data storage units,
wherein, in the saving in the first photography data storage unit, a plurality of sets of photography data taken by the plurality of photographing cameras are saved in the plurality of first photography data storage units,
and wherein, in the extracting, at least one set of photography data, corresponding to the identification information acquired in the acquiring of identification information, is extracted from the plurality of sets of photography data saved in the plurality of first photography data storage units.

16. The photography control method according to claim 15,
wherein, in the extracting, the at least one set of photography data is extracted from the plurality of sets of photography data saved in the plurality of first photography data storage units, and
wherein, in the saving, the at least one set of photography data is saved in the second photography data storage unit in a manner associated with the identification information.

17. The photography control method according to claim 1,
wherein the photographing camera is a plurality of photographing cameras, and
wherein, in the saving, the plurality of sets of photography data taken by the plurality of photographing cameras are saved in the first photography data storage unit.

18. The photography control method according to claim 1,
wherein the photographing camera includes a plurality of photographing cameras that photograph the photography spot in photography states different from each other, and
wherein in the photographing, a photography instruction is given to the plurality of photographing cameras at the same time.

19. A photography control system for extracting at least one set of photography data of a subject from a plurality of sets of photography data a) obtained between a time the subject entered and exited a pavilion with a photographing camera i) that is installed facing a photography spot at a terminal at the pavilion entrance having a first barcode reader that reads a barcode on the subject at the pavilion entrance, ii) that starts photographing automatically in response to reading the barcode on the subject at the pavilion entrance with the first barcode reader, and iii) that stops photographing in response to reading by a second barcode reader of the barcode displayed on the subject at the pavilion exit, and elapsing of a predetermined time, and b) by extracting the at least one set of photography data from the plurality of sets of photography data when the at least one set of photography data was taken during the time period between the reading of the subject's barcode at the pavilion entrance and the reading of the subject's barcode at the pavilion exit, and when at least one set of photography data contains an optically readable code matching identification information identifying the subject acquired by the first and second barcode readers at the pavilion entrance and pavilion exit, respectively, the photography control system comprising:
the photographing camera installed facing a photography spot at the pavilion-entrance terminal;
the first barcode reader at a pavilion-entrance terminal that acquires first subject entrance information indicating the entrance time at which a subject has entered an area including the photography spot by reading the barcode on the subject representing a subject ID of the subject;
the second barcode reader that acquires first subject exit information indicating the exit time at which the subject has exited the area including the photography spot located at a location different from the first barcode reader at the pavilion-exit terminal by reading the barcode of the subject;
a processor that controls the photographing camera and determines the time period between the time the first barcode reader detects entry of the subject into the area and the time the second barcode reader detects exiting of the subject from the area;
a first memory that saves one or more sets of photography data taken by the photographing camera in association with identification information of the subject acquired by the first barcode reader;
a keyboard or touch panel that inputs the identification information identifying the subject;
wherein the processor also extracts at least one set of photography data from the first memory; and
a second memory that saves the at least one set of photography data extracted by the processor, wherein,
the photographing camera photographs the photography spot to obtain the plurality of sets of photography data by
automatically starting photographing of the subject at the photography spot in response to detection by the first barcode reader of the barcode displayed on the subject at the pavilion entrance, and
automatically stopping photographing in response to detecting by the second barcode reader of the barcode displayed on the subject at the pavilion exit, and
elapsing of a predetermined time;
the first barcode reader acquires the identification information identifying the subject at the pavilion-entrance terminal;
the second barcode reader acquires the identification information identifying the subject at the pavilion-exit terminal;
the processor determines the time period between the time the first barcode reader detects entry of the subject into the area and the time the second barcode reader detects exiting of the subject from the area; and
the processor extracts, from the plurality of sets of photography data saved in the first memory, the at least one set of photography data taken during the determined time period between the time the first barcode reader detects entry of the subject into the pavilion and the time the second barcode reader device detects exiting of the subject from the pavilion, corresponding to the identification information acquired in the acquiring of identification information by
extracting the at least one set of photography data from the plurality of sets of photography data in response to
inputting the identification information identifying the subject with the keyboard or touch panel,
taking the at least one set of photography data during the time period between the reading of the subject's barcode at the pavilion entrance and the reading of the subject's barcode at the pavilion exit when the photographing camera is automatically started and stopped in response to reading the barcode on the subject at the pavilion entrance and exit, respectively, and
reading the optically readable code with a device different from the first and second barcode readers and different from the keyboard and touch panel, and matching the optically readable code with the identification information of the subject in the first memory.

20. A photography control server for extracting at least one set of photography data of a subject from a plurality of sets of photography data a) obtained between a time the subject entered and exited a pavilion with a photographing camera i) that is installed facing a photography spot at a pavilion-entrance terminal at the pavilion entrance having a first barcode reader that reads a barcode on the subject at the pavilion entrance, ii) that starts photographing automatically in response to reading the barcode on the subject at the pavilion entrance with the first barcode reader, and iii) that stops photographing in response to reading by a second barcode reader at a pavilion-exit terminal of the barcode displayed on the subject at the pavilion exit, and elapsing of a predetermined time, and b) by extracting the at least one set of photography data from the plurality of sets of photography data when the at least one set of photography data was taken during the time period between the reading of the subject's barcode at the pavilion entrance and the reading of the subject's barcode at the pavilion exit, and when at least one set of photography data contains an optically readable code matching identification information identifying the subject acquired by the first and second barcode readers at the pavilion entrance and pavilion exit, respectively, the photography control server comprising the first barcode reader that acquires subject entrance information indicating the entrance time at which a subject has entered an area including a photography spot by reading the barcode on the subject representing a subject ID of the subject;

the second barcode reader that acquires first subject exit information indicating the exit time at which the subject has exited the area including the photography spot located at a location different from the first barcode reader;

a processor that controls a photographing camera installed facing the photography spot and determines the time period between the time the first barcode reader detects entry of the subject into the area and the time the second barcode reader detects exiting of the subject from the area;

a first memory that saves one or more sets of photography data taken by the photographing camera in association with identification information of the subject acquired by the first barcode reader;

a keyboard or a touch panel that inputs the identification information identifying the subject;

wherein the processor also extracts at least one set of photography data from the first memory; and a second memory that saves the at least one set of photography data extracted by the processor, wherein, the photographing camera photographs the photography spot to obtain the plurality of sets of photography data by automatically starting photographing of the subject at the photography spot in response to detection by the first barcode reader of the barcode displayed on the subject at the pavilion entrance, and automatically stopping photographing in response to detecting by the second barcode reader of the barcode displayed on the subject at the pavilion exit, and elapsing of a predetermined time;

the first barcode reader acquires the identification information identifying the subject at the pavilion-entrance terminal;

the second barcode reader acquires the identification information identifying the subject at the pavilion-exit terminal;

the processor determines the time period between the time the first barcode reader detects entry of the subject into the area and the time the second barcode reader detects exiting of the subject from the area; and the processor extracts, from the plurality of sets of photography data saved in the first memory, the at least one set of photography data taken during the determined time period between the time the first barcode reader detects entry of the subject into the pavilion and the time the second barcode reader device detects exiting of the subject from the pavilion, corresponding to the identification information acquired in the acquiring of identification information by extracting the at least one set of photography data from the plurality of sets of photography data in response to inputting the identification information identifying the subject with the keyboard or touch panel, taking the at least one set of photography data during the time period between the reading of the subject's barcode at the pavilion entrance and the reading of the subject's barcode at the pavilion exit when the photographing camera is automatically started and stopped in response to reading the barcode on the subject at the pavilion entrance and exit, respectively, and reading the optically readable code with a device different from the first and second barcode readers and different from the keyboard and touch panel, and matching the optically readable code with the identification information of the subject in the first memory.

21. The photography control method according to claim 1, wherein the first device comprises a barcode reader and the third device comprises a keyboard or touch panel.

* * * * *